US012749626B2

(12) United States Patent
Miyauchi

(10) Patent No.: US 12,749,626 B2
(45) Date of Patent: Sep. 29, 2026

(54) MULTILAYER CERAMIC ELECTRONIC COMPONENT INCLUDING METAL TERMINALS AND PROTRUDING PORTIONS

(71) Applicant: Murata Manufacturing Co., Ltd., Nagaokakyo (JP)

(72) Inventor: Satoshi Miyauchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 152 days.

(21) Appl. No.: 18/797,740

(22) Filed: Aug. 8, 2024

(65) Prior Publication Data

US 2025/0022658 A1 Jan. 16, 2025

Related U.S. Application Data

(63) Continuation of application No. PCT/JP2023/025949, filed on Jul. 13, 2023.

(51) Int. Cl.

| | |
|---|---|
| ***H01G 4/236*** | (2006.01) |
| ***H01G 4/224*** | (2006.01) |
| ***H01G 4/232*** | (2006.01) |
| ***H01G 4/30*** | (2006.01) |

(52) U.S. Cl.

CPC ............ *H01G 4/236* (2013.01); *H01G 4/224* (2013.01); *H01G 4/232* (2013.01); *H01G 4/30* (2013.01)

(58) Field of Classification Search

None

See application file for complete search history.

(56) References Cited

U.S. PATENT DOCUMENTS

| | | | | |
|---|---|---|---|---|
| 2015/0270066 A1* | 9/2015 | Hattori | H01G 4/01 361/301.4 |
| 2018/0160541 A1* | 6/2018 | Fujita | H01G 4/248 |
| 2019/0259533 A1 | 8/2019 | Na | |
| 2020/0006002 A1 | 1/2020 | Itamochi | |
| 2020/0006006 A1* | 1/2020 | Tahara | H01G 2/065 |
| 2022/0301777 A1 | 9/2022 | Nishimura | |

FOREIGN PATENT DOCUMENTS

| | | |
|---|---|---|
| JP | 2008166457 A | 7/2008 |
| JP | 2019145767 A | 8/2019 |
| JP | 2020004832 A | 1/2020 |
| JP | 2022142240 A | 9/2022 |
| JP | 2023042425 A | 3/2023 |

OTHER PUBLICATIONS

International Search Report in PCT/JP2023/025949, mailed Sep. 26, 2023, 3 pages.

Written Opinion in PCT/JP2023/025949, mailed Sep. 26, 2023, 6 pages.

* cited by examiner

*Primary Examiner* — Eric W Thomas

(74) *Attorney, Agent, or Firm* — Keating & Bennett, LLP

(57) ABSTRACT

A multilayer ceramic capacitor includes a multilayer ceramic capacitor main body, metal terminals connected to external electrodes via a bonding material, and an exterior material covering the multilayer ceramic capacitor main body. The metal terminals include bonding surfaces that bond the bonding material and contact surfaces in contact with the exterior material. The contact surfaces include an outermost surface metal film and a lower wettability surface having a lower wettability than that of the outermost surface metal film. A protruding portion is at a boundary portion between a surface of the outermost surface metal film and the lower wettability surface.

19 Claims, 34 Drawing Sheets

Sn

Ni

MULTILAYER CERAMIC ELECTRONIC COMPONENT INCLUDING METAL TERMINALS AND PROTRUDING PORTIONS

CROSS REFERENCE TO RELATED APPLICATIONS

This application claims the benefit of priority to PCT/JP2023/025949 filed on Jul. 13, 2023. The entire contents of this application are hereby incorporated herein by reference.

BACKGROUND OF THE INVENTION

1. Field of the Invention

The present invention relates to multilayer ceramic electronic components.

2. Description of the Related Art

Conventionally, multilayer ceramic electronic components each covered with a resin functioning as an exterior material are known. In each of such multilayer ceramic electronic components, metal terminals each extending to the outside of the exterior material and external electrodes each provided on the surface of the multilayer ceramic electronic component main body are bonded to each other by a bonding material including a metal such as solder inside the exterior material.

SUMMARY OF THE INVENTION

Japanese Unexamined Patent Application Publication No. 2019-145767 discloses a multilayer ceramic electronic component including a plated film on a surface of a frame functioning as a metal terminal. Since the plated film is provided on the metal terminal, the bonding property by the bonding material can be enhanced. However, when the plated film having high wettability is provided on the entire surface of the metal terminal, the bonding material may excessively flow out along the metal terminal. In this case, the bonding material is likely to approach the surface of the exterior material, and when the bonding material is remelted and the volume of the bonding material expands during reflow at the time of mounting the substrate, a phenomenon of solder splash may occur in which a solder component is ejected from the interface between the exterior material and the metal terminal.

Example embodiments of the present invention provide multilayer ceramic electronic components that are each able to reduce or prevent excessive flow of a bonding material appropriately to reduce or prevent solder splash.

An example embodiment of the present invention provides a multilayer ceramic electronic components including a multilayer ceramic electronic component main body including a multilayer body including a plurality of ceramic layers and a plurality of internal conductive layers that are laminated, a first main surface and a second main surface opposed to each other in a height direction, a first lateral surface and a second lateral surface opposed to each other in a width direction orthogonal or substantially orthogonal to the height direction, and a first end surface and a second end surface opposed to each other in a length direction orthogonal or substantially orthogonal to the height direction and the width direction, a first external electrode on the first end surface, and a second external electrode on the second end surface, a first metal terminal connected to the first external electrode via a bonding material, a second metal terminal connected to the second external electrode via a bonding material, an exterior material that covers the multilayer ceramic electronic component main body, a portion of the first metal terminal, and a portion of the second metal terminal, in which the first metal terminal includes a first bonding surface bonded to the bonding material and a first contact surface in contact with the exterior material, the second metal terminal includes a second bonding surface bonded to the bonding material and a second contact surface in contact with the exterior material, the first contact surface in contact with the exterior material includes a surface of a first outermost surface metal film and a first low wettability surface having a wettability lower than the first outermost surface metal film, the second contact surface in contact with the exterior material includes a surface of a second outermost surface metal film and a second low wettability surface having a wettability lower than the second outermost surface metal film, a first protruding portion is provided at a boundary portion between the surface of the first outermost surface metal film and the first low wettability surface, and a second protruding portion is provided at a boundary portion between the surface of the second outermost surface metal film and the second low wettability surface.

According to example embodiments of the present invention, it is possible to provide multilayer ceramic electronic components that are each able to reduce or prevent excessive flow of a bonding material appropriately to reduce or prevent solder splash.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
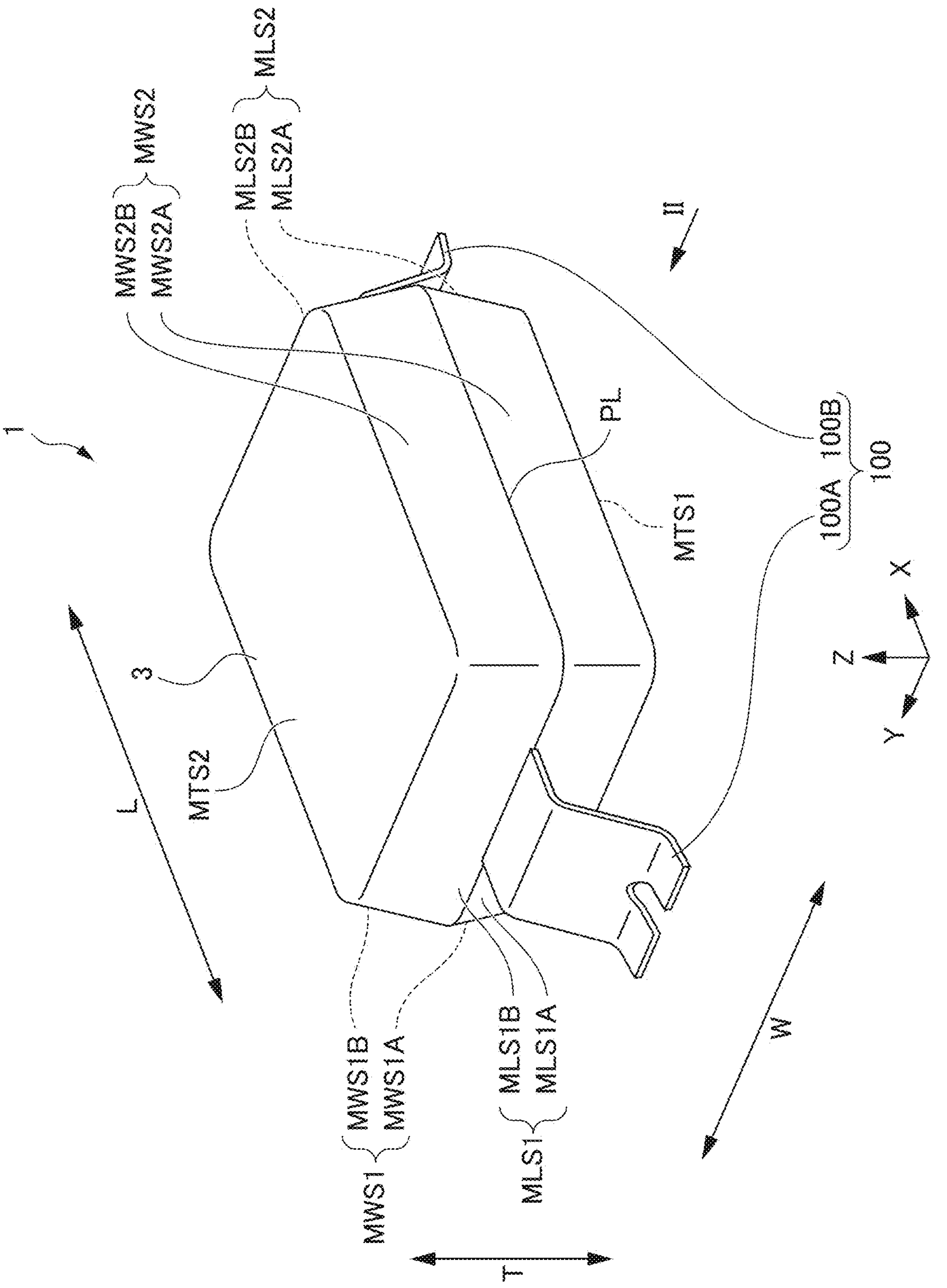
FIG. 1 is an external perspective view of a multilayer ceramic capacitor of an example embodiment of the present invention.
Figure 2:
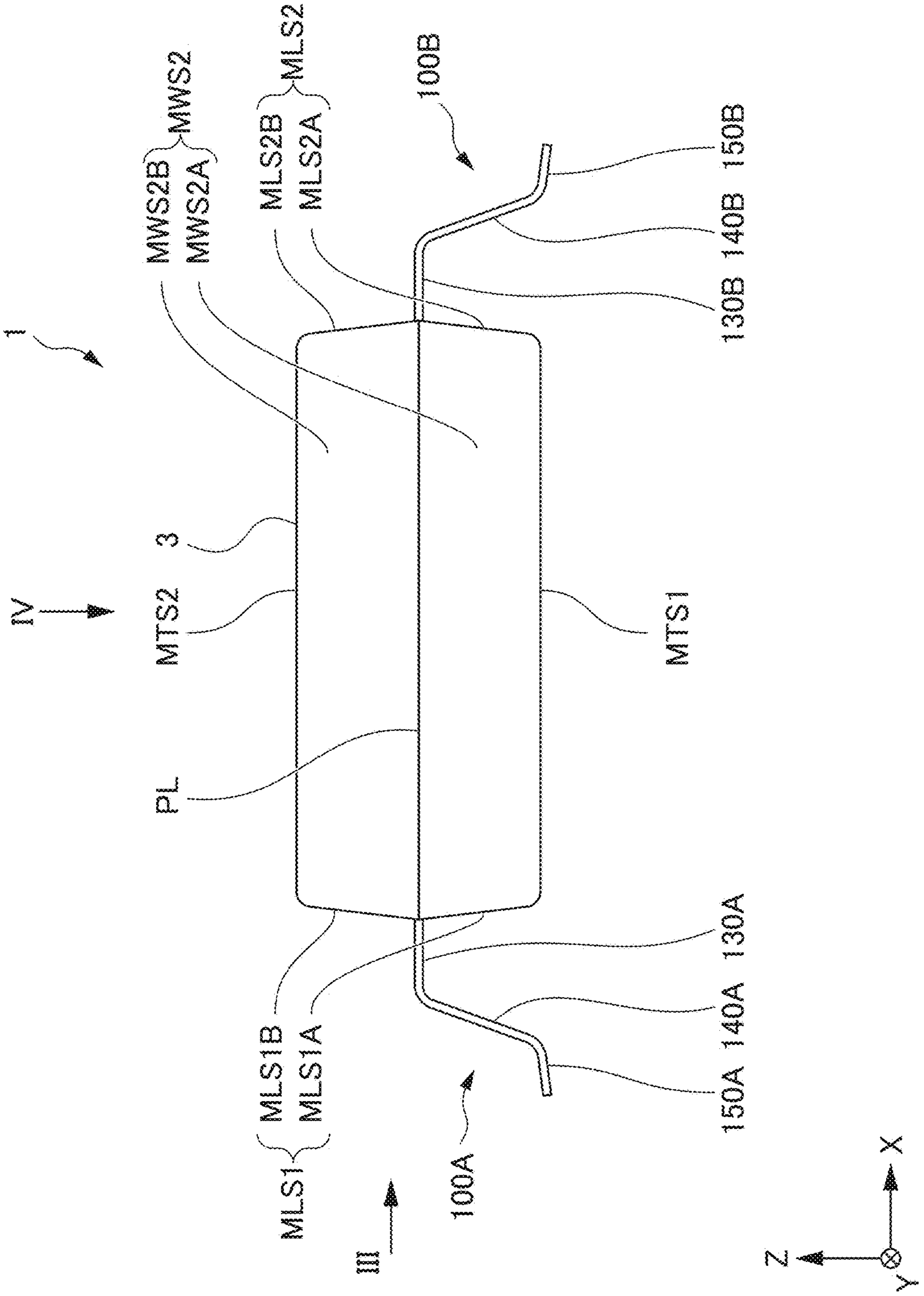
FIG. 2 is an arrow view when the multilayer ceramic capacitor of FIG. 1 is viewed in the direction of the arrow II.
Figure 3:
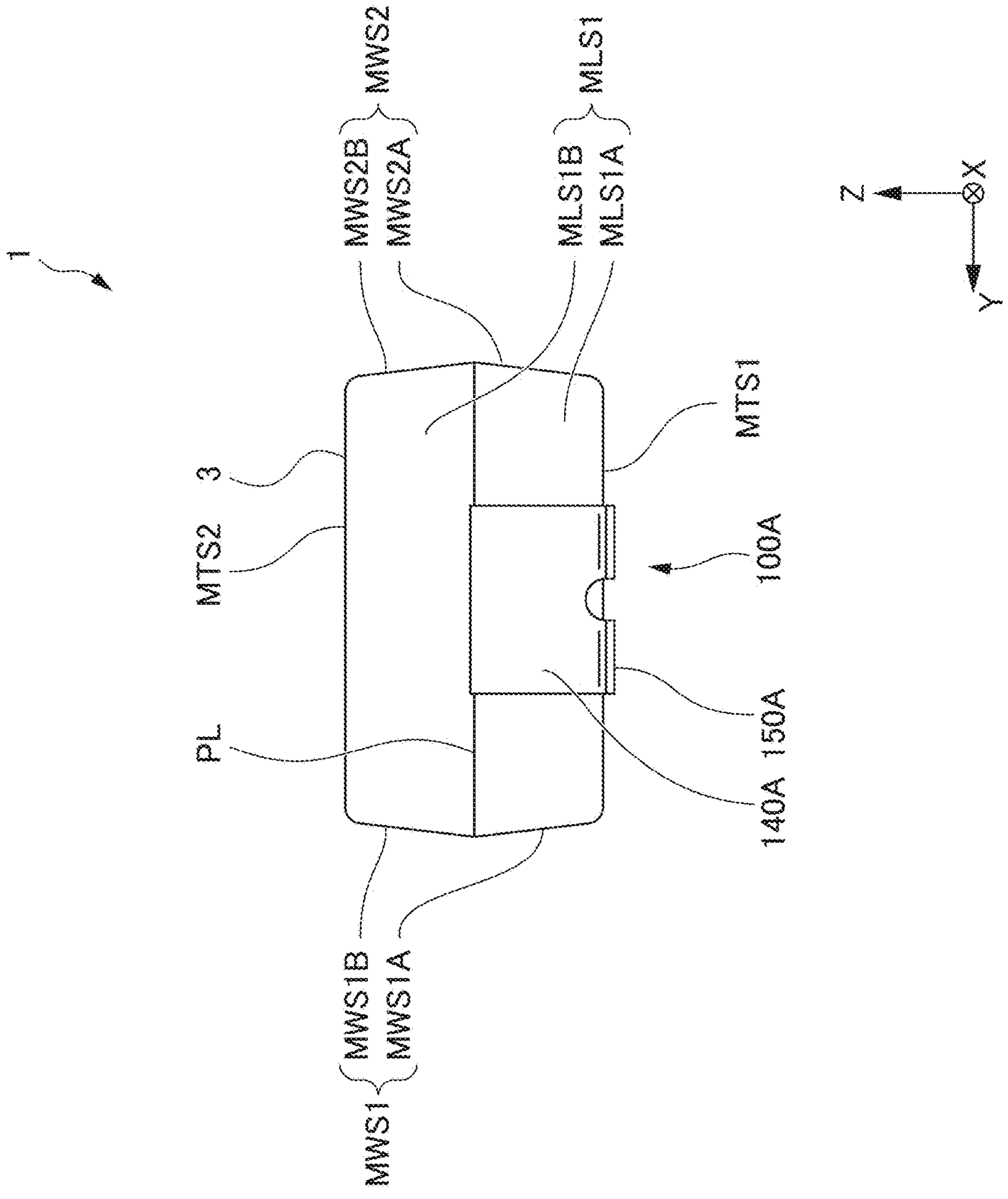
FIG. 3 is an arrow view when the multilayer ceramic capacitor of FIG. 2 is viewed in the direction of the arrow III.
Figure 4:
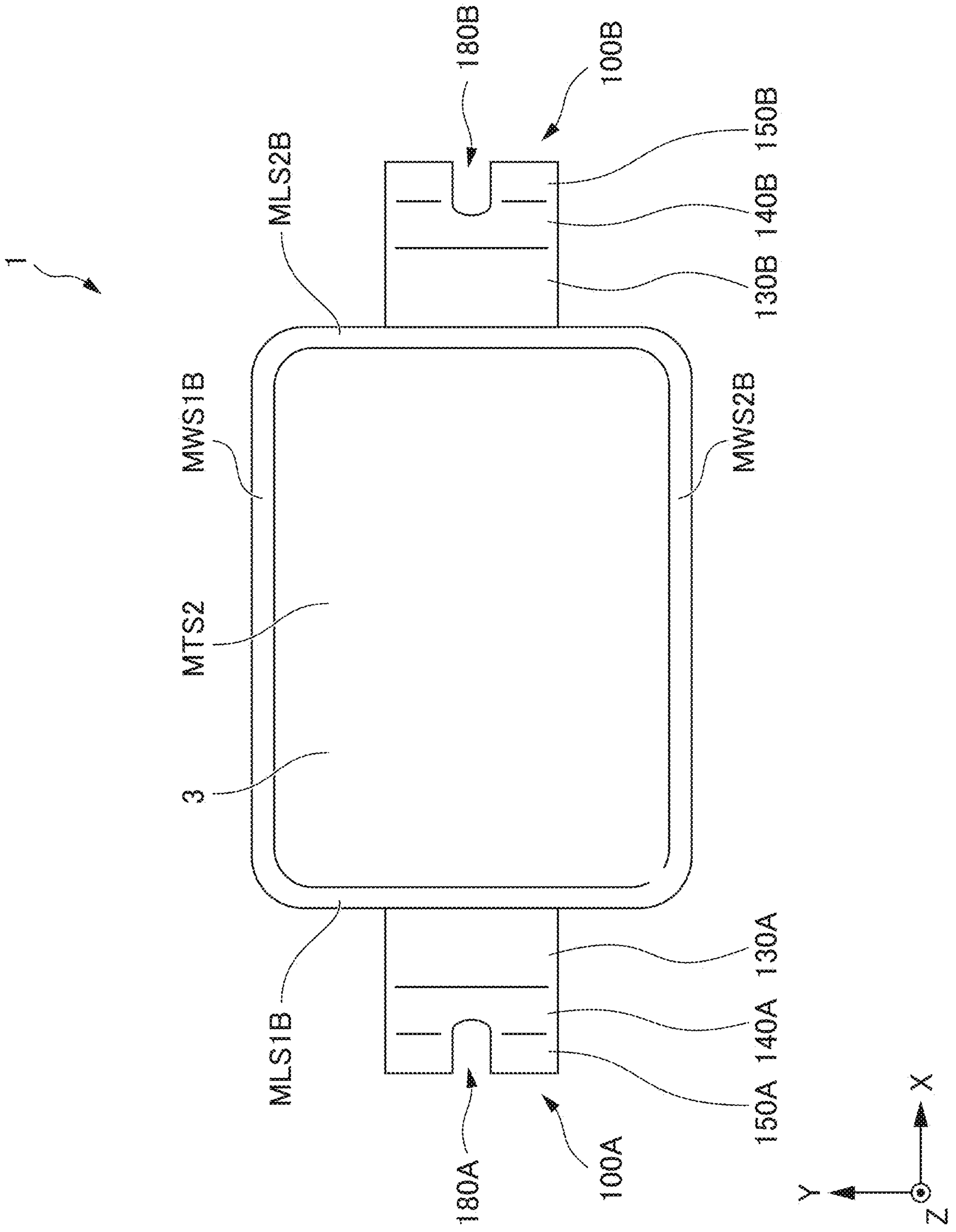
FIG. 4 is an arrow view when the multilayer ceramic capacitor of FIG. 2 is viewed in the direction of the arrow IV.
Figure 5:
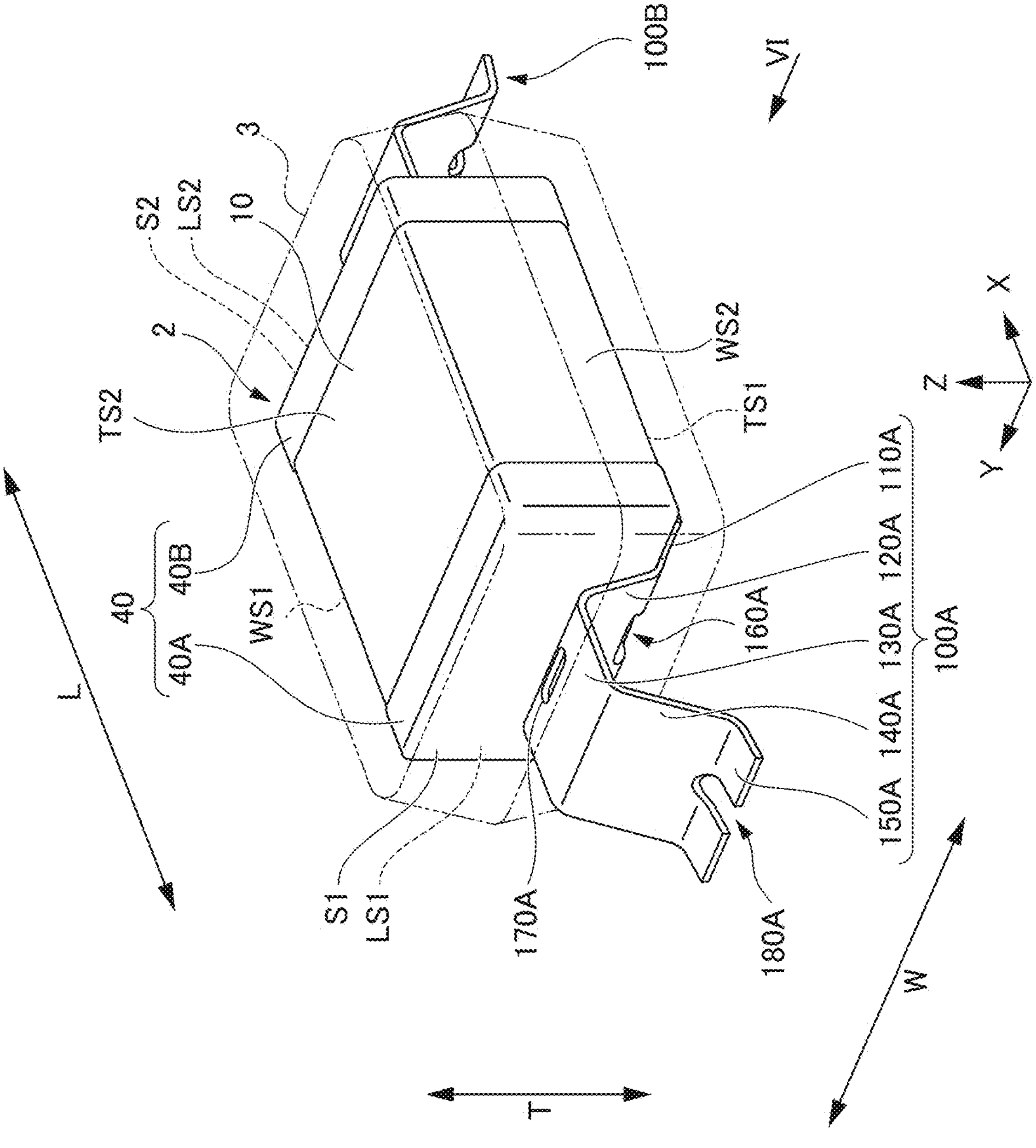
FIG. 5 is a diagram corresponding to FIG. 1, and is an imaginary perspective view for explaining an internal structure of the multilayer ceramic capacitor.
Figure 6:
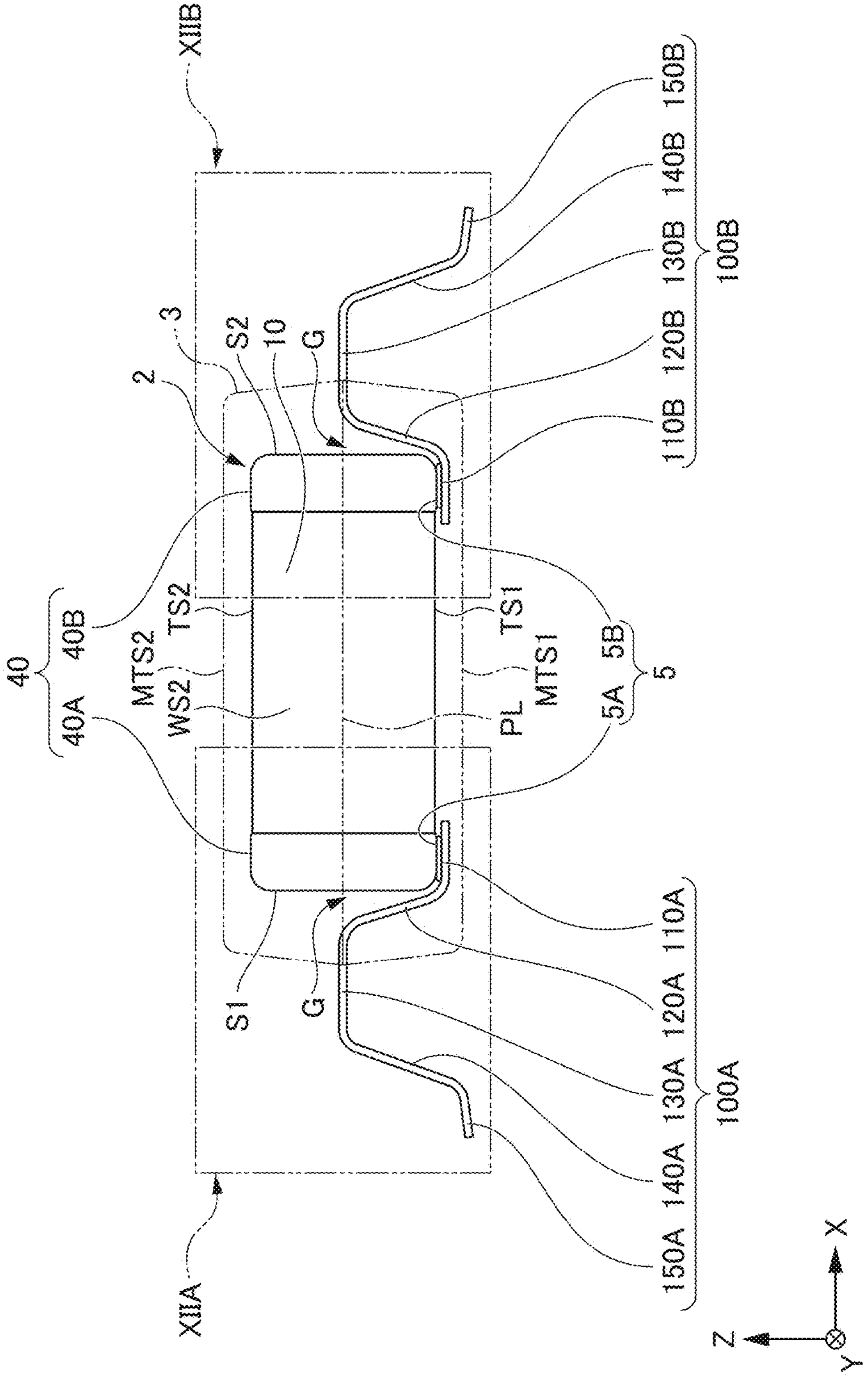
FIG. 6 is an imaginary arrow view when the multilayer ceramic capacitor of FIG. 5 is viewed in the direction of arrow VI.

Hereinafter, a multilayer ceramic capacitor 1 as a multilayer ceramic electronic component according to an example embodiment of the present invention will be described. FIG. 1 is an external perspective view of the multilayer ceramic capacitor 1. FIG. 2 is an arrow view when the multilayer ceramic capacitor 1 of FIG. 1 is viewed in the direction of the arrow II. FIG. 3 is an arrow view when the multilayer ceramic capacitor 1 of FIG. 2 is viewed in the direction of the arrow III. FIG. 4 is an arrow view when the multilayer ceramic capacitor 1 of FIG. 2 is viewed in the direction of the arrow IV. FIG. 5 is a diagram corresponding to FIG. 1, and is an imaginary perspective view for explaining an internal structure of the multilayer ceramic capacitor 1. FIG. 6 is an imaginary view for explaining the internal structure of the multilayer ceramic capacitor 1, and is an imaginary view when the multilayer ceramic capacitor 1 of FIG. 5 is viewed in the direction of the arrow VI.

The multilayer ceramic capacitor 1 includes a multilayer ceramic capacitor main body 2 functioning as a multilayer ceramic electronic component main body, a metal terminal 100, and an exterior material 3. Since the multilayer ceramic capacitor main body 2 is covered with the exterior material 3, it is not shown in FIGS. 1 to 4. FIGS. 5 and 6 show the multilayer ceramic capacitor main body 2.

Figure 7:
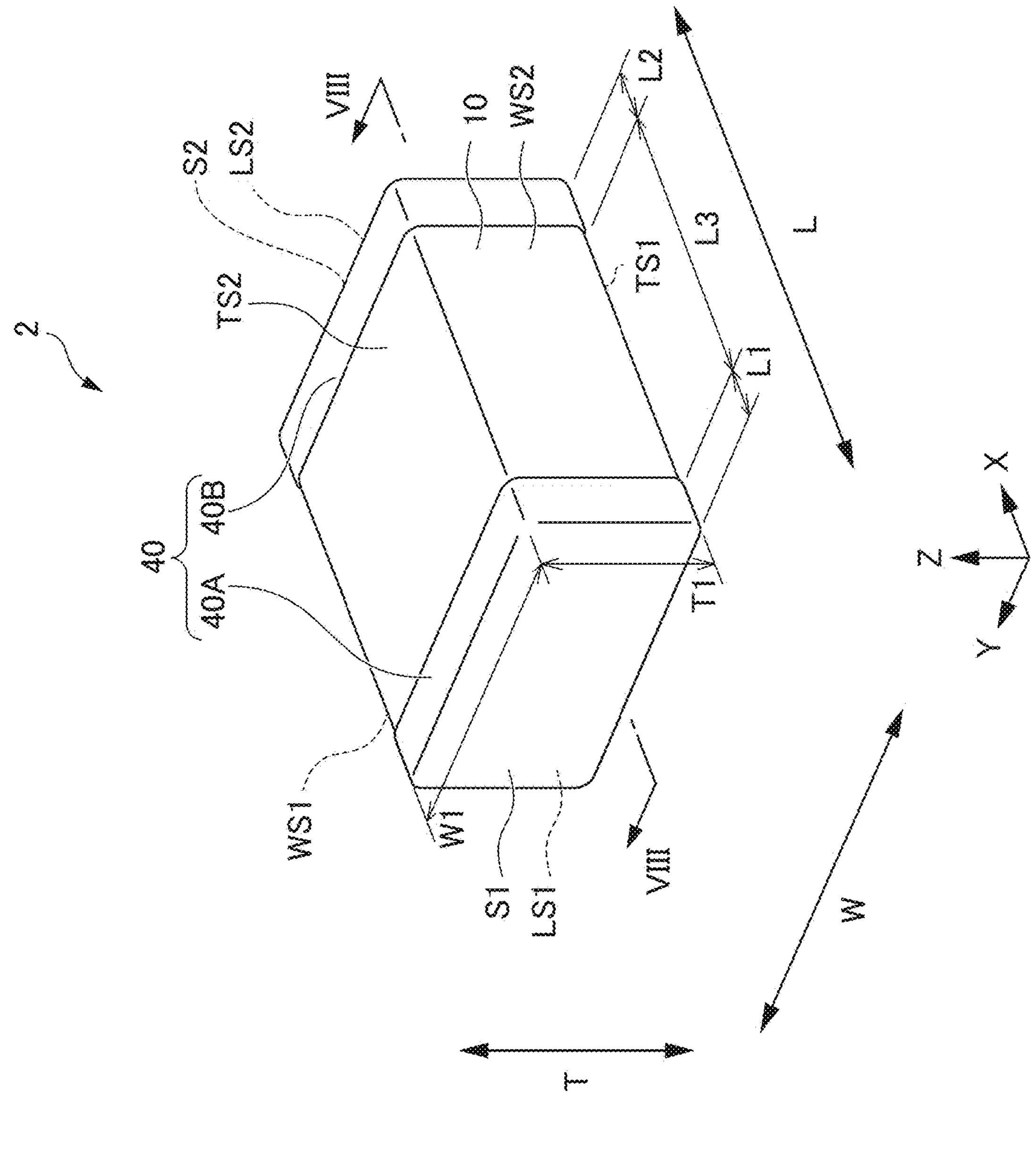
FIG. 7 is an external perspective view showing the appearance of a multilayer ceramic capacitor main body before being covered with an exterior material and before a metal terminal is attached.
Figure 8:
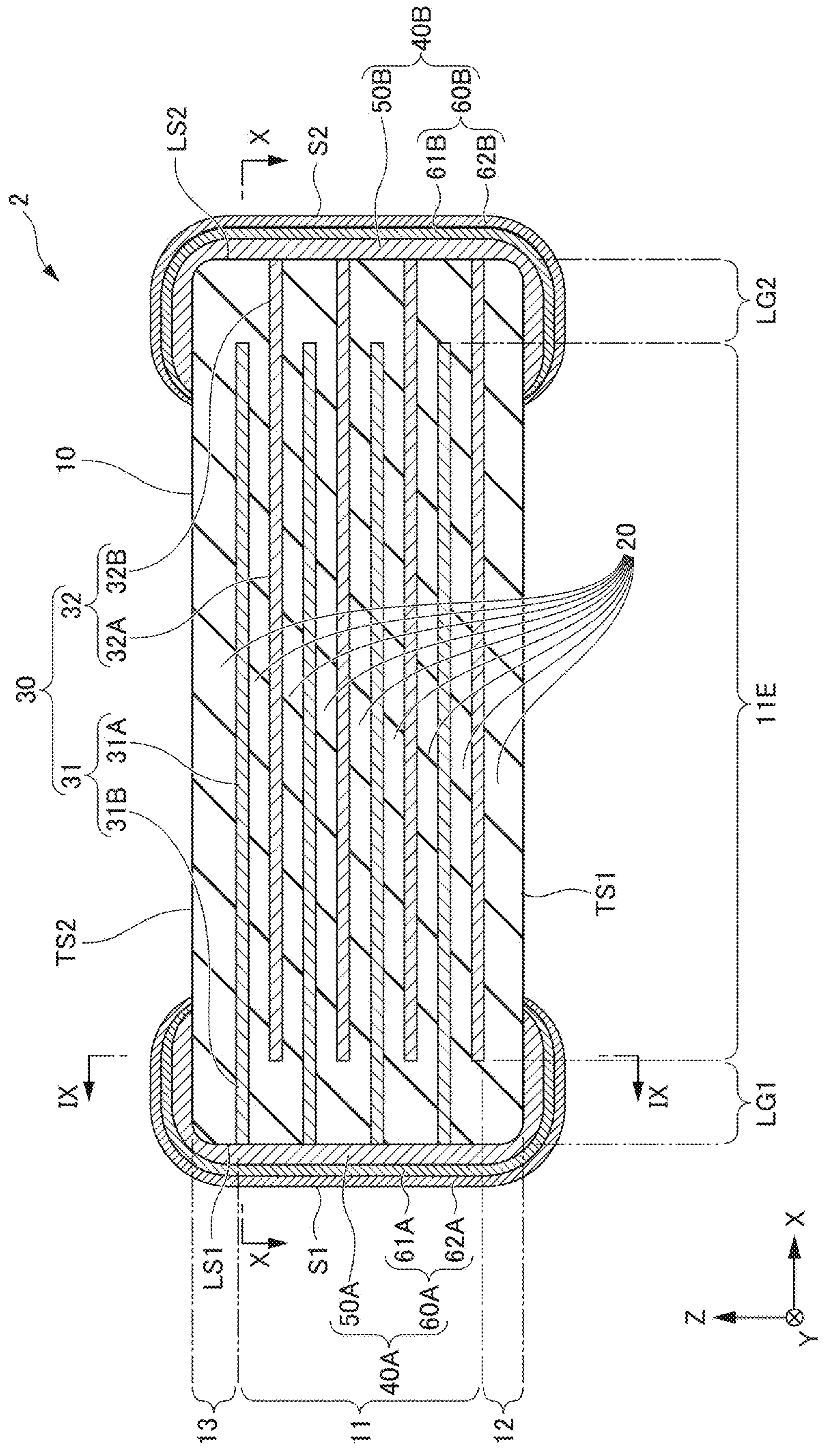
FIG. 8 is a cross-sectional view taken along the line VIII-VIII of the multilayer ceramic capacitor main body of FIG. 7.
Figure 9:
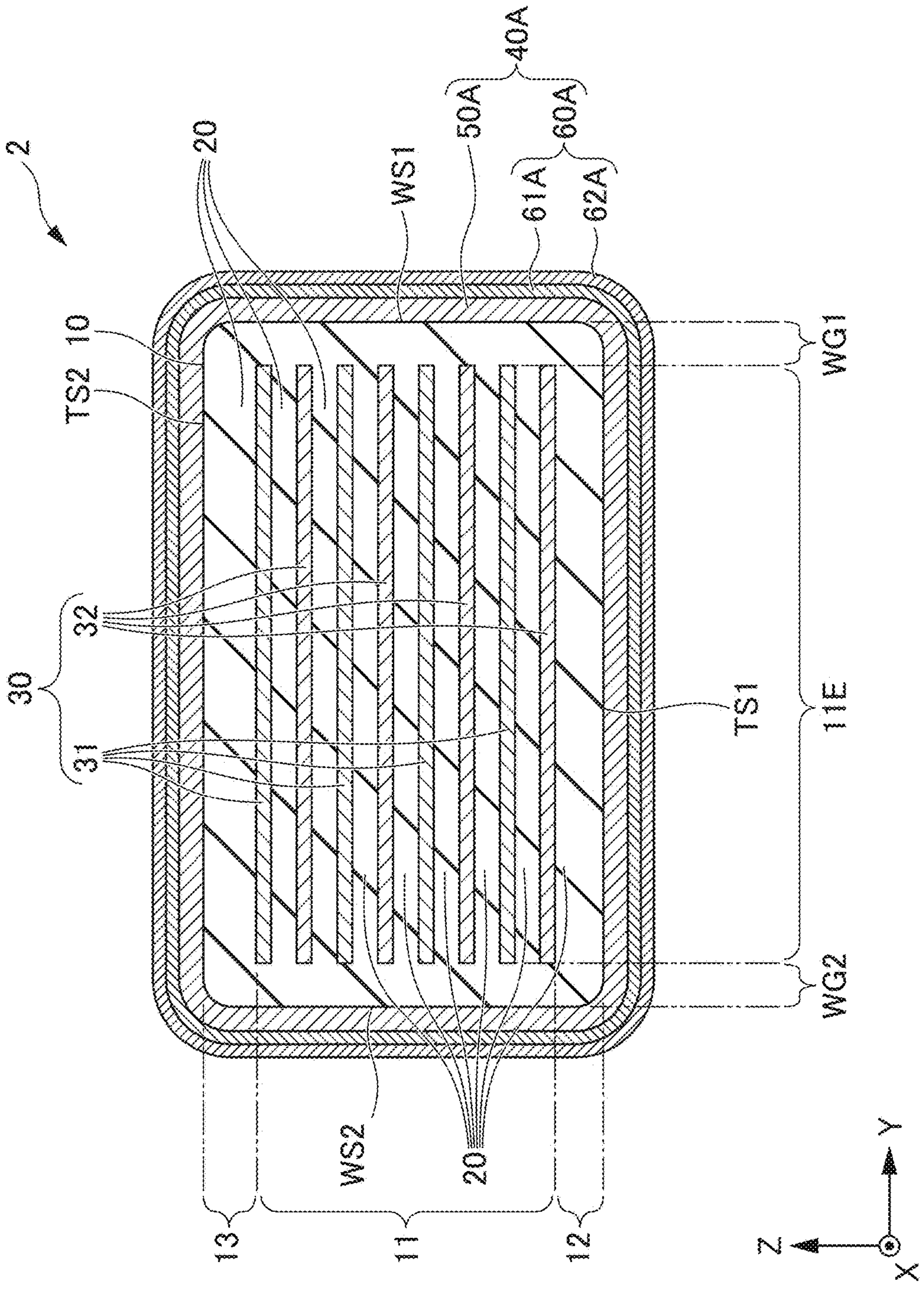
FIG. 9 is a cross-sectional view taken along the line IX-IX of the multilayer ceramic capacitor main body of FIG. 8.
Figure 10:
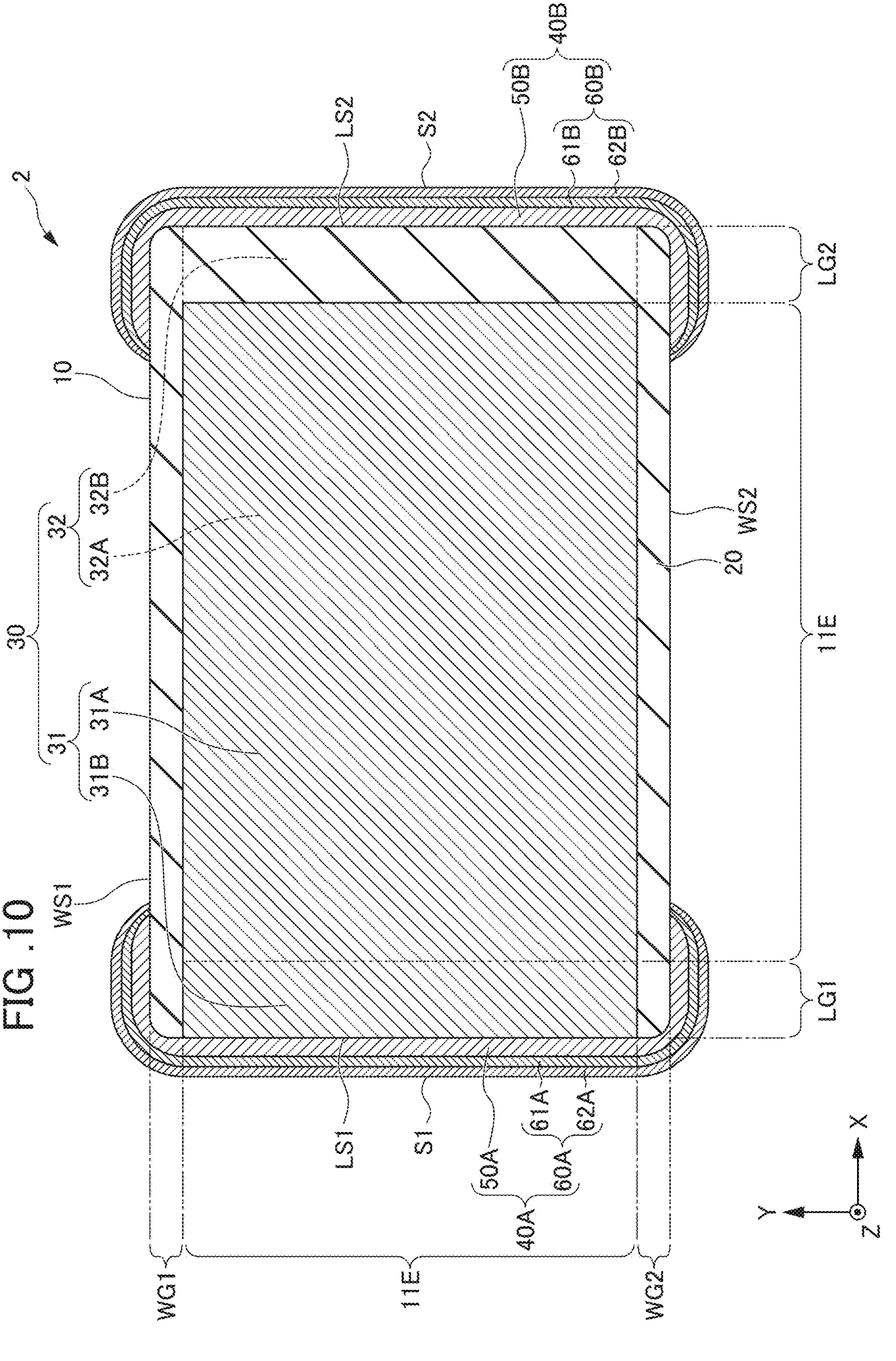
FIG. 10 is a cross-sectional view taken along the line X-X of the multilayer ceramic capacitor main body of FIG. 8.

The multilayer ceramic capacitor main body 2 will also be described with reference to FIGS. 7 to 10, in addition to FIGS. 5 and 6. FIG. 7 is an external perspective view showing the appearance of the multilayer ceramic capacitor main body 2 before being covered with the exterior material 3 and before the metal terminal 100 is attached. FIG. 8 is a cross-sectional view taken along the line VIII-VIII of the multilayer ceramic capacitor main body 2 of FIG. 7. FIG. 9 is a cross-sectional view taken along the line IX-IX of the multilayer ceramic capacitor main body 2 of FIG. 8. FIG. 10 is a cross-sectional view taken along the line X-X of the multilayer ceramic capacitor main body 2 of FIG. 8.

The multilayer ceramic capacitor main body 2 includes a multilayer body 10 and external electrodes 40.

FIGS. 5 to 10 each show an XYZ Cartesian coordinate system. As shown in FIGS. 5 and 7, the length directions L of the multilayer ceramic capacitor main body 2 and the multilayer body 10 correspond to the X direction. The width directions W of the multilayer ceramic capacitor main body 2 and the multilayer body 10 correspond to the Y direction. The height directions T of the multilayer ceramic capacitor main body 2 and the multilayer body 10 correspond to the Z direction. Here, the cross section shown in FIG. 8 is also referred to as a cross section LT. The cross section shown in FIG. 9 is also referred to as a cross section WT. The cross section shown in FIG. 10 is also referred to as a cross section LW. A similar XYZ Cartesian coordinate system is also shown in FIGS. 1 to 4, 11, and 16A to 17B.

As shown in FIGS. 5 to 10, the multilayer body 10 includes a first main surface TS1 and a second main surface TS2 which oppose each other in the height direction T, a first lateral surface WS1 and a second lateral surface WS2 which oppose each other in the width direction W orthogonal or substantially orthogonal to the height direction T, and a first end surface LS1 and a second end surface LS2 which oppose each other in the length direction L orthogonal or substantially orthogonal to the height direction T and the width direction W.

AS shown in FIG. 7, the multilayer body 10 includes a rectangular or substantially rectangular shape. The dimension of the multilayer body 10 in the length direction L is not necessarily longer than the dimension of the width direction W. The multilayer body 10 preferably includes rounded corner portions and rounded ridge portions. The corner portions are portions where the three surfaces of the multilayer body intersect, and the ridge portions are portions where the two surfaces of the multilayer body intersect. In addition, unevenness or the like may be provided on a portion or the whole of the surface of the multilayer body 10.

The dimension of the multilayer body 10 is not particularly limited. However, when the dimension in the length direction L of the multilayer body 10 is defined as L, L is preferably about 0.2 mm or more and about 10 mm or less, for example. When the dimension in the height direction T of the multilayer body 10 is defined as T, T is preferably about 0.1 mm or more and about 10 mm or less, for example. Furthermore, when the dimension in the width direction W of the multilayer body 10 is defined as W, W is preferably about 0.1 mm or more and about 10 mm or less, for example.

As shown in FIGS. 8 and 9, the multilayer body 10 includes an inner layer portion 11, and a first main surface-side outer layer portion 12 and a second main surface-side outer layer portion 13 sandwiching the inner layer portion 11 in the height direction T. The inner layer portion 11 may also be referred to as an active layer portion.

The inner layer portion 11 includes a plurality of dielectric layers 20 functioning as a plurality of ceramic layers, and a plurality of internal electrode layers 30 functioning as a plurality of inner conductive layers. The inner layer portion 11 includes internal electrode layers, in the height direction T, from the internal electrode layer 30 located closest to the first main surface TS1 to the internal electrode layer 30 located closest to the second main surface TS2. In the inner layer portion 11, the plurality of internal electrode layers 30 are opposed to each other with the dielectric layer 20 interposed therebetween. The inner layer portion 11 is a portion that generates a capacitance, and thus substantially functions as a capacitor.

The plurality of dielectric layers 20 are made of a dielectric material. For example, the dielectric material may be a dielectric ceramic including a component such as $BaTiO_3$, $CaTiO_3$, $SrTiO_3$, or $CaZrO_3$. Furthermore, the dielectric material may be obtained by adding a second component such as a Mn compound, an Fe compound, a Cr compound, a Co compound, or a Ni compound to the main component.

The dielectric layers 20 each preferably have a thickness of about 0.5 μm or more and about 72 μm or less, for example. The number of the dielectric layers 20 to be stacked (laminated) is preferably ten or more and 700 or less, for example. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 (internal conductive layer 30) include a plurality of first internal electrode layers 31 (first internal conductive layer 31) and a plurality of second internal electrode layers 32 (second internal conductive layer 32). The plurality of first internal electrode layers 31 are provided on the plurality of dielectric layers 20. The plurality of second internal electrode layers 32 are provided on the plurality of dielectric layers 20. The plurality of first internal electrode layers 31 and the plurality of second internal electrode layers 32 are alternately provided in the height direction T of the multilayer body 10 with the dielectric layers 20 interposed therebetween. The first internal electrode layers 31 and the second internal electrode layers 32 sandwich the dielectric layers 20.

The first internal electrode layer 31 includes a first counter portion 31A that is opposed to the second internal electrode layer 32, and a first extension portion 31B extending from the first counter portion 31A toward the first end surface LS1. The first extension portion 31B is exposed at the first end surface LS1.

The second internal electrode layer 32 includes a second counter portion 32A that is opposed to the first internal electrode layer 31, and a second extension portion 32B extending from the second counter portion 32A toward the second end surface LS2. The second extension portion 32B is exposed at the second end surface LS2.

In the present example embodiment, the first counter portion 31A and the second counter portion 32A are opposed to each other with the dielectric layer 20 interposed therebetween, such that a capacitance is generated, giving the characteristics of a capacitor.

The shapes of the first counter portion 31A and the second counter portion 32A are not particularly limited. However, they are preferably rectangular or substantially rectangular. However, the corner portions of the rectangular shape may be rounded or slanted. The shapes of the first extension portion 31B and the second extension portion 32B are not particularly limited. However, they are preferably rectangular. However, the corner portions of the rectangular shape may be rounded or slanted.

The dimension in the width direction W of the first counter portion 31A and the dimension in the width direction W of the first extension portion 31B may be provided in the same dimensions, or one of them may have a smaller dimension. The dimension in the width direction W of the second counter portion 32A and the dimension in the width direction W of the second extension portion 32B may have the same dimension, or one of them may have a narrower dimension.

The first internal electrode layer 31 and the second internal electrode layer 32 are each made of a metal such as Ni, Cu, Ag, Pd, or Au, or a suitable electrically conductive material such as an alloy including at least one of these metals. In a case in which an alloy is used, the first internal electrode layer 31 and the second internal electrode layer 32 may be made of, for example, a Ag—Pd alloy.

The thickness of each of the first internal electrode layer 31 and the second internal electrode layer 32 is preferably, for example, about 0.2 μm or more and about 3.0 μm or less, for example. The total number of the first internal electrode layers 31 and the second internal electrode layers 32 is preferably five or more and 350 or less, for example.

The first main surface-side outer layer portion 12 is located adjacent to the first main surface TS1 of the multilayer body 10. The first main surface-side outer layer portion 12 is an assembly of a plurality of dielectric layers 20 functioning as ceramic layers located between the first main surface TS1 and the internal electrode layer 30 closest to the first main surface TS1. In other words, the first main surface-side outer layer portion 12 includes a plurality of dielectric layers 20 located between the first main surface TS1 and the internal electrode layer 30 located closest to the first main surface TS1 among the plurality of internal electrode layers 30. The dielectric layers 20 in the first main surface-side outer layer portion 12 may be the same as the dielectric layers 20 in the inner layer portion 11.

The second main surface-side outer layer portion 13 is located adjacent to the second main surface TS2 of the multilayer body 10. The second main surface-side outer layer portion 13 is an assembly of a plurality of dielectric layers 20 located between the second main surface TS2 and the internal electrode layer 30 closest to the second main surface TS2. In other words, the second main surface-side outer layer portion 13 includes a plurality of dielectric layers 20 located between the second main surface TS2 and the internal electrode layer 30 located closest to the second main surface TS2 among the plurality of internal electrode layers 30. The dielectric layers 20 in the second main surface-side outer layer portion 13 may be the same as the dielectric layers 20 in the inner layer portion 11.

As described above, the multilayer body 10 includes the laminated plurality of dielectric layers 20 and the plurality of internal electrode layers 30 laminated on the dielectric layer 20. That is, the multilayer ceramic capacitor 1 includes the multilayer body 10 including the dielectric layers 20 and the internal electrode layers 30 alternately laminated therein.

The multilayer body 10 includes a counter electrode portion 11E. The counter electrode portion 11E refers to a portion where a first counter portion 31A of each of the first internal electrode layers 31 and a second counter portion 32A of each of the second internal electrode layers 32 are opposed to each other. The counter electrode portion 11E defines and functions as a portion of the inner layer portion 11. FIG. 8 shows the range of the counter electrode portion 11E in the length direction L. FIG. 9 shows the range of the counter electrode portion 11E in the width direction W. FIG. 10 shows the ranges of the width direction W and the length direction L of the counter electrode portion 11E. The counter electrode portion 11E is also referred to as a capacitor active portion.

The multilayer body 10 includes a lateral surface-side outer layer portion. The lateral surface-side outer layer portion includes a first lateral surface-side outer layer portion WG1 and a second lateral surface-side outer layer portion WG2. The first lateral surface-side outer layer portion WG1 includes the dielectric layers 20 located between the counter electrode portion 11E and the first lateral surface WS1. The second lateral surface-side outer layer portion WG2 includes the dielectric layers 20 located between the counter electrode portion 11E and the second lateral surface WS2. FIG. 9 and FIG. 10 each show the ranges in the width direction W of the first lateral surface-side outer layer portion WG1 and the second lateral surface-side outer layer portion WG2. The first lateral surface-side outer layer portion WG1 and the second lateral surface-side outer layer portion WG2 are also referred to as W gaps or side gaps.

The multilayer body 10 includes an end surface-side outer layer portion. The end surface-side outer layer portion includes a first end surface-side outer layer portion LG1 and a second end surface-side outer layer portion LG2. The first end surface-side outer layer portion LG1 includes the dielectric layers 20 located between the counter electrode portion 11E and the first end surface LS1, and the first extension portions 31B. The second end surface-side outer layer portion LG2 includes the dielectric layers 20 located between the counter electrode portion 11E and the second end surface LS2, and the second extension portion 32B. FIG. 8 and FIG. 10 each show the ranges in the length direction L of the first end surface-side outer layer portion LG1 and the second end surface-side outer layer portion LG2. The first end surface-side outer layer portion LG1 and the second end surface-side outer layer portion LG2 are also referred to as L gaps or end gaps.

The external electrode 40 includes a first external electrode 40A provided on the first end surface LS1 and a second external electrode 40B provided on the second end surface LS2.

The first external electrode 40A is provided at least on a portion of the first main surface TS1 adjacent to the first end surface LS1. The first external electrode 40A is preferably provided at least on the first end surface LS1 and a portion on the first main surface TS1. In the present example embodiment of the present invention, the first external electrode 40A is provided on the first end surface LS1, a portion of the first main surface TS1, a portion of the second main surface TS2, a portion of the first lateral surface WS1, and a portion of the second lateral surface WS2. Furthermore, in the present example embodiment of the present invention, the first external electrode 40A is connected to the first internal electrode layers 31 on the first end surface LS1. Furthermore, for example, the first external electrode 40A may extend from the first end surface LS1 to a portion of the first main surface TS1. In other words, the cross-section of the first external electrode 40A may have an L shape (not shown). The portion provided on the first main surface TS1 of the first external electrode 40A is connected to a first metal terminal 100A described later.

The length L1 in the length direction L of the first external electrode 40A provided on the first main surface TS1 is preferably about 10% or more and about 40% or less (for example, about 20 μm or more and about 4000 μm or less) of the dimension L of the multilayer body, for example. In a case in which the first external electrode 40A is provided on the second main surface TS2, the first lateral surface WS1, and the second lateral surface WS2, the length L1 in the length direction L of the first external electrode 40A provided on these surfaces is also preferably about 10% or more and about 40% or less (for example, about 20 μm or more and about 4000 μm or less) of the dimension L of the multilayer body, for example.

The length W1 in the width direction W of the first external electrode 40A provided on the first main surface TS1 is preferably a dimension (for example, about 0.1 mm or more and about 10 mm or less) equal or substantially equal to the dimension W of the multilayer body 10. In a case in which the first external electrode 40A is also provided on the second main surface TS2, the length W1 in the width direction W of the first external electrode 40A provided on the second main surface TS2 is preferably a dimension equal or substantially equal to the dimension W of the multilayer body 10 (for example, about 0.1 mm or more and about 10 mm or less). Furthermore, in a case in which the first external electrode 40A is provided on at least one surface of the first lateral surface WS1 or the second lateral surface WS2, the length T1 in the height direction T of the first external electrode 40A provided on this portion is preferably a dimension equal or substantially equal to the dimension T of the multilayer body 10 (for example, about 0.1 mm or more and about 10 mm or less).

The second external electrode 40B is provided at least on a portion of the first main surface TS1 adjacent to the second end surface LS2. The second external electrode 40B is preferably provided at least on the second end surface LS2 and a portion on the first main surface TS1. In the present example embodiment of the present invention, the second external electrode 40B is provided on the second end surface LS2, a portion of the first main surface TS1, a portion of the second main surface TS2, a portion of the first lateral surface WS1, and a portion of the second lateral surface WS2. Furthermore, in the present example embodiment of the present invention, the second external electrode 40B is connected to the second internal electrode layers 32 on the second end surface LS2. Furthermore, for example, the second external electrode 40B may extend from the second end surface LS2 to a portion of the first main surface TS1. In other words, the cross-section of the second external electrode 40B may have an L shape (not shown). The portion provided on the first main surface TS1 of the second external electrode 40B is connected to a second metal terminal 100B described later via a bonding material.

The length L2 in the length direction L of the second external electrode 40B provided on the first main surface TS1 is preferably about 10% or more and about 40% or less (for example, about 20 μm or more and about 4000 μm or less) of the dimension L of the multilayer body, for example. In a case in which the second external electrode 40B is provided on the second main surface TS2, the first lateral surface WS1, and the second lateral surface WS2, the length L2 in the length direction L of the second external electrode 40B provided on these surfaces is also preferably about 10% or more and about 40% or less (for example, about 20 μm or more and about 4000 μm or less) of the dimension L of the multilayer body, for example.

The length W1 in the width direction W of the second external electrode 40B provided on the first main surface TS1 is preferably a dimension (for example, about 0.1 mm or more and about 10 mm or less) equal or substantially equal to the dimension W of the multilayer body 10. In a case in which the second external electrode 40B is also provided on the second main surface TS2, the length W1 in the width direction W of the second external electrode 40B provided on the second main surface TS2 is preferably a dimension equal or substantially equal to the dimension W of the multilayer body 10 (for example, about 0.1 mm or more and about 10 mm or less). Furthermore, in a case in which the second external electrode 40B is provided on at least one surface of the first lateral surface WS1 or the second lateral surface WS2, the length T1 in the height direction T of the second external electrode 40B provided on this portion is preferably a dimension equal or substantially equal to the dimension T of the multilayer body 10 (for example, about 0.1 mm or more and about 10 mm or less).

As shown in FIG. 7, in the present example embodiment of the present invention, the length L3 in the length direction L of the portion of the surface of the multilayer body 10 exposed from the external electrode 40 is preferably about 20% or more and about 80% or less (for example, about 40 μm or more and about 8000 μm or less) of the dimension L of the multilayer body. In other words, the separation distance L3 between the first external electrode 40A and the second external electrode 40B is preferably about 20% or more and about 80% or less (for example, about 40 μm or more and about 8000 μm or less) of the dimension L of the multilayer body, for example.

As described above, in the multilayer body 10, the capacitance is generated by the first counter portions 31A of the first internal electrode layers 31 and the second counter portions 32A of the second internal electrode layers 32 being opposed to each other with the dielectric layers 20 interposed therebetween. Therefore, the characteristics of the capacitor are developed between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The first base electrode layer 50A is provided on the first end surface LS1. The first base electrode layer 50A is connected to the first internal electrode layer 31. In the present example embodiment of the present invention, the first base electrode layer 50A extends from the first end surface LS1 to a portion of the first main surface TS1 and to a portion of the second main surface TS2, and to a portion of the first lateral surface WS1 and to a portion of the second lateral surface WS2.

The second base electrode layer 50B is provided on the second end surface LS2. The second base electrode layer 50B is connected to the second internal electrode layer 32. In the present example embodiment of the present invention, the second base electrode layer 50B extends from the second end surface LS2 to a portion of the first main surface TS1 and to a portion of the second main surface TS2, and to a portion of the first lateral surface WS1 and to a portion of the second lateral surface WS2.

In the present example embodiment of the present invention, each of the first base electrode layer 50A and the second base electrode layer 50B is a fired layer. The fired layer preferably includes a metal component and either a glass component or a ceramic component, or alternatively, a metal component and both a glass component and a ceramic component. The metal component includes, for example, at least one of Cu, Ni, Ag, Pd, Ag—Pd alloys, or Au. The glass component includes, for example, at least one of B, Si, Ba, Mg, Al, or Li. As the ceramic component, a ceramic material of the same kind as that of the dielectric layer 20 may be used, or a ceramic material of a different kind may be used. The ceramic component includes, for example, at least one of $BaTiO_3$, $CaTiO_3$, (Ba, Ca) $TiO_3$, $SrTiO_3$, of $CaZrO_3$.

The fired layer is obtained by applying a conductive paste including glass and metal to the multilayer body, and then firing. The fired layer may be obtained by simultaneously firing a multilayer (laminated) chip including the internal electrode layers and the dielectric layers, and an electrically conductive paste applied to the multilayer chip, or alternatively may be obtained by firing the multilayer chip including the internal electrode layers and the dielectric layers to thereby obtain a multilayer body, followed by the electrically conductive paste being applied to the multilayer body and then firing being performed. In a case in which the multilayer chip including the internal electrode layers and the dielectric layers, and the electrically conductive paste applied to the multilayer chip are fired simultaneously, it is preferable that the firing layer is formed by firing a material to which a ceramic material is added instead of the glass component. In this case, it is particularly preferable to use the same type of ceramic material as the dielectric layer 20 as the ceramic material to be added. Furthermore, the fired layer may include a plurality of layers.

The thickness in the length direction of the first base electrode layer 50A located on the first end surface LS1 is preferably, for example, about 10 μm or more and about 200 μm or less at the middle portion in the height direction T and the width direction W of the first base electrode layer 50A.

The thickness in the length direction of the second base electrode layer 50B located on the second end surface LS2 is preferably, for example, about 10 μm or more and about 200 μm or less at the middle portion in the height direction T and the width direction W of the second base electrode layer 50B.

In a case in which the first base electrode layer 50A is provided on a portion of the surface of at least the first main surface TS1 or the second main surface TS2, it is preferable that the thickness in the height direction of the first base electrode layer 50A on the provided surface is, for example, about 5 μm or more and about 40 μm or less at the middle portion in the length direction L and the width direction W of the first base electrode layer 50A on the provided surface.

In a case in which the first base electrode layer 50A is provided on a portion of the surface of at least the first lateral surface WS1 or the second lateral surface WS2, it is preferable that the thickness in the width direction of the first base electrode layer 50A on the provided surface is, for example, about 5 μm or more and about 40 μm or less at the middle portion in the length direction L and the height direction T of the first base electrode layer 50A on the provided surface.

In a case in which the second base electrode layer 50B is provided on a portion of the surface of at least the first main surface TS1 or the second main surface TS2, it is preferable that the thickness in the height direction of the second base electrode layer 50B on the provided surface is, for example, about 5 μm or more and about 40 μm or less at the middle portion in the length direction L and the width direction W of the second base electrode layer 50B on the provided surface.

In a case in which the second base electrode layer 50B is provided on a portion of the surface of at least the first lateral surface WS1 or the second lateral surface WS2, it is preferable that the thickness in the width direction of the second base electrode layer 50B on the provided surface is, for example, about 5 μm or more and about 40 μm or less at the middle portion in the length direction L and the height direction T of the second base electrode layer 50B on the provided surface.

The first base electrode layer 50A and the second base electrode layer 50B are not limited to the fired layer, and each may be a thin film layer. The thin film layer is a layer in which metal particles are deposited, and which is formed by a thin film forming method such as a sputtering method or a deposition method. The thin film layer preferably includes, for example, at least one of Mg, Al, Ti, W, Cr, Cu, Ni, Ag, Co, Mo, or V. Thus, it is possible to increase the adhesion force of the external electrodes 40 to the multilayer body 10. The thin film layer may be a single layer or may include a plurality of layers. For example, the thin film layer may include a two-layer structure of a layer of NiCr and a layer of NiCu.

In a case in which the thin film layer functioning as a base electrode is formed by a sputtered electrode by a sputtering method, the sputtered electrode is preferably formed on a portion of the first main surface TS1 and on a portion of the second main surface TS2 of the multilayer body 10. The sputtered electrode preferably includes at least one metal selected from Ni, Cr, and Cu, for example. The thickness of the sputtered electrode is preferably about 50 nm or more and about 400 nm or less, and more preferably about 50 nm or more and about 130 nm or less, for example.

As the base electrode layer, a sputtered electrode may be provided on a portion of the first main surface TS1 and on a portion of the second main surface TS2 of the multilayer body 10, while a fired layer may be provided on the first end surface LS1 and the second end surface LS2. Alternatively, the base electrode layer may not be provided on the first end surface LS1 and the second end surface LS2, and a plated layer, which will be described later, may be provided directly on the multilayer body 10. In addition, in a case in which a fired layer is provided on the first end surface LS1 and the second end surface LS2, the fired layer may be provided not only on the first end surface LS1 and the second end surface LS2, but also on a portion of the first main surface TS1 and on a portion of the second main surface TS2. In this case, the sputtered electrode may overlap the fired layer.

The first plated layer 60A covers the first base electrode layer 50A.

The second plated layer 60B covers the second base electrode layer 50B.

The first plated layer 60A and the second plated layer 60B may include at least one of Cu, Ni, Sn, Ag, Pd, Ag—Pd alloy, and Au, for example. Each of the first plated layer 60A and the second plated layer 60B may include a plurality of layers. The first plated layer 60A and the second plated layer 60B are preferably a two-layer structure in which a Sn-plated layer is provided on the Ni-plated layer.

The first plated layer 60A covers the first base electrode layer 50A. In the present example embodiment of the present invention, the first plated layer 60A includes a first Ni-plated layer 61A and a first Sn-plated layer 62A located on the first Ni-plated layer 61A.

The second plated layer 60B covers the second base electrode layer 50B. In the present example embodiment of the present invention, the second plated layer 60B includes a second Ni-plated layer 61B and a second Sn-plated layer 62B located on the second Ni-plated layer 61B.

The Ni-plated layer prevents the first base electrode layer 50A and the second base electrode layer 50B from being eroded by solder functioning as the bonding material 5 to bond the multilayer ceramic capacitor main body 2 and the metal terminal 100. Furthermore, the Sn-plated layer improves the wettability of the solder functioning as the bonding material 5 (to be described later) to bond the multilayer ceramic capacitor main body 2 and the metal terminal 100. This facilitates the bonding of the multilayer ceramic capacitor main body 2 and the metal terminal 100. In a case in which each of the first plated layer 60A and the second plated layer 60B is a two-layer structure of the Ni-plated layer and the Sn-plated layer, the thickness of each of the Ni-plated layer and the Sn-plated layer is preferably about 1 μm or more and about 15 μm or less, for example.

Furthermore, each of the first external electrode 40A and the second external electrode 40B of the present example embodiment may include an electrically conductive resin layer including, for example, electrically conductive particles and a thermosetting resin. In a case in which the electrically conductive resin layer is provided as the base electrode layer (the first base electrode layer 50A, the second base electrode layer 50B), the electrically conductive resin layer may cover the fired layer or may be provided directly on the multilayer body 10 without providing the fired layer. In a case in which the electrically conductive resin layer covers the fired layer, the conductive resin layer is provided between the fired layer and the plated layer (the first plated layer 60A, the second plated layer 60B). The electrically conductive resin layer may completely cover the fired layer or may partially cover the fired layer.

The electrically conductive resin layer including a thermosetting resin is more flexible than an electrically conductive layer made of, for example, a plated film or a fired product of an electrically conductive paste. Therefore, even when an impact caused by physical shock or thermal cycle to the multilayer ceramic capacitor 1 is applied, the electrically conductive resin layer functions as a buffer layer. Accordingly, crack generation of the multilayer ceramic capacitor 1 is reduced or prevented.

The metal of the electrically conductive particles may be Ag, Cu, Ni, Sn, Bi, or an alloy including them. The electrically conductive particles preferably include Ag. The electrically conductive particles are metal powders of Ag, for example. Ag is suitable for electrode materials because of its lowest specific resistance among metals. Since Ag is a noble metal, it hardly oxidizes and the weatherability is high. Therefore, the metal powder of Ag is suitable as electrically conductive particles.

Furthermore, the electrically conductive particles may be a metal powder in which the surface of the metal powder is coated with Ag. In a case in which the metal powder coated with Ag is used, the metal powder is preferably Cu, Ni, Sn, Bi or an alloy powder thereof. In order to make the metal of the base material inexpensive while maintaining the Ag characteristics, it is preferable to use a metal powder coated with Ag.

Furthermore, the electrically conductive particles may be provided by subjecting Cu or Ni to an oxidation prevention treatment. The electrically conductive particles may be a metal powder obtained by coating the surface of the metal powder with Sn, Ni, or Cu. In a case in which the metal powder coated with Sn, Ni, or Cu is used, the metal powder is preferably Ag, Cu, Ni, Sn, or Bi or an alloy powder thereof.

The shape of the electrically conductive particles is not particularly limited. The electrically conductive particles may have a spherical shape, a flat shape, or the like. However, it is preferable to use a mixture of spherical and flat metal powders.

The electrically conductive particles included in the electrically conductive resin layer mainly secure the electric conductivity of the electrically conductive resin layer. More specifically, the plurality of electrically conductive particles are brought into contact with each other to provide an electric current-carrying path inside the electrically conductive resin layer.

The resin of the electrically conductive resin layer may include, for example, at least one of various known thermosetting resins such as epoxy resin, phenol resin, urethane resin, silicone resin, or polyimide resin. Among them, epoxy resins excellent in heat resistance, moisture resistance, adhesiveness and the like are the most suitable resins. Furthermore, the resin of the electrically conductive resin layer preferably includes a curing agent together with the thermosetting resin. In a case in which an epoxy resin is used as the base resin, the curing agent of the epoxy resin may be any of various known compounds such as phenolic, amine-based, acid anhydride-based, imidazole-based, active ester-based, or amideimide-based compounds.

In addition, the electrically conductive resin layer may include a plurality of layers. The thickness of the thickest portion of the electrically conductive resin layer is preferably about 10 μm or more and about 150 μm or less, for example.

In addition, the first plated layer 60A and the second plated layer 60B (to be described later) may be directly provided on the multilayer body 10 without providing the first base electrode layer 50A and the second base electrode layer 50B. In other words, the multilayer ceramic capacitor 1 may include a plated layer that is electrically connected directly to the first internal electrode layers 31 and the second internal electrode layers 32. In such a case, a plated layer may be provided after placing a catalyst on the surface of the multilayer body 10 as a pretreatment.

Also in this case, the plated layer preferably includes a plurality of layers. Each of a lower plated layer and a lower plated layer preferably includes at least one of Cu, Ni, Sn, Pb, Au, Ag, Pd, Bi, Zn, or the like, or an alloy including these metals. The lower plated layer is more preferably formed using Ni having solder barrier performance. The upper plated layer is more preferably formed using Sn or Au having good solder wettability. Furthermore, in a case in which, for example, the first internal electrode layers 31 and the second internal electrode layers 32 are formed using Ni, it is preferable that the lower plated layer is formed using Cu having good bonding property with Ni. In addition, the upper plated layer may be provided as necessary, and the external electrode 40 may only include the lower plated layer. Furthermore, in the plated layer, the upper plated layer may be the outermost layer, or another plated layer may be further formed on the surface of the upper plated layer.

The thickness per layer of the plated layer without providing the base electrode layer is preferably about 2 μm or more and about 10 μm or less, for example. The plated layer preferably does not include glass. The proportion of metal per unit volume of the plated layer is preferably about 99% by volume or more, for example.

In a case in which the plated layer is provided directly on the multilayer body 10, it is possible to reduce the thickness of the base electrode layer. Therefore, it is possible to reduce the dimension in the height direction T of the multilayer ceramic capacitor main body 2 by the amount of the reduction in thickness of the base electrode layer, thereby reducing the height of the multilayer ceramic capacitor main body 2. Alternatively, it is possible to increase the thickness of the dielectric layers 20 sandwiched between the first internal electrode layers 31 and the second internal electrode layers 32 by the amount of the reduction in thickness of the base electrode layer, thereby improving the thickness of the base body. In this way, by providing the plated layer directly on the multilayer body 10, it is possible to improve the degree of freedom in designing the multilayer ceramic capacitor.

When the dimension in the length direction of the multilayer ceramic capacitor main body 2 including the multilayer body 10 and the external electrode 40 is defined as the dimension L, L is preferably about 0.2 mm or more and about 10 mm or less, for example. When the dimension in the height direction of the multilayer ceramic capacitor main body 2 is defined as the dimension T, T is preferably about 0.1 mm or more and about 10 mm or less, for example. When the dimension in the width direction of the multilayer ceramic capacitor main body 2 is defined as the dimension W, W is preferably about 0.1 mm or more and about 10 mm or less, for example.

In the present example embodiment, the first surface S1 on the first end surface LS1 of the multilayer ceramic capacitor main body 2 is the surface of the first external electrode 40A provided on the first end surface LS1. The second surface S2 on the second end surface LS2 of the multilayer ceramic capacitor main body 2 is the surface of the second external electrode 40B provided on the second end surface LS2.

Figure 11:
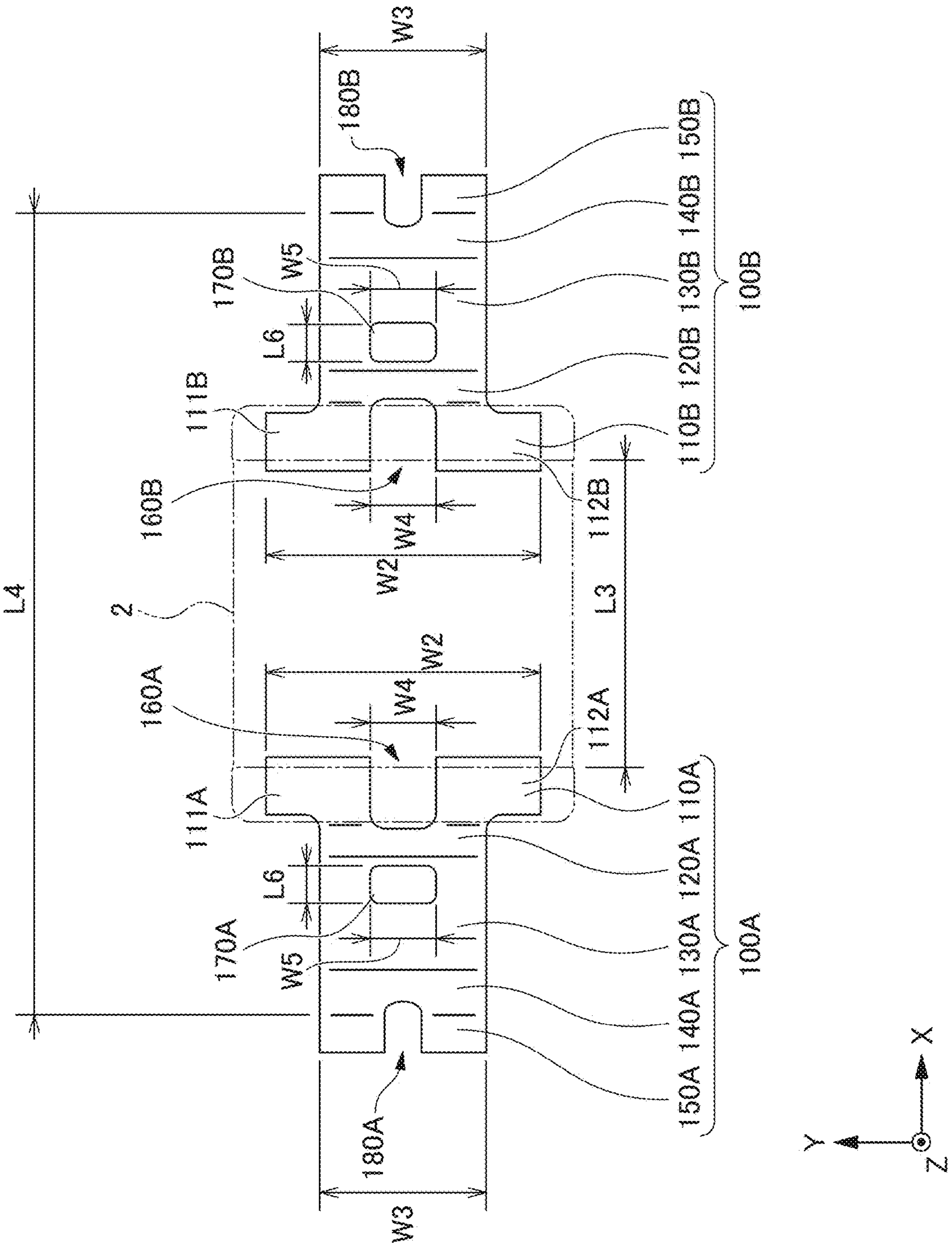
FIG. 11 is a view corresponding to FIG. 4, and is a view showing a metal terminal when the exterior material and the multilayer ceramic capacitor main body are excluded.

The metal terminal 100 will be described with reference to FIG. 11 in addition to FIGS. 1 to 6. FIG. 11 is a view corresponding to FIG. 4, and is an arrow view as seen in the height direction from the second main surface TS2 toward the first main surface TS1, showing the metal terminal 100 when the exterior material 3 and the multilayer ceramic capacitor main body 2 are excluded. In FIG. 11, the profile of the multilayer body 10 and the external electrode 40 of the multilayer ceramic capacitor main body 2 are indicated by a two-dot chain line.

The metal terminal 100 includes a first metal terminal 100A and a second metal terminal 100B.

The first metal terminal 100A and the second metal terminal 100B are metal terminals to be mounted on a mounting surface of a mounting substrate (refer to the mounting substrate 310 in FIGS. 16A and 16B) to be described later on which the multilayer ceramic capacitor 1 is to be mounted. The first metal terminal 100A and the second metal terminal 100B are, for example, plate-shaped lead frames. In the present example embodiment, the first main surface TS1 of the multilayer body 10 is a surface opposed to the mounting surface of the mounting substrate on which the multilayer ceramic capacitor 1 is to be mounted.

The first metal terminal 100A includes a first bonding portion 110A that is opposed to the first main surface TS1 and connected to the first external electrode 40A, a first rising portion 120A that is connected to the first bonding portion 110A, extends away from the mounting surface of the mounting substrate, and is opposed to the first end surface LS1, a first extension portion 130A that is connected to the first rising portion 120A and extends away from the multilayer ceramic capacitor main body 2 in the length direction L, a first falling portion 140A that is connected to the first extension portion 130A and extends toward the mounting surface side of the mounting substrate, and a first mounting portion 150A that is connected to the first falling portion 140A and extends in the direction along the mounting surface of the mounting substrate. As shown in FIGS. 6, a gap portion G exists between the first rising portion 120A and the first surface S1 on the first end surface LS1 of the multilayer ceramic capacitor main body 2. Details of the first metal terminal 100A will be described later.

The second metal terminal 100B includes a second bonding portion 110B that is opposed to the first main surface TS1 and connected to the second external electrode 40B, a second rising portion 120B that is connected to the second bonding portion 110B, extends away from the mounting surface of the mounting substrate, and is opposed to the second end surface LS2, a second extension portion 130B that is connected to the second rising portion 120B an extends away from the multilayer ceramic capacitor main body 2 in the length direction L, a second falling portion 140B that is connected to the second extension portion 130B and extends toward the mounting surface side of the mounting substrate, and a second mounting portion 150B that is connected to the second falling portion 140B and extends in the direction along the mounting surface of the mounting substrate. As shown in FIGS. 6, a gap portion G exists between the second rising portion 120B and the second surface S2 on the second end surface LS2 of the multilayer ceramic capacitor main body 2. Details of the second metal terminal 100B will be described later.

In addition, the first falling portion 140A and the second falling portion 140B preferably extend toward the mounting surface of the mounting substrate to an extent such that a gap can be provided between the exterior material 3 of the multilayer ceramic capacitor 1 and the mounting surface of the mounting substrate.

By including such a first metal terminal 100A and a second metal terminal 100B, it is possible to lengthen the distance between the mounting substrate and the multilayer ceramic electronic component main body 2 such that it is possible to achieve an advantageous effect of relieving stress from the mounting substrate. Furthermore, the thickness of the exterior material 3 provided adjacent to the mounting substrate can be increased such that the insulating property can be ensured.

As shown in FIG. 11, the separation distance L4 between the first mounting portion 150A of the first metal terminal 100A and the second mounting portion 150B of the second metal terminal 100B is longer than the separation distance L3 between the first external electrode 40A and the second external electrode 40B of the multilayer ceramic capacitor main body 2.

The bonding material 5 joins the multilayer ceramic capacitor main body 2 and the metal terminal 100. The bonding material 5 includes a first bonding material 5A and a second bonding material 5B.

As shown in FIG. 6, the first metal terminal 100A is connected to the first external electrode 40A through the first bonding material 5A. The second metal terminal 100B is connected to the second external electrode 40B via the second bonding material 5B.

The bonding material 5 is preferably solder. For example, Pb-free solder may be used. As the Pb-free solder, lead-free solder such as Sn—Sb solder, Sn—Ag—Cu solder, Sn—Cu solder, and Sn—Bi solder is preferable. For example, Sn-10Sb to Sn-15Sb solder can be used.

The exterior material 3 will be described with reference to FIGS. 1 to 6.

The exterior material 3 includes a first main surface MTS1 and a second main surface MTS2 which are opposed to each other in the height direction T, a first lateral surface MWS1 and a second lateral surface MWS2 which are opposed to each other in the width direction W orthogonal or substantially orthogonal to the height direction T, and a first end surface MLS1 and a second end surface MLS2 which are opposed to each other in the length direction L orthogonal or substantially orthogonal to the height direction T and the width direction W. The first end surface MLS1 of the exterior material 3 is a surface of the exterior material 3 and is located adjacent to the first end surface LS1 of the multilayer body 10. The second end surface MLS2 of the exterior material 3 is a surface of the exterior material 3 and is located adjacent to the second end surface LS2 of the multilayer body 10.

The first lateral surface MWS1, the second lateral surface MWS2, the first end surface MLS1, and the second end surface MLS2 of the exterior material 3 have a parting line PL in the middle portion in the height direction T. The parting line PL is a line corresponding to a split surface of a mold for use in molding the exterior material 3. The surface of the exterior material 3 is provided with a draft angle with the parting line PL serving as a boundary.

The first lateral surface MWS1 of the exterior material 3 includes a first main surface-side surface MWS1A and a second main surface-side surface MWS1B. The second lateral surface MWS2 of the exterior material 3 includes a first main surface-side surface MWS2A and a second main surface-side surface MWS2B. The first end surface MLS1 of the exterior material 3 includes a first main surface-side surface MLS1A and a second main surface-side surface MLS1B. The second end surface MLS2 of the exterior material 3 includes a first main surface-side surface MLS2A and a second main surface-side surface MLS2B. The surface on the first main surface side and the surface on the second main surface side are separated from each other with the parting line PL as a boundary.

Each of the surfaces MWSIA, MWS2A, MLS1A and MLS2A on the first main surface side is provided with a draft angle such that the cross-sectional area of the cross section LW of the exterior material 3 becomes smaller as approaching the first main surface TS1 from the parting line PL. Each of the surfaces MWS1B, MWS2B, MLS1B, and MLS2B on the second main surface side is provided with a draft angle such that the cross-sectional area of the cross section LW of the exterior material 3 becomes smaller as approaching the second main surface TS2 from the parting line PL.

The exterior material 3 covers the multilayer ceramic capacitor main body 2, the bonding material 5 connecting the multilayer ceramic capacitor main body 2 and the metal terminal 100 with each other, and a portion of the metal terminal 100. More specifically, the exterior material 3 covers the entire multilayer ceramic capacitor main body 2, the entire first bonding material 5A and second bonding material 5B, a portion of the first metal terminal 100A, and a portion of the second metal terminal 100B.

For example, the exterior material 3 covers the entire first bonding portion 110A, the entire first rising portion 120A, and at least a portion of the first extension portion 130A of the first metal terminal 100A. Furthermore, the exterior material 3 covers the entire second bonding portion 110B, the entire second rising portion 120B, and at least a portion of the second extension portion 130B of the second metal terminal 100B.

In the present example embodiment, the first extension portion 130A of the first metal terminal 100A protrudes from the first end surface MLS1 of the exterior material 3 and is partially exposed. The second extension portion 130B of the second metal terminal 100B protrudes from the second end surface MLS2 of the exterior material 3 and is partially exposed. More specifically, the first extension portion 130A of the first metal terminal 100A protrudes from the parting line PL of the first end surface MLS1 of the exterior material 3 and is partially exposed. The second extension portion 130B of the second metal terminal 100B protrudes from the parting line PL of the second end surface MLS2 of the exterior material 3 and is partially exposed.

The second main surface MTS2 of the exterior material 3 is preferably formed in a planar shape having a predetermined flatness. With such a configuration, it is possible to prevent improper suction adhesion of the mounter of the mounting machine for use in mounting the multilayer ceramic capacitor 1 on the mounting substrate. Therefore, it is possible to reliably mount the multilayer ceramic capacitor 1 on the mounting substrate. As a result, it is possible to reduce or prevent the occurrence of mounting defects.

The minimum distance from the second main surface MTS2 of the exterior material 3 to the surface of the multilayer ceramic capacitor main body 2 is preferably about 100 μm or more and about 4000 μm or less, for example. The minimum distance from the first main surface MTS1 of the exterior material 3 to the first bonding portion 110A of the first metal terminal 100A is preferably about 100 μm or more and about 4000 μm or less, for example. The minimum distance from the first lateral surface MWS1 of the exterior material 3 to the surface of the multilayer ceramic capacitor main body 2 is preferably about 100 μm or more and about 4000 μm or less, for example. The minimum distance from the second lateral surface MWS2 of the exterior material 3 to the surface of the multilayer ceramic capacitor main body 2 is preferably about 100 μm or more and about 4000 μm or less, for example. The minimum distance from the first end surface MLS1 of the exterior material 3 to the surface of the multilayer ceramic capacitor main body 2 is preferably about 300 μm or more and about 5000 μm or less, for example. The minimum distance from the second end surface MLS2 of the exterior material 3 to the surface of the multilayer ceramic capacitor main body 2 is preferably about 300 μm or more and about 5000 μm or less, for example. The average distance in the length direction L from the surface MLS1A on the first main surface side of the first end surface MLS1 of the exterior material 3 to the first rising portion 120A of the first metal terminal 100A is preferably about 200 μm or more and about 4900 μm or less, for example. The average distance in the length direction L from the surface MLS2A on the first main surface side of the second end surface MLS2 of the exterior material 3 to the second rising portion 120B of the second metal terminal 100B is preferably about 200 μm or more and about 4900 μm or less, for example.

The exterior material 3 is preferably made of resin. For example, the exterior material 3 may be formed by molding engineering plastic by transfer molding, injection molding, or the like. In particular, the material of the exterior material 3 preferably includes a thermosetting epoxy resin. With such a configuration, adhesion between the exterior material 3, and the multilayer ceramic capacitor main body 2 and the metal terminal 100 can be ensured, such that it is possible to achieve the advantageous effect of improving the withstand voltage and moisture resistance. The exterior material 3 may be formed, for example, by applying a liquid or powdery silicone-based or epoxy-based resin.

In this way, by the exterior material 3 covering the conductive metal portion such as the external electrode 40 and the metal terminal 100 over a wide range, it is possible to ensure the insulating surface distance (creeping distance) between the conductors. Furthermore, by covering the conductive metal portion over a wide range with the exterior material 3, it is possible to avoid the risk of surface discharge.

The shape of the exterior material 3 is not particularly limited. For example, a truncated cone such as a truncated pyramid may be used. The shape of the corner portion of the exterior material 3 is not particularly limited, and may be rounded.

In addition to FIG. 5, FIGS. 6, and 11, with reference to FIGS. 12A to 12F, a description will be given of a configuration around the bonding portion between the metal terminal 100 and the external electrode 40 of the multilayer ceramic capacitor main body 2, and details of the metal terminal 100.

Figure 12A:
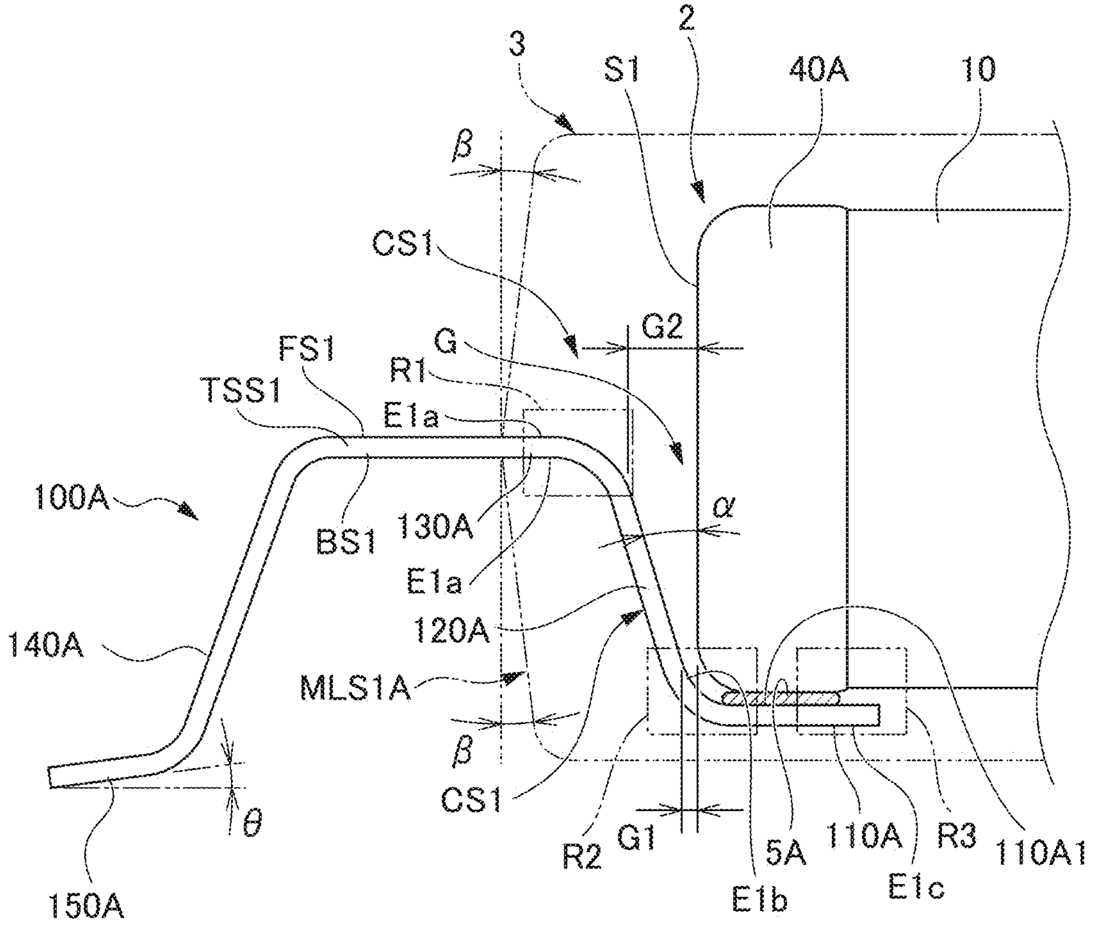
FIG. 12A is an enlarged view of a portion XIIA of the multilayer ceramic capacitor shown in FIG. 6.
Figure 12B:
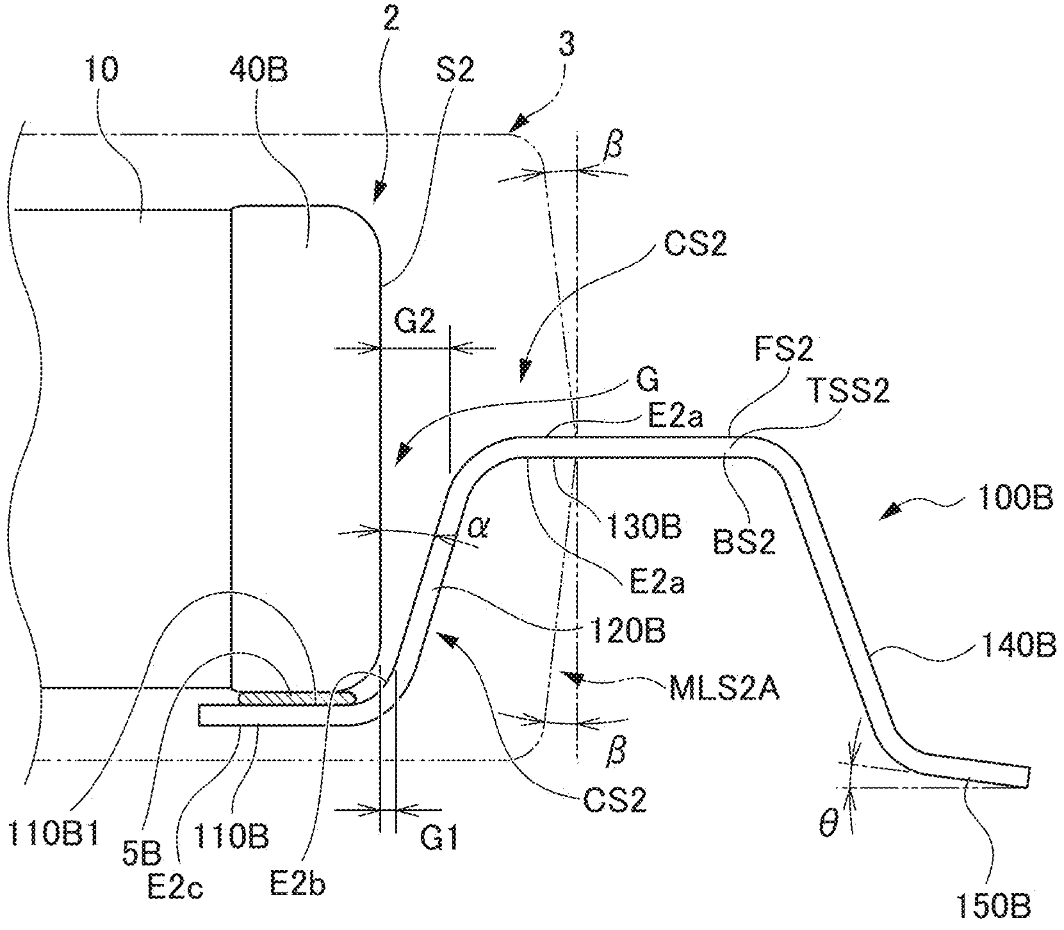
FIG. 12B is an enlarged view of a portion XIIB of the multilayer ceramic capacitor shown in FIG. 6.
Figure 12C:
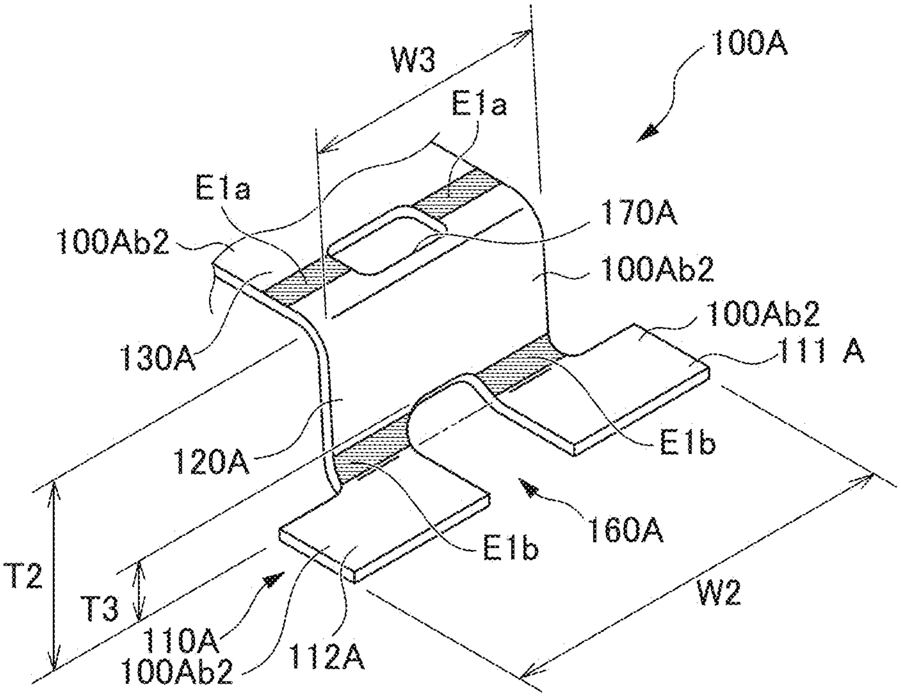
FIG. 12C is a partial external perspective view of a first metal terminal.

FIG. 12A is an enlarged view of a portion XIIA of the multilayer ceramic capacitor 1 shown in FIG. 6, and is a view for explaining the configuration around the bonding portion between the first external electrode 40A and the first metal terminal 100A, and the details of the first metal terminal 100A. FIG. 12B is an enlarged view of a portion XIIB of the multilayer ceramic capacitor 1 shown in FIG. 6, and is a view for explaining the configuration around the bonding portion between the second external electrode 40B and the second metal terminal 100B, and the details of the second metal terminal 100B. FIG. 12C is a partial external perspective view of the first metal terminal 100A.

As shown in FIG. 12A, a gap portion G exists between the first rising portion 120A of the first metal terminal 100A and the first surface S1 on the first end surface LS1 of the multilayer ceramic capacitor main body 2, and the gap portion G is filled with the exterior material 3. In the present example embodiment, the first surface S1 is the surface of the first external electrode 40A on the first end surface LS1. That is, in the present example embodiment, the gap portion G is provided between the first rising portion 120A and the first surface S1 of the first external electrode 40A on the first end surface LS1, and the gap portion G is filled with the exterior material 3. The average distance in the length direction L of the gap portion G is preferably about 50 μm or more and about 1500 μm or less, for example. With such a configuration, it is possible to reliably prevent the contact between the first external electrode 40A and the first rising portion 120A without increasing the dimensions of the multilayer ceramic capacitor 1. In addition, it is possible to appropriately fill the gap portion G with the exterior material 3, and it is possible to reduce or prevent occurrence of problems such as solder splash during reflow at the time of substrate mounting.

The first rising portion 120A is sloped away from the first surface S1 on the first end surface LS1 of the multilayer ceramic capacitor main body 2 from the connection portion with the first bonding portion 110A toward the connection portion with the first extension portion 130A. With such a configuration, the distance in the length direction L of the gap portion G increases from a position closer to the mounting surface of the mounting substrate as approaching a position spaced farther away from the mounting surface. That is, a distance G2 in the length direction L at a position away from the mounting surface of the gap portion G is longer than a distance G1 in the length direction L at a position close to the mounting surface of the gap portion G. The angle α between the first rising portion 120A and the first surface S1 on the first end surface LS1 of the multilayer ceramic capacitor main body 2 is preferably about 1° or more and about 40° or less, for example.

Here, the surface MLS1A, which is a surface of the first end surface MLS1 of the exterior material 3, functions as a first sloped surface of the exterior material 3, and is located adjacent to the first main surface and closer to the mounting surface than the portion where the first extension portion 130A protrudes. The first sloped surface MLS1A (the surface MLS1A, which is a surface of the first end surface MLS1) is sloped away from the first surface S1 of the multilayer ceramic capacitor main body 2 from a position close to the mounting surface as approaching a position away from the mounting surface. The draft angle β of the first sloped surface MLS1A is preferably about 1° or more and about 20° or less, for example. The angle between the first rising portion 120A and the first sloped surface MLS1A is preferably about 30° or less, for example. In this way, the first rising portion 120A and the first sloped surface MLS1A are sloped in the same or a similar direction, and the difference between the slope angles of the first rising portion 120A and the first sloped surface MLS1A is reduced, such that it is possible to make the distance from the first sloped surface MLS1A of the exterior material 3 to the first rising portion 120A of the first metal terminal 100A substantially constant. With such a configuration, it is possible to secure the strength around the first rising portion 120A to which a force is easily applied.

As shown in FIG. 12B, a gap portion G exists between the second rising portion 120B of the second metal terminal 100B and the second surface S2 on the second end surface LS2 of the multilayer ceramic capacitor main body 2, and the gap portion G is filled with the exterior material 3. In the present example embodiment, the second surface S2 is the surface of the second external electrode 40B on the second end surface LS2. That is, in the present example embodiment, the gap portion G is provided between the second rising portion 120B and the second surface S2 of the second external electrode 40B provided on the second end surface LS2, and the gap portion G is filled with the exterior material 3. The average distance in the length direction L of the gap G is preferably about 50 μm or more and about 1500 μm or less, for example. With such a configuration, it is possible to reliably prevent the contact between the second external electrode 40B and the second rising portion 120B without increasing the dimensions of the multilayer ceramic capacitor 1. In addition, it is possible to appropriately fill the gap portion G with the exterior material 3, and it is possible to reduce or prevent the occurrence of problems such as solder splash during reflow at the time of substrate mounting.

The second rising portion 120B is sloped away from the second surface S2 on the second end surface LS2 of the multilayer ceramic capacitor main body 2 from the connection portion with the second bonding portion 110B as approaching the connection portion with the second extension portion 130B. With such a configuration, the distance in the length direction L of the gap portion G increases from a position closer to the mounting surface of the mounting substrate as approaching a position spaced farther away from the mounting surface. That is, a distance G2 in the length direction L at a position away from the mounting surface of the gap portion G is longer than a distance G1 in the length direction L at a position close to the mounting surface of the gap portion G. The angle α between the second rising portion 120B and the second surface S2 on the second end surface LS2 of the multilayer ceramic capacitor main body 2 is preferably about 1° or more and about 40° or less, for example.

Here, the surface MLS2A, which is a surface of the second end surface MLS2 of the exterior material 3, functions as a second sloped surface of the exterior material 3, and is located adjacent to the first main surface side and closer to the mounting surface than the portion where the second extension portion 130B protrudes. The second sloped surface MLS2A (the surface MLS2A, which is a surface of the second end surface MLS2) is sloped away from the second surface S2 of the multilayer ceramic capacitor main body 2 from a position close to the mounting surface toward a position away from the mounting surface. The draft angle β of the second sloped surface MLS2A is preferably about 1° or more and about 20° or less, for example. The angle between the second rising portion 120B and the second sloped surface MLS2A is preferably about 30° or less, for example. In this way, the second rising portion 120B and the second sloped surface MLS2A are sloped in the same or a similar direction, and the difference between the slope angles of the second rising portion 120B and the second sloped surface MLS2A is reduced, such that it is possible to make the distance from the second sloped surface MLS2A of the exterior material 3 to the second rising portion 120B of the second metal terminal 100B substantially constant. With such a configuration, it is possible to secure the strength around the second rising portion 120B to which a force is easily applied.

The average distance in the length direction L from the surface MLS1A of the first main surface side of the first end surface MLS1 of the exterior material 3 to the first rising portion 120A of the first metal terminal 100A is preferably about 0.133 times or more the average distance in the length direction L of the gap portion G, for example. More preferably, it is about 4 times or more and about 98 times or less, for example. More preferably, it is about 6 times or more and about 98 times or less, for example. With such a configuration, it is possible to secure the strength around the first rising portion 120A to which a force is easily applied. It is also possible to improve moisture resistance.

The average distance in the length direction L from the surface MLS2A on the first main surface side of the second end surface MLS2 of the exterior material 3 to the second rising portion 120B of the second metal terminal 100B is preferably about 0.133 times or more the average distance in the length direction L of the gap portion G, for example. More preferably, it is about 4 times or more and about 98 times or less, for example. More preferably, it is about 6 times or more and about 98 times or less, for example. With such a configuration, it is possible to secure the strength around the second rising portion 120B to which a force is easily applied. It is also possible to improve moisture resistance.

The measurement of the average distance in the length direction L of each of the measurement target portions such as the abovementioned gap portion G and a predetermined portion of the exterior material 3 is performed by the following method. First, the multilayer ceramic capacitor 1 is cross-sectionally polished to about one half in the W dimension to expose a specific LT cross section in which the cross section of the metal terminal 100 can be confirmed. Then, the LT cross section of the multilayer ceramic capacitor 1 exposed by polishing is observed by SEM. Next, in the measurement target portion, ten lines extending in the length direction L are drawn at equal intervals in the height T direction, and an average of distances of the ten lines is set as an average distance in the length direction L of the measurement target portion in the present example embodiment.

FIG. 12C is an external perspective view showing a portion of the appearance of the first metal terminal 100A as an example of the metal terminal 100. The first metal terminal 100A and the second metal terminal 100B are generally plane-symmetrical with respect to the cross section WT at the middle in the length direction L of the multilayer ceramic capacitor 1. Therefore, the external perspective view (not shown) of the second metal terminal 100B is basically the same as the external perspective view of the first metal terminal 100A.

The first metal terminal 100A includes a first notch 160A, a first opening portion 170A, and a third notch 180A.

The first notch 160A continuously extends from the end of the first bonding portion 110A to a position in the middle of the first rising portion 120A. With such a configuration, for example, when the exterior material 3 is molded, the resin of the exterior material 3 flows through the first notch 160A, such that the gap portion G is easily filled with the resin. Furthermore, since the resin of the exterior material 3 is provided in the first notch 160A, the resin on one surface side and the resin on the other surface side of the first rising portion 120A of the first metal terminal 100A are connected by the resin in the first notch 160A, such that the structure becomes stronger. Since the cut-away portion of the first notch 160A reaches a position in the middle of the first rising portion 120A, the strength of the first metal terminal 100A is ensured. Since the first rising portion 120A of the present example embodiment is sloped as described above, for example, during molding of the exterior material 3, the resin of the exterior material 3 is likely to enter the gap portion G and flow through the first notch 160A.

As shown in FIG. 12C, the rising height T3 of the first notch 160A in the height direction T is preferably half or less the rising height T2 of the first rising portion 120A in the height direction T. With such a configuration, for example, when the exterior material 3 is molded, it is possible to ensure the strength of the first metal terminal 100A, while ensuring the flowability of the resin of the exterior material 3.

The first bonding portion 110A includes a first bonding piece 111A adjacent to the first lateral surface WS1 and a second bonding piece 112A adjacent to the second lateral surface WS2 which are divided by the first notch 160A.

The first opening portion 170A is provided at the first extension portion 130A. As described above, by providing the first opening portion 170A in addition to the first notch 160A in the first metal terminal 100A, it is possible to further enhance the flowability of the resin of the exterior material 3 during molding of the exterior material 3, for example. Furthermore, since the resin of the exterior material 3 is provided in the first opening portion 170A, the resin on one surface side and the resin on the other surface side of the first extension portion 130A of the first metal terminal 100A are connected by the resin provided in the first opening portion 170A, such that the structure becomes stronger. According to the above configuration, it is preferable that the same material constituting the exterior material 3 is provided in the portion of the first notch 160A provided in the first rising portion 120A and the first opening portion 170A. With such a configuration, the structure of the multilayer ceramic capacitor 1 becomes strong.

The third notch 180A continuously extends from the end of the first mounting portion 150A to a position in the middle of the first falling portion 140A.

As shown in FIGS. 11 and 12C, the length W2 in the width direction of the first bonding portion 110A of the first metal terminal 100A is longer than the length W3 in the width direction of the first rising portion 120A. With such a configuration, it is possible to ensure a wide bonding area between the first external electrode 40A and the first metal terminal 100A by the first bonding material 5A. In particular, even when the first notch 160A is provided as described above, it is still possible to ensure a wide bonding area between the first external electrode 40A and the first metal terminal 100A by the first bonding material 5A.

The length W4 in the width direction W of the first notch 160A may be equal to or substantially equal to the length W5 in the width direction W of the first opening portion 170A. The rising height T3 of the first notch 160A in the height direction T may be approximately the same as the length L6 in the length direction L of the first opening portion 170A. For example, the area of the first notch 160A in the first rising portion 120A may fall within a range from about 50% to about 200% of the area of the first opening portion 170A, for example. With such a configuration, for example, when the exterior material 3 is molded, the resin of the exterior material 3 flows in a well-balanced manner.

The second metal terminal 100B includes a second notch 160B, a second opening portion 170B, and a fourth notch 180B.

The second notch 160B continuously extends from the end of the second bonding portion 110B to a position in the middle of the second rising portion 120B. With such a configuration, for example, when the exterior material 3 is molded, the resin of the exterior material 3 flows through the second notch 160B, such that the gap portion G is easily filled with the resin. Furthermore, since the resin of the exterior material 3 is provided in the second notch 160B, the resin on one surface side and the resin on the other surface side of the second rising portion 120B of the second metal terminal 100B are connected by the resin in the second notch 160B, such that the structure becomes stronger. Since the cut-away portion of the second notch 160B reaches a position in the middle of the second rising portion 120B, the strength of the second metal terminal 100B is ensured. Since the second rising portion 120B of the present example embodiment is sloped as described above, for example, during molding of the exterior material 3, the resin of the exterior material 3 is likely to enter the gap portion G and flow through the second notch 160B.

The rising height T3 of the second notch 160B in the height direction T is preferably about half or less the rising height T2 of the second rising portion 120B in the height direction T, for example. With such a configuration, for example, when the exterior material 3 is molded, it is possible to ensure the strength of the second metal terminal 100B while ensuring the flowability of the resin of the exterior material 3.

The second bonding portion 110B includes a third bonding piece 111B adjacent to the first lateral surface WS1 and a fourth bonding piece 112B adjacent to the second lateral surface WS2 which are divided by the second notch 160B.

The second opening portion 170B is provided at the second extension portion 130B. With such a configuration, by providing the second metal terminal 100B with the second opening portion 170B in addition to the second notch 160B described above, it is possible to further enhance the flowability of the resin of the exterior material 3 during molding of the exterior material 3, for example. Furthermore, since the resin of the exterior material 3 is provided in the second opening portion 170B, the resin on one surface side and the resin on the other surface side of the second extension portion 130B of the second metal terminal 100B are connected by the resin in the second opening portion 170B, such that the structure becomes stronger. According to the above configuration, it is preferable that the same material constituting the exterior material 3 is provided in the portion of the second notch 160B provided in the second rising portion 120B and the second opening portion 170B. With such a configuration, the structure of the multilayer ceramic capacitor 1 becomes strong.

The fourth notch 180B continuously extends from the end of the second mounting portion 150B to a position in the middle of the second falling portion 140B.

As shown in FIG. 11, the length W2 in the width direction of the second bonding portion 110B of the second metal terminal 100B is longer than the length W3 in the width direction of the second rising portion 120B. With such a configuration, it is possible to ensure a wide bonding area between the second external electrode 40B and the second metal terminal 100B by the second bonding material 5B. In particular, even when the second notch 160B is provided as described above, it is still possible to ensure a wide bonding area between the second external electrode 40B and the second metal terminal 100B by the second bonding material 5B.

The length W4 in the width direction W of the second notch 160B may be equal to or substantially equal to the length W5 in the width direction W of the second opening portion 170B. The rising height T3 of the second notch 160B in the height direction T may be approximately the same as the length L6 in the length direction L of the second opening portion 170B. For example, the area of the second notch 160B provided in the second rising portion 120B may fall within a range from about 50% to about 200% of the area of the second opening portion 170B, for example. With such a configuration, for example, when the exterior material 3 is molded, the resin of the exterior material 3 flows in a well-balanced manner.

The first mounting portion 150A may extend parallel to the mounting surface along the mounting surface, or may extend to be sloped in a direction away from the mounting surface as approaching the connection portion with the first falling portion 140A. The second mounting portion 150B may extend parallel to the mounting surface along the mounting surface, or may extend to be sloped in a direction away from the mounting surface as approaching the connection portion with the second falling portion 140B. With such a configuration, when the multilayer ceramic capacitor 1 is mounted on the mounting substrate, it is possible for the bonding material to extend to this portion, and thus, it is possible to increase the strength in mounting. The slope angle θ is preferably about 1° or more and about 10° or less, for example.

When the dimension in the length direction of the multilayer ceramic capacitor 1 including the exterior material 3 and the metal terminal 100 is defined as L, the L dimension is preferably about 3.2 mm or more and about 20 mm or less, for example. When the dimension in the lamination direction of the multilayer ceramic capacitor 1 is defined as T, the T dimension is preferably about 1.0 mm or more and about 10 mm or less, for example. When the dimension in the width direction of the multilayer ceramic capacitor 1 is defined as W, the W dimension is preferably about 1.5 mm or more and about 20 mm or less, for example.

Next, with reference to FIGS. 12D to 12F in addition to FIGS. 12A and 12B, the state of the surface of the metal terminal 100 and the like will be described as further details of the metal terminal 100.

Figure 12D:
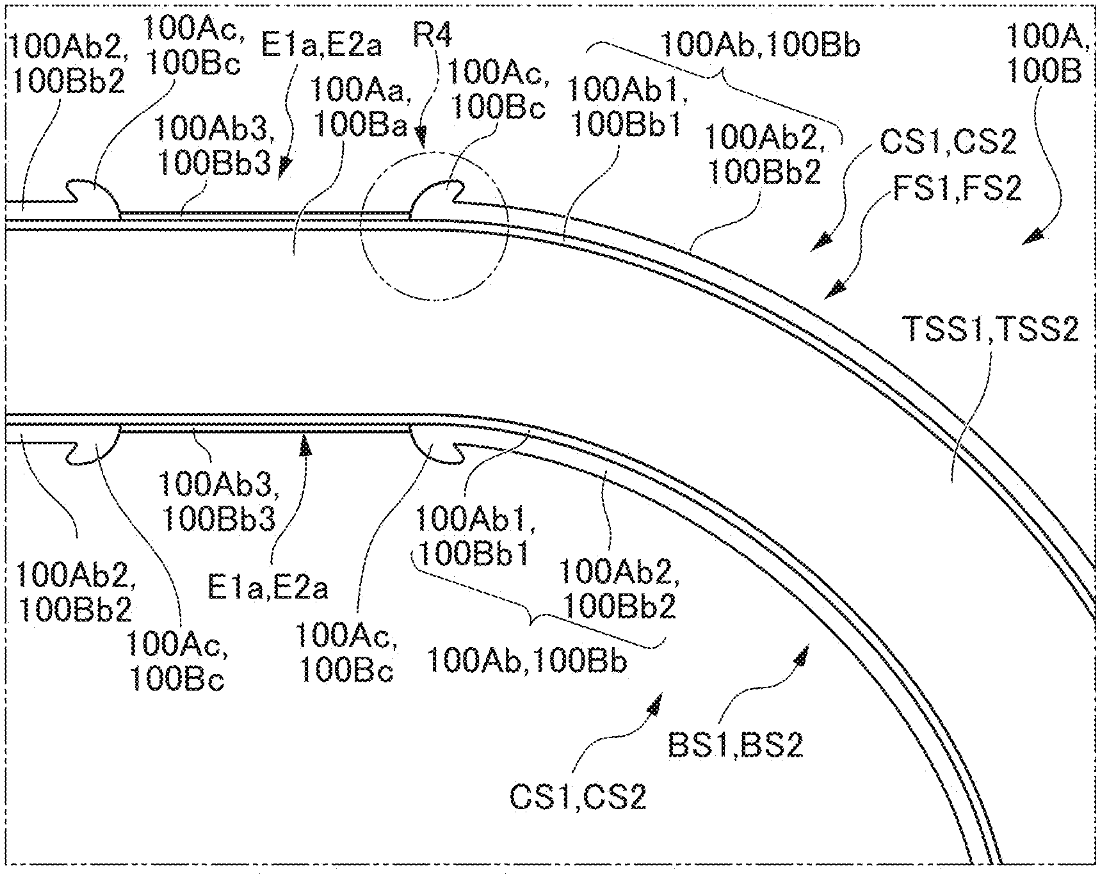
FIG. 12D is an enlarged view of a portion R1 of the multilayer ceramic capacitor shown in FIG. 12A.

FIG. 12D is an enlarged view of a portion R1 of the first metal terminal 100A of the multilayer ceramic capacitor 1 shown in FIG. 12A. FIG. 12E is an enlarged view of a portion R2 of the first metal terminal 100A of the multilayer ceramic capacitor 1 shown in FIG. 12A. FIG. 12F is an enlarged view of a portion R3 of the first metal terminal 100A of the multilayer ceramic capacitor 1 shown in FIG. 12A. As described above, the first metal terminal 100A and the second metal terminal 100B are substantially plane-symmetric with respect to the WT cross section at the center in the length direction L of the multilayer ceramic capacitor 1. Therefore, the enlarged view of the second metal terminal 100B has the same shape as the enlarged view of the first metal terminal 100A, which is symmetrical with respect to the plane of the drawing. Therefore, in FIGS. 12D to 12F, in addition to the reference numerals given to the respective configurations of the first metal terminal 100A, the reference numerals in the second metal terminal 100B are also given, and FIGS. 12D to 12F are used as enlarged views for explaining the first metal terminal 100A and the second metal terminal 100B.

The first metal terminal 100A of the present example embodiment includes a first bonding surface 110A1 bonded to the first bonding material 5A and a first contact surface CS1 in contact with the exterior material 3, and the first contact surface CS1 in contact with the exterior material 3 includes a surface of a first outermost surface plated film 100Ab2 functioning as the first outermost surface metal film and surfaces E1*a*, E1*b*, and E1*c* of a first intermetallic compound 100Ab3 functioning as a first low wettability surface and having lower wettability than the surface of the first outermost surface plated film 100Ab2. The second metal terminal 100B includes a second bonding surface 110B1 bonded to the second bonding material 5B and a second contact surface CS2 in contact with the exterior material 3, and the second contact surface CS2 in contact with the exterior material 3 includes a surface of a second outermost surface plated film 100Bb2 functioning as the second outermost surface metal film and surfaces E2*a*, E2*b*, and E2*c* of the second intermetallic compound 100Bb3 functioning as a second low wettability surface and having lower wettability than the surface of the second outermost surface plated film 100Bb2. Details thereof will be described below.

As shown in FIG. 12A, the first metal terminal 100A includes a plate-shaped structure including a first front surface FS1 functioning as a first surface on the first bonding surface 110A1 to which the first external electrode 40A is bonded, a first opposite surface BS1 functioning as a first back surface which is a surface opposite to the first front surface FS1, and a first terminal lateral surface TSS1 connecting the first front surface FS1 and the first opposite surface BS1.

The first bonding portion 110A of the first metal terminal 100A includes the first bonding surface 110A1 bonded to the first bonding material 5A on the first front surface FS1. A portion of the surface of the first metal terminal 100A buried in the exterior material 3 includes a first contact surface CS1 in contact with the exterior material 3 except for the first bonding surface 110A1. As described above, the first metal terminal 100A includes the first bonding surface 110A1 bonded to the first bonding material 5A and the first contact surface CS1 in contact with the exterior material 3.

As illustrated in FIG. 12B, the second metal terminal 100B includes a plate-shaped structure including a second front surface FS2 functioning as a second surface adjacent to the second bonding surface 110B1 to which the second external electrode 40B is bonded, a second opposite surface BS2 functioning as a second back surface which is a surface opposite to the second front surface FS2, and a second terminal lateral surface TSS2 connecting the second front surface FS2 and the second opposite surface BS2.

The second bonding portion 110B of the second metal terminal 100B includes the second bonding surface 110B1 bonded to the second bonding material 5B on the second front surface FS2. A portion of the surface of the second metal terminal 100B buried in the exterior material 3 includes a second contact surface CS2 in contact with the exterior material 3 except for the second bonding surface 110B1. As described above, the second metal terminal 100B includes the second bonding surface 110B1 bonded to the second bonding material 5B and the second contact surface CS2 in contact with the exterior material 3.

Figure 12E:
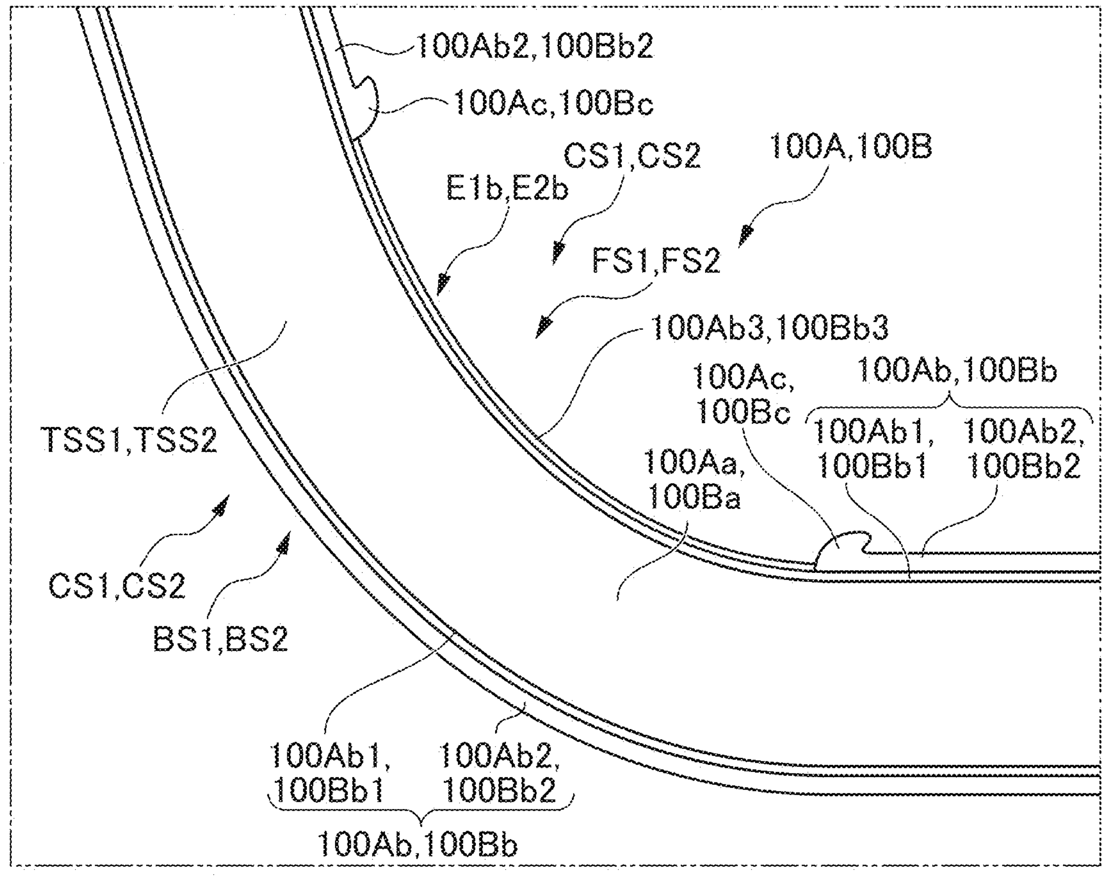
FIG. 12E is an enlarged view of a portion R2 of the multilayer ceramic capacitor shown in FIG. 12A.
Figure 12F:
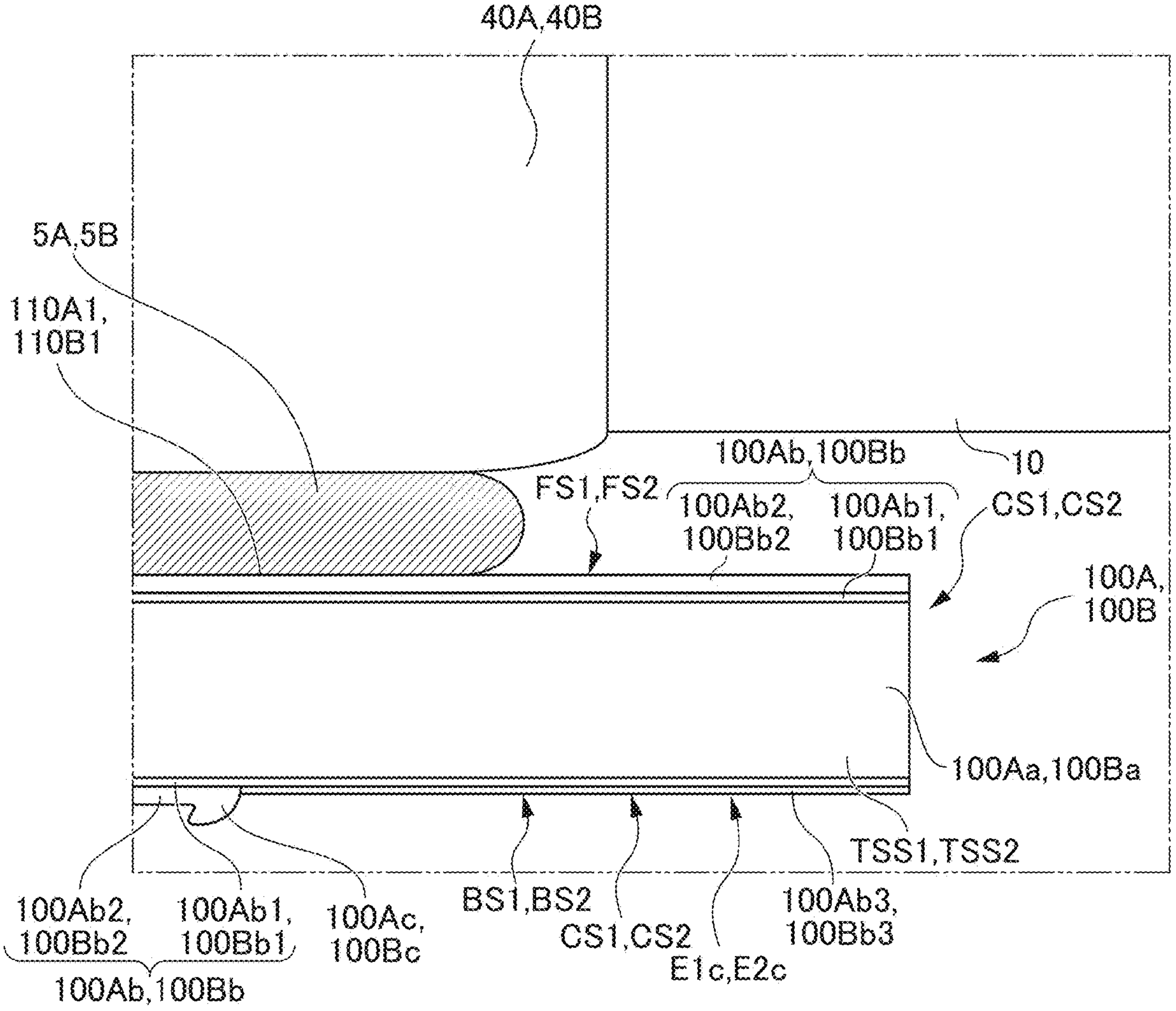
FIG. 12F is an enlarged view of a portion R3 of the multilayer ceramic capacitor shown in FIG. 12A.

As shown in FIGS. 12D to 12F, the first metal terminal 100A includes a first base material 100Aa functioning as a terminal main body and a first plated film 100Ab provided on the surface of the first base material 100Aa.

The first plated film 100Ab of the first metal terminal 100A is provided at least on a portion of the first bonding portion 110A where the first bonding material 5A is provided and on a portion of the first mounting portion 150A opposed to the mounting surface of the mounting substrate.

As shown in FIGS. 12D to 12F, the second metal terminal 100B includes a second base material 100Ba functioning as the terminal main body and a second plated film 100Bb provided on the surface of the second base material 100Ba.

The second plated film 100Bb of the second metal terminal 100B is provided at least on a portion of the second bonding portion 110B where the second bonding material 5B is provided and on a portion of the second mounting portion 150B opposed to the mounting surface of the mounting substrate.

The plated film preferably includes an outermost surface plated film functioning as an upper layer plated film provided on the outermost surface of the plated film and a lower layer plated film functioning as a base plated film provided below the outermost surface plated film. For example, the plated film may include a two-layer configuration in which the outermost surface plated film is provided on the lower layer plated film.

The first plated film 100Ab of the present example embodiment includes a first outermost surface plated film 100Ab2 of the first outermost surface metal film, and a first lower layer plated film 100Ab1 provided below the first outermost surface plated film 100Ab2. Specifically, the first plated film 100Ab of the present example embodiment includes the first lower layer plated film 100Ab1 functioning as a base plated film covering the surface of the first base material 100Aa, and the first outermost surface plated film 100Ab2 functioning as an upper layer plated film covering the surface of the first lower layer plated film 100Ab1. In other words, the first outermost surface plated film 100Ab2 includes at least the outermost surface portion of the first plated film 100Ab.

The second plated film 100Bb of the present example embodiment includes a second outermost surface plated film 100Bb2 of the second outermost surface metal film, and a second lower layer plated film 100Bb1 provided below the second outermost surface plated film 100Bb2. Specifically, the second plated film 100Bb of the present example embodiment includes the second lower layer plated film 100Bb1 functioning as a base plated film covering the surface of the second base material 100Ba, and the second outermost surface plated film 100Bb2 functioning as an upper layer plated film covering the surface of the second lower layer plated film 100Bb1. In other words, the second outermost surface plated film 100Bb2 includes at least the outermost surface portion of the second plated film 100Bb.

In the configuration of the plated films, the outermost surface plated film includes a surface having higher wettability of solder than the surface of the metal of the base material of the terminal main body. Further, in the configuration of the plated films, the outermost surface plated film includes a surface having higher wettability of solder than the surface of the lower layer plated film. Further, in the configuration of the plated films, the outermost surface plated film includes a surface having higher wettability of solder than the surface of an intermetallic compound described later.

In the present example embodiment, the first contact surface CS1 in contact with the exterior material 3 in the first metal terminal 100A includes a surface of the first outermost surface plated film 100Ab2 functioning as the first outermost surface metal film and surfaces E1*a*, E1*b*, and E1*c* of the first intermetallic compound 100Ab3 functioning as a first low wettability surface and having lower wettability of solder than the first outermost surface plated film 100Ab2.

The first intermetallic compound 100Ab3 may be provided in a layered manner on the first lower layer plated film 100Ab1 and function as a first intermetallic compound layer. The first intermetallic compound 100Ab3 includes an intermetallic compound of a metal of the first outermost surface plated film 100Ab2 and a metal of the first lower layer plated film 100Ab1.

In the present example embodiment, the second contact surface CS2 in contact with the exterior material 3 in the second metal terminal 100B includes a surface of the second outermost surface plated film 100Bb2 functioning as the second outermost surface metal film and surfaces E2*a*, E2*b*, and E2*c* of the second intermetallic compound 100Bb3 functioning as a second low wettability surface and having lower wettability of solder than the second outermost surface plated film 100Bb2.

The second intermetallic compound 100Bb3 may be provided in a layered manner on the second lower layer plated film 100Bb1 and function as a second intermetallic compound layer. The second intermetallic compound 100Bb3 includes an intermetallic compound of a metal of the second outermost surface plated film 100Bb2 and a metal of the second lower layer plated film 100Bb1.

The lower layer plated film is preferably made of Ni, Fe, Cu, Ag, Cr, or an alloy including at least one of these metals as a main component. More preferably, the lower layer plated film is made of Ni, Fe, Cr, or an alloy including at least one of these metals as a main component.

When the lower layer plated film includes Ni, Fe, Cr, or an alloy including at least one of these metals as a main component, the heat resistance of a metal terminal can be improved.

In the first metal terminal 100A according to the present example embodiment, the first lower layer plated film 100Ab1 is a Ni plated film. The thickness of the first lower layer plated film 100Ab1 is preferably about 0.2 μm or more and about 5.0 μm or less, for example. In the second metal terminal 100B according to the present example embodiment, the second lower layer plated film 100Bb1 is a Ni plated film. The thickness of the second lower layer plated film 100Bb1 is preferably about 0.2 μm or more and about 5.0 μm or less, for example.

The outermost surface plated film is preferably made of Sn, Ag, Au, or an alloy including at least one of these metals as a main component. More preferably, the outermost surface plated film is made of Sn or an alloy including Sn as a main component. By forming the outermost surface plated film with Sn or an alloy including Sn as a main component, solderability between the external electrode and the metal terminal can be improved.

In the first metal terminal 100A according to the present example embodiment, the first outermost surface plated film 100Ab2 is a Sn plated film. The thickness of the first outermost surface plated film 100Ab2 is preferably about 1.0 μm or more and about 5.0 μm or less, for example. In the second metal terminal 100B according to the present example embodiment, the second outermost surface plated film 100Bb2 is a Sn plated film. The thickness of the second outermost surface plated film 100Bb2 is preferably about 1.0 μm or more and about 5.0 μm or less, for example.

In the present example embodiment, the first intermetallic compound 100Ab3 and the second intermetallic compound 100Bb3 are an intermetallic compound of Ni and Sn. That is, in the present example embodiment, the first outermost surface plated film 100Ab2 and the second outermost surface plated film 100Bb2 are Sn plated films, the first lower layer plated film 100Ab1 and the second lower layer plated film 100Bb1 are Ni plated films, and the surfaces E1*a*, E1*b*, and E1*c* of the first intermetallic compound 100Ab3 and the surfaces E2*a*, E2*b*, and E2*c* of the second intermetallic compound 100Bb3 include an intermetallic compound of Ni and Sn. Examples of the intermetallic compound of Ni and Sn include $Ni_3Sn_4$. However, the intermetallic compound of Ni and Sn is not limited thereto.

The intermetallic compound may be formed by providing two or more plated films on the terminal main body and then subjecting the plated films to heat treatment. In the present example embodiment, the intermetallic compound of Ni and Sn is provided by conducting heat treatment by laser irradiation to the multilayer structure of the Ni plated film and the Sn plated film. The laser irradiation condition is adjusted at a low output so that the Sn plated film functioning as the outermost surface plated film is not removed by evaporation.

The terminal main body is preferably made of Ni, Fe, Cu, Ag, Cr, or an alloy including at least one of these metals as a main component. For example, the metal of the base material of the terminal main body may be an Fe-42Ni alloy, an Fe-18Cr alloy, or a Cu-8Sn alloy. In addition, from the viewpoint of heat dissipation, the metal of the base material of the terminal main body may be oxygen-free copper or a Cu-based alloy having high thermal conductivity. In this way, by adopting a copper-based material having good thermal conductivity for the material of the terminal main body, it is possible to realize a reduction in ESR and a reduction in thermal resistance. In the present example embodiment, the metal of the base material of the terminal main body may be stainless steel or aluminum having low solder wettability. At least the surface of the metal of the base material of the terminal main body is a surface having lower wettability of solder than the plated film of the outermost surface. The thickness of the terminal main body is preferably about 0.05 mm or more and about 0.5 mm or less, for example.

As described above, the first metal terminal 100A includes the first contact surface CS1 in contact with the exterior material 3. The first contact surface CS1 of the first metal terminal 100A according to the present example embodiment includes, as surfaces in contact with the exterior material 3, a surface of the first outermost surface plated film 100Ab2, the surfaces E1*a*, E1*b*, and E1*c* of the first intermetallic compound 100Ab3, and a surface of the first base material 100Aa.

FIGS. 12D to 12F shows an example of the position of the first intermetallic compound 100Ab3 of the first metal terminal 100A.

In the present example embodiment, the first contact surface CS1 in contact with the exterior material 3 includes surfaces of a plurality of first intermetallic compounds 100Ab3 as surfaces of metals different from the first outermost surface plated film 100Ab2 functioning as the first outermost surface metal film. The surfaces of the first intermetallic compound 100Ab3 include, for example, an intermetallic compound surface E1*a*, an intermetallic compound surface E1*b*, and an intermetallic compound surface E1*c*.

The surfaces E1*b* and E1*a* of the first intermetallic compound 100Ab3 provided on the first contact surface CS1 are spaced apart from each other on the first front surface FS1, and provided on at least a portion of the surface between the first bonding portion 110A and the middle of the first rising portion 120A, and on the first extension portion 130A. Further, the surfaces E1*c* and E1*a* of the first intermetallic compound 100Ab3 provided on the first contact surface CS1 are spaced apart from each other on the first opposite surface BS1 and provided on the first extension portion 130A and the first bonding portion 110A, respectively.

More specifically, as shown in FIG. 12D, the surface E1*a* of the first intermetallic compound 100Ab3 provided on the first contact surface CS1 is provided on the first front surface FS1 and the first opposite surface BS1 of the first extension portion 130A. Further, the surface E1*a* of the first intermetallic compound 100Ab3 is provided at a portion of the first extension portion 130A adjacent to the first rising portion 120A. In the present example embodiment, the surface E1*a* of the first intermetallic compound 100Ab3 is covered with the exterior material 3. That is, the surface E1*a* of the first intermetallic compound 100Ab3 is not exposed from the exterior material 3.

From another point of view, in the first extension portion 130A, the first contact surface CS1 includes the surface E1*a* of the first intermetallic compound 100Ab3 located on the first front surface FS1, the surface E1*a* of the first intermetallic compound 100Ab3 located on the first opposite surface BS1, and a surface of the first base material 100Aa located on the first terminal lateral surface TSS1. As described above, it is preferable to include a portion in which at least one of the surface of the intermetallic compound and the surface of the base material is provided over the entire circumference of the first metal terminal 100A in a portion in the extending direction of the first metal terminal 100A. With such a configuration, the first outermost surface plated film 100Ab2 is divided in the middle in the extending direction of the first metal terminal 100A.

As shown in FIG. 12E, the surface E1*b* of the first intermetallic compound 100Ab3 provided on the first contact surface CS1 is provided on the first front surface FS1 of the first rising portion 120A of the first metal terminal 100A. For example, the surface E1*b* of the first intermetallic compound 100Ab3 is provided adjacent to the connection portion with the first bonding portion 110A in the first rising portion 120A.

From another point of view, the first contact surface CS1 includes the surface E1*b* of the first intermetallic compound 100Ab3 located on the first front surface FS1, the surface of the first outermost surface plated film 100Ab2 located on the first opposite surface BS1, and a surface of the first base material 100Aa located on the first terminal lateral surface TSS1 in at least a portion of the surface between the middle of the first rising portion 120A and the first bonding portion 110A.

Further, as shown in FIG. 12F, the surface E1*c* of the first intermetallic compound 100Ab3 provided on the first contact surface CS1 is provided on the first opposite surface BS1 of the first bonding portion 110A. For example, the surface E1*c* of the first intermetallic compound 100Ab3 is provided on the first contact surface CS1 of the first opposite surface BS1 in the first bonding portion 110A.

From another point of view, in the first bonding portion 110A, the first contact surface CS1 includes a surface of the first outermost surface plated film 100Ab2 located on the first front surface FS1, the surface E1*c* of the first intermetallic compound 100Ab3 located on the first opposite surface BS1, and a surface of the first base material 100Aa located on the first terminal lateral surface TSS1.

The surfaces E1*a*, E1*b*, and E1*c* of the first intermetallic compound 100Ab3 provided on the first contact surface CS1 are separated in the width direction by holes or notches provided in the first metal terminal 100A. Specifically, the surface E1*a* of the first intermetallic compound 100Ab3 is separated in the width direction by the first opening portion 170A. The surface E1*b* of the first intermetallic compound 100Ab3 is separated in the width direction by the first notch 160A. The surface E1*c* of the first intermetallic compound 100Ab3 is separated in the width direction by the first notch 160A.

As described above, the second metal terminal 100B includes the second contact surface CS2 in contact with the exterior material 3. The second contact surface CS2 of the second metal terminal 100B according to the present example embodiment includes, as surfaces in contact with the exterior material 3, a surface of the second outermost surface plated film 100Bb2, the surfaces E2*a*, E2*b*, and E2*c* of the second intermetallic compound 100Bb3, and a surface of the second base material 100Ba.

FIGS. 12D to 12F shows an example of the position of the second intermetallic compound 100Bb3 of the second metal terminal 100B.

In the present example embodiment, the second contact surface CS2 in contact with the exterior material 3 includes surfaces of a plurality of second intermetallic compounds 100Bb3 as surfaces of metals different from the second outermost surface plated film 100Bb2 functioning as the second outermost surface metal film. The surfaces of the second intermetallic compound 100Bb3 include, for example, an intermetallic compound surface E2*a*, an intermetallic compound surface E2*b*, and an intermetallic compound surface E2*c*.

The surfaces E2*b* and E2*a* of the second intermetallic compound 100Bb3 provided on the second contact surface CS2 are spaced apart from each other on the second front surface FS2, and provided on at least a portion of the surface between the middle of the second rising portion 120B and the second bonding portion 110B, and on the second extension portion 130B. Further, the surfaces E2*c* and E2*a* of the second intermetallic compound 100Bb3 provided on the second contact surface CS2 are spaced apart from each other on the second opposite surface BS2 and provided on the second extension portion 130B and the second bonding portion 110B, respectively.

More specifically, as shown in FIG. 12D, the surface E2*a* of the second intermetallic compound 100Bb3 provided on the second contact surface CS2 is provided on the second front surface FS2 and the second opposite surface BS2 of the second extension portion 130B. Further, the surface E2*a* of the second intermetallic compound 100Bb3 is provided at a portion of the second extension portion 130B adjacent to the second rising portion 120B. In the present example embodiment, the surface E2*a* of the second intermetallic compound 100Bb3 is covered with the exterior material 3. That is, the surface E2*a* of the second intermetallic compound 100Bb3 is not exposed from the exterior material 3.

From another point of view, in the second extension portion 130B, the second contact surface CS2 includes the surface E2*a* of the second intermetallic compound 100Bb3 located on the second front surface FS2, the surface E2*a* of the second intermetallic compound 100Bb3 located on the second opposite surface BS2, and a surface of the second base material 100Ba located on the second terminal lateral surface TSS2. As described above, it is preferable to include a portion in which at least one of the surface of the intermetallic compound and the surface of the base material is provided over the entire circumference of the second metal terminal 100B in a portion in the extending direction of the second metal terminal 100B. With such a configuration, the second outermost surface plated film 100Bb2 is divided in the middle in the extending direction of the second metal terminal 100B.

As shown in FIG. 12E, the surface E2*b* of the second intermetallic compound 100Bb3 provided on the second contact surface CS2 is provided on the second front surface FS2 of the second rising portion 120B of the second metal terminal 100B. For example, the surface E2*b* of the second intermetallic compound 100Bb3 is provided adjacent to the connection portion with the second bonding portion 110B in the second rising portion 120B.

From another point of view, the second contact surface CS2 includes the surface E2*b* of the second intermetallic compound 100Bb3 located on the second front surface FS2, the surface of the second outermost surface plated film 100Bb2 located on the second opposite surface BS2, and a surface of the second base material 100Ba located on the second terminal lateral surface TSS2, in at least a portion of the surface between the middle of the second rising portion 120B and the second bonding portion 110B.

Further, as shown in FIG. 12F, the surface E2*c* of the second intermetallic compound 100Bb3 provided on the second contact surface CS2 is provided on the second opposite surface BS2 of the second bonding portion 110B. For example, the surface E2*c* of the second intermetallic compound 100Bb3 is provided on the second contact surface CS2 of the second opposite surface BS2 of the second bonding portion 110B.

From another point of view, in the second bonding portion 110B, the second contact surface CS2 includes a surface of the second outermost surface plated film 100Bb2 located on the second front surface FS2, the surface E2*c* of the second intermetallic compound 100Bb3 located on the second opposite surface BS2, and a surface of the second base material 100Ba located on the second terminal lateral surface TSS2.

The surfaces E2*a*, E2*b*, and E2*c* of the second intermetallic compound 100Bb3 provided on the second contact surface CS2 are separated in the width direction by holes or notches provided in the second metal terminal 100B. Specifically, the surface E2*a* of the second intermetallic compound 100Bb3 is separated in the width direction by the second opening portion 170B. The surface E2*b* of the second intermetallic compound 100Bb3 is separated in the width direction by the second notch 160B. The surface E2*c* of the second intermetallic compound 100Bb3 is separated in the width direction by the second notch 160B.

Figure 13A:
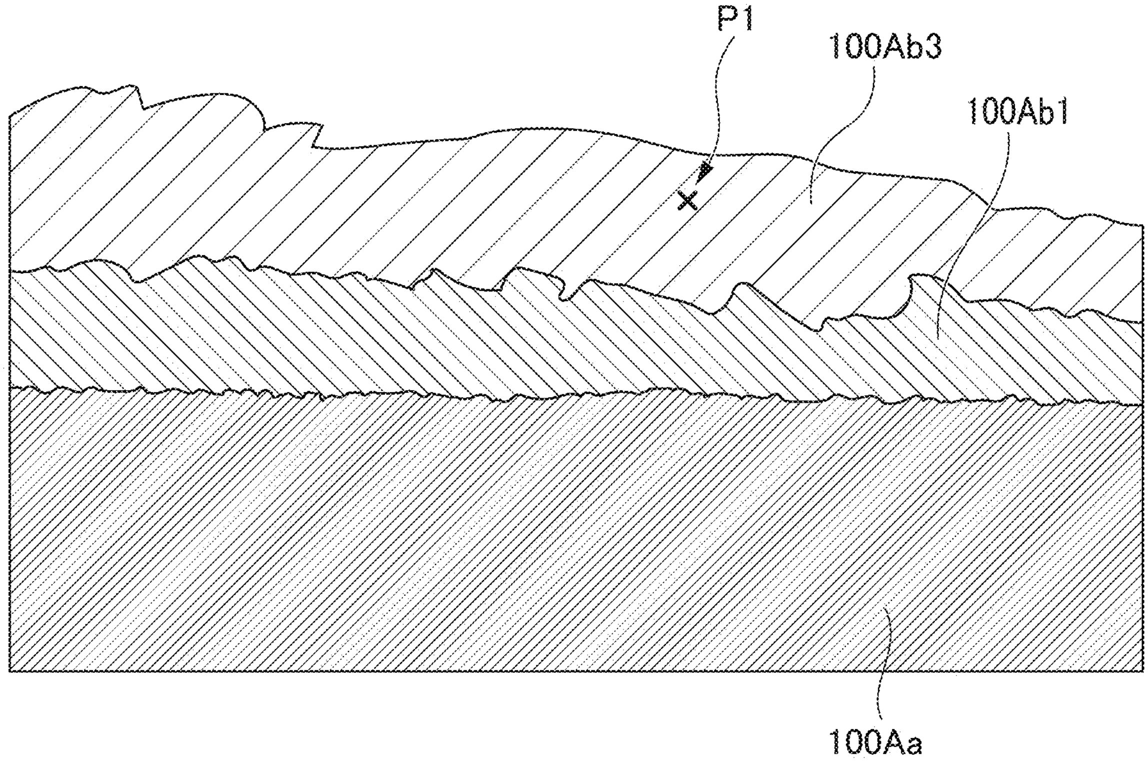
FIG. 13A is an SEM image of a cross section including a surface of an intermetallic compound.
Figure 13B:
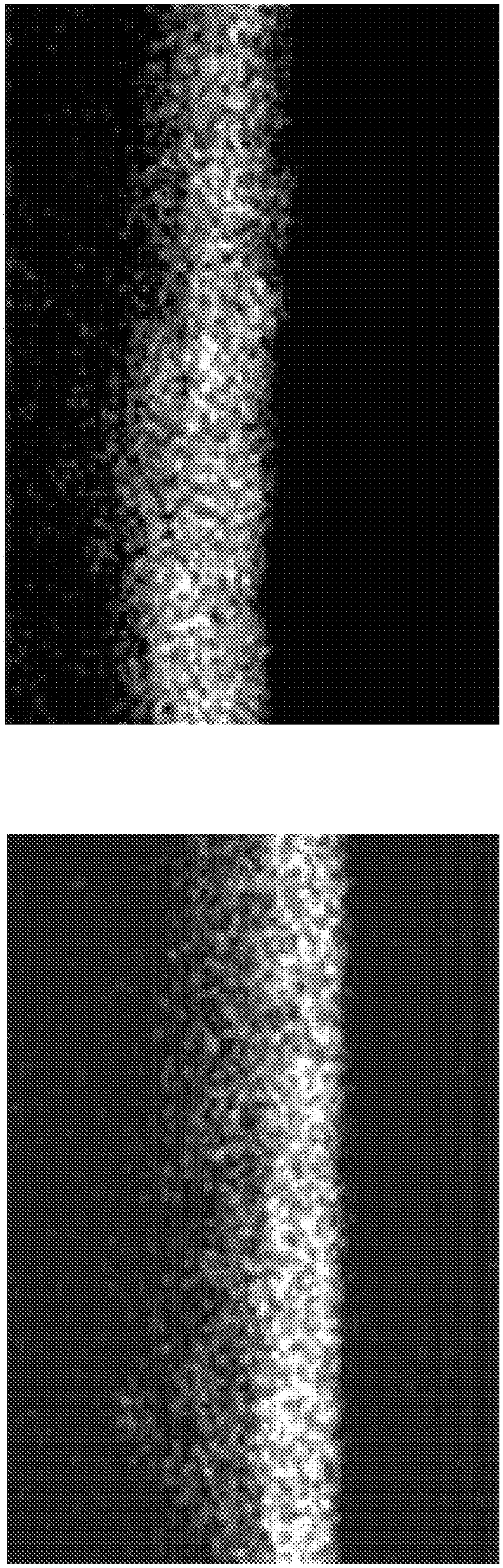
FIG. 13B is an elemental mapping image of SEM-EDX based on the SEM image of FIG. 13A.
Figure 13C:
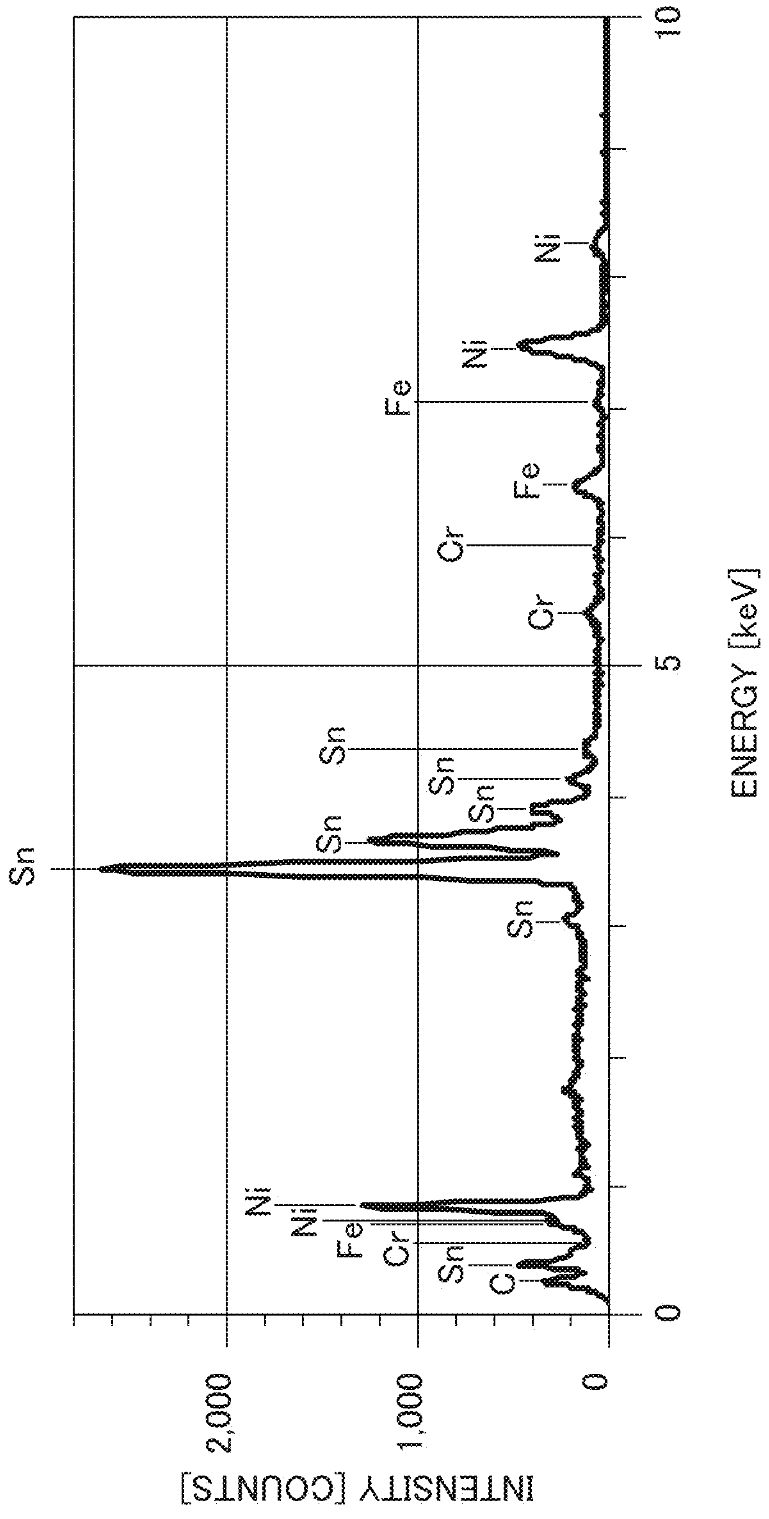
FIG. 13C is a graph showing a characteristic X-ray spectrum display at the position of a measurement point P1 of FIG. 13A.

FIG. 13A is a diagram showing an image obtained by observing a portion of a cross section (a cross section parallel to the LT cross section) of the first metal terminal 100A of the present example embodiment with a scanning electron microscope (SEM). More specifically, FIG. 13A is a diagram showing an SEM image of a cross section including a portion of the surface E1*a* of the first intermetallic compound 100Ab3 adjacent to the first front surface FS1 in FIG. 12A. FIG. 13B is an element mapping image of SEM-EDX based on the SEM image of FIG. 13A, in which the distribution of Ni and the distribution of Sn are mapped. More specifically, among the two left and right images shown in FIG. 13B, the left image is an image in which the distribution of Ni is mapped, and the right image is an image in which the distribution of Sn is mapped. For comparison of the distribution of Ni and the distribution of Sn in the thickness direction, the scale, the angle, and the position in the thickness direction of the two images are shown together. FIG. 13C is a graph showing a characteristic X-ray spectrum display at the position of the measurement point P1 of FIG. 13A.

As shown in the SEM image of FIG. 13A, in the portion where the first intermetallic compound 100Ab3 is provided, an Ni plated film functioning as the first lower layer plated film 100Ab1 is provided to cover the surface of the first base material 100Aa, and a layer of an intermetallic compound of Ni and Sn functioning as a layer of the first intermetallic compound 100Ab3 is provided to cover the surface of the first lower layer plated film 100Ab1. The layer of the first intermetallic compound 100Ab3 shown in FIG. 13A is formed by heating and melting a portion of the metal of the plated film by laser irradiation, and then cooling to solidify the metal.

As shown in the mapping image of FIG. 13B, the Ni element spreads to the region on the upper layer side of the first lower layer plated film 100Ab1 in addition to the region of the first lower layer plated film 100Ab1 in FIG. 13A. That is, not only the Sn element, but also the Ni element is diffused and present in the layered region (region denoted by reference numeral 100Ab3) on the upper layer side of the first lower layer plated film 100Ab1. This layered region is the first intermetallic compound 100Ab3.

According to the characteristic X-ray spectrum display of FIG. 13C, the above-described layered region includes a large amount of Ni element and Sn element. The results of quantitative analysis based on the spectrum for confirming the composition of the region of the first layered intermetallic compound 100Ab3 are shown in Table 1.

TABLE 1

| ELEMENT | LINE | Mass % | Atom % |
|---|---|---|---|
| C | K | 2 | 13 |
| Cr | K | 1 | 2 |
| Fe | K | 5 | 7 |
| Ni | K | 27 | 35 |
| Sn | L | 65 | 42 |
| TOTAL | | 100 | 100 |

From the results of the atomic percentage (Atom %) shown in Table 1, the ratio of Ni element to Sn element is approximately 3:4, for example. Therefore, the composition of the intermetallic compound in the layered region can be identified as $Ni_3Sn_4$. As a result, it was confirmed that the intermetallic compound in the present example embodiment is an intermetallic compound mainly including $Ni_3Sn_4$.

Hereinafter, the first protruding portion 100Ac and the second protruding portion 100Bc of the present example embodiment will be described using FIG. 12G in addition to FIGS. 12D to 12F.

As shown in FIGS. 12D to 12F, the first protruding portion 100Ac is provided at each boundary portion between the surface of the first outermost surface plated film 100Ab2 functioning as the first outermost surface metal film, and the surfaces E1*a*, E1*b*, and E1*c* of the first intermetallic compound 100Ab3 functioning as the first low wettability surface.

In a case where there are a plurality of boundary portions between the surface of the first outermost surface plated film 100Ab2 and the surface of the first intermetallic compound, the first protruding portion 100Ac is preferably provided at all the boundary portions, but may be provided at least at one boundary portion. With such a configuration, it is possible to reduce or prevent excessive flow-out of the bonding material appropriately.

The first protruding portion 100Ac is preferably a protrusion extending in a strip shape elongated in the width direction of the first metal terminal 100A. That is, the protrusion functioning as the first protruding portion 100Ac extends in the depth direction with respect to the paper plane of the drawings of FIGS. 12D to 12F. For example, the first protruding portion 100Ac is provided as a protrusion extending in the width direction of the first metal terminal 100A at each boundary portion between the surface E1*a* of the first intermetallic compound 100Ab3 and the first outermost surface plated film 100Ab2 in FIG. 12C. With such a configuration, it is possible to reduce or prevent excessive flow-out of the bonding material more appropriately.

As shown in FIGS. 12D to 12F, the second protruding portion 100Bc is provided at each boundary portion between the surface of the second outermost surface plated film 100Bb2 functioning as the surface of the second outermost surface metal film and the surfaces E2*a*, E2*b*, and E2*c* of the second intermetallic compound 100Bb3 functioning as the second low wettability surface.

In a case where there are a plurality of boundary portions between the surface of the second outermost surface plated film 100Bb2 and the surface of the second intermetallic compound, the second protruding portion 100Bc is preferably provided at all the boundary portions, but may be provided at least at one boundary portion. With such a configuration, it is possible to reduce or prevent excessive flow-out of the bonding material appropriately.

The second protruding portion 100Bc is preferably a protrusion extending in a strip shape elongated in the width direction of the second metal terminal 100B. That is, the protrusion functioning as the second protruding portion 100Bc extends in the depth direction with respect to the paper plane of the drawings of FIGS. 12D to 12F. For example, the second protruding portion 100Bc is provided as a protrusion extending in the width direction of the second metal terminal 100B at each boundary portion between the surface E2*a* of the second intermetallic compound 100Bb3 and the second outermost surface plated film 100Bb2. With such a configuration, it is possible to reduce or prevent excessive flow-out of the bonding material more appropriately.

Figure 12G:
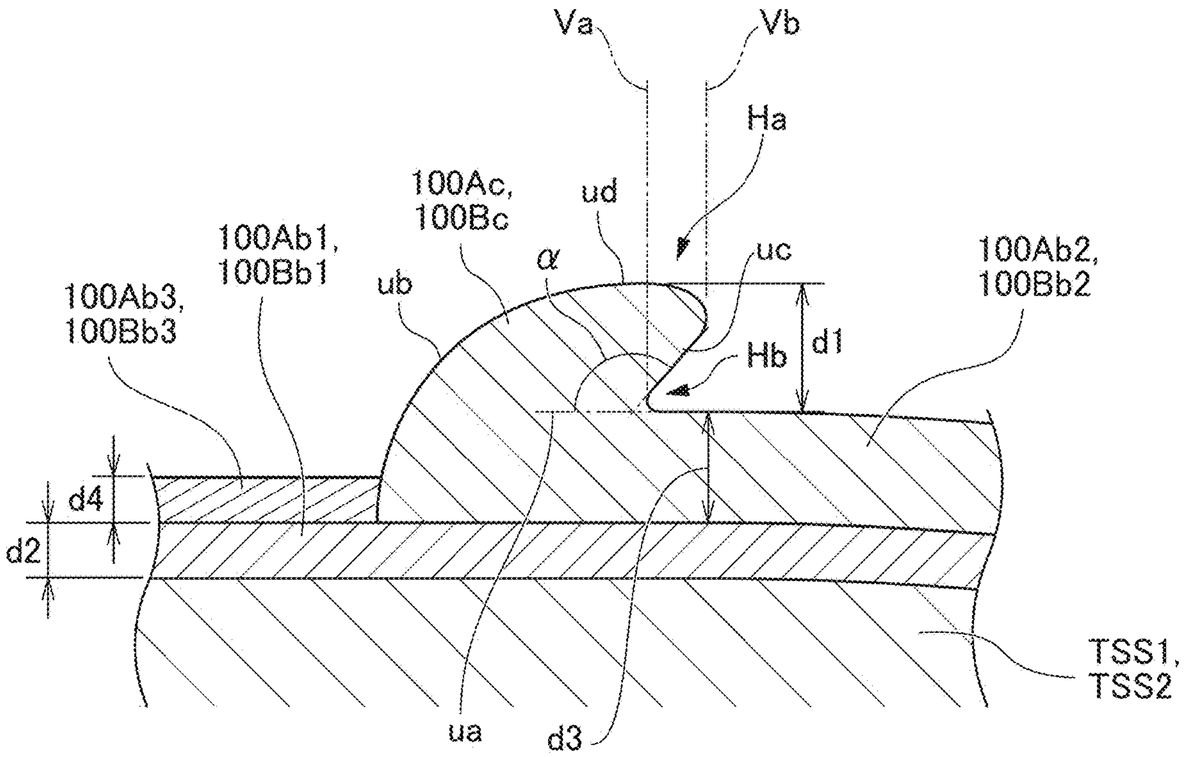
FIG. 12G is an enlarged cross sectional view of a first protruding portion located at a portion R4 of a first metal terminal shown in FIG. 12D.

FIG. 12G is an enlarged cross-sectional view of the first protruding portion 100Ac located at the portion R4 of the first metal terminal 100A shown in FIG. 12D, and is an LT cross-sectional view of the first protruding portion 100Ac. When a plurality of first protruding portions 100Ac are provided, the plurality of first protruding portions 100Ac may have the same or substantially same shape. Therefore, the first protruding portion 100Ac illustrated in FIG. 12G will be described as an example of the plurality of first protruding portions 100Ac. As described above, the enlarged view of the second metal terminal 100B has the same or substantially same shape as the enlarged view of the first metal terminal 100A, which is symmetrical with respect to the plane of the drawings. Therefore, in FIG. 12G, in addition to the reference numerals given to the respective configurations of the first metal terminal 100A, the reference numerals in the second metal terminal 100B are also given, and FIG. 12G is used as an enlarged view for explaining the first protruding portion 100Ac of the first metal terminal 100A and the second protruding portion 100Bc of the second metal terminal 100B.

In FIG. 12G, the vertical direction in the drawing corresponds to a direction orthogonal or substantially orthogonal to the surface of the first outermost surface plated film 100Ab2 (the second outermost surface plated film 100Bb2). An imaginary line Va in FIG. 12G refers to a line parallel to the vertical direction of the drawings and passes through a portion where the first protruding portion 100Ac (second protruding portion 100Bc) is bent to be raised from the first outermost surface plated film 100Ab2 (second outermost surface plated film 100Bb2). An imaginary line Vb in FIG. 12G refers to a line parallel to the vertical direction of the drawings and passes through a portion of the first protruding portion 100Ac (second protruding portion 100Bc) that is farthest from the first low wettability surface 100Ab3 (second low wettability surface 100Bb3) in the longitudinal direction of the first metal terminal 100A (second metal terminal 100B).

As shown in FIGS. 12D to 12F and 12G, the first protruding portion 100Ac may include an undercut shape. Here, the undercut shape refers to a protruding shape including a space Hb that is hidden by a portion of the first protruding portion 100Ac and is not seen when the surface of the first outermost surface plated film 100Ab2 is viewed in a direction orthogonal or substantially orthogonal to the surface. For example, in FIG. 12G, the space Hb surrounded by the imaginary line Vb, a fourth surface uc to be described later, and the surface of the first outermost surface plated film 100Ab2 is hidden by a portion Ha of the first protruding portion 100Ac and is not seen when viewed in a direction orthogonal or substantially orthogonal to the surface.

Further, in this undercut shape, when the vicinity of the first protruding portion 100Ac is viewed in the direction orthogonal or substantially orthogonal to the surface of the first outermost surface plated film 100Ab2, a portion of the rising shape portion of the first protruding portion 100Ac is hidden by the first protruding portion 100Ac itself and is not seen. In addition, for example, in FIG. 12G, when the vicinity of the first protruding portion 100Ac is viewed in a direction orthogonal or substantially orthogonal to the surface of the first outermost surface plated film 100Ab2, a portion of the first outermost surface plated film 100Ab2 may be hidden by a portion Ha of the first protruding portion 100Ac and not to be seen.

Hereinafter, the shape of the first protruding portion 100Ac will be described in more detail. In the present example embodiment, as illustrated in FIG. 12G, the first protruding portion 100Ac includes a first surface ua, a second surface ub, a third surface ud, and a fourth surface uc. The first surface ua is an imaginary reference surface parallel or substantially parallel to the surface of the first outermost surface plated film 100Ab2 in its cross-sectional shape. The second surface ub is a surface rising from the surface of the first intermetallic compound 100Ab3 functioning as the first low wettability surface. The third surface ud is a surface extending continuously from the second surface ub in a direction parallel or substantially parallel to the first outermost surface plated film 100Ab2 and toward the first outermost surface plated film 100Ab2, and provides an upper portion of the first protruding portion 100Ac. The fourth surface uc is a surface connecting one end of the third surface ud and the first outermost surface plated film 100Ab2. The angle α formed between the first surface ua and the fourth surface uc may be an obtuse angle.

Therefore, in the example shown in FIG. 12G, when the vicinity of the first protruding portion 100Ac is viewed in the direction orthogonal or substantially orthogonal to the surface of the first outermost surface plated film 100Ab2, a portion of the first outermost surface plated film 100Ab2 located on the left side of the imaginary line Vb in the drawings is blocked by the portion Ha of the first protruding portion 100Ac and cannot be seen.

In another point of view, in the example of FIG. 12G, when the vicinity of the first protruding portion 100Ac is viewed in the direction orthogonal or substantially orthogonal to the surface of the first outermost surface plated film 100Ab2, the space Hb between the imaginary line Va and the imaginary line Vb provided by the first outermost surface plated film 100Ab2 and the first protruding portion 100Ac may be hidden by the portion Ha of the first protruding portion 100Ac and may not be seen.

With such a configuration, it is possible to reduce or prevent excessive flow-out of the bonding material more appropriately. Further, an anchor effect is generated between the first protruding portion 100Ac and the exterior material 3, such that the adhesion between the first metal terminal 100A and the exterior material 3 is increased. Specifically, the mold resin of the exterior material 3 enters the shadowed space in the undercut shape, such that it is possible to obtain a high anchor effect.

Further, as shown in FIG. 12G, a distance from the surface of the first outermost surface plated film 100Ab2 to the upper surface of the first protruding portion 100Ac in the direction perpendicular or substantially perpendicular to the surface of the first outermost surface plated film 100Ab2 is defined as a protrusion height d1 of the first protruding portion 100Ac. In this case, the protrusion height d1 of the first protruding portion 100Ac may be greater than the thickness d2 of the first lower layer plated film 100Ab1. With such a configuration, it is possible to reduce or prevent excessive flow-out of the bonding material more appropriately.

The protrusion height d1 of the first protruding portion 100Ac may be greater than the thickness d3 of the first outermost surface plated film 100Ab2. With such a configuration, it is possible to reduce or prevent excessive flow-out of the bonding material more appropriately.

The protrusion height d1 of the first protruding portion 100Ac may be greater than the thickness d4 of the first intermetallic compound 100Ab3. With such a configuration, it is possible to reduce or prevent excessive flow-out of the bonding material more appropriately.

As shown in FIGS. 12D to 12F and 12G, the second protruding portion 100Bc may include an undercut shape. Here, the undercut shape refers to a protruding shape including a space Hb that is hidden by a portion of the second protruding portion 100Bc and is not seen when the surface of the second outermost surface plated film 100Bb2 is viewed in a direction orthogonal or substantially orthogonal to the surface. For example, in FIG. 12G, the space Hb surrounded by the imaginary line Vb, the fourth surface uc, and the surface of the second outermost surface plated film 100Bb2 is hidden by a portion Ha of the second protruding portion 100Bc and is not seen when viewed in a direction orthogonal or substantially orthogonal to the surface.

Further, in this undercut shape, when the vicinity of the second protruding portion 100Bc is viewed in the direction orthogonal or substantially orthogonal to the surface of the second outermost surface plated film 100Bb2, a portion of the rising shape portion of the second protruding portion 100Bc is hidden by the second protruding portion 100Bc itself and is not seen. In addition, for example, in FIG. 12G, when the vicinity of the second protruding portion 100Bc is viewed in a direction orthogonal or substantially orthogonal to the surface of the second outermost surface plated film 100Bb2, a portion of the second outermost surface plated film 100Bb2 may be hidden by a portion Ha of the second protruding portion 100Bc and not to be seen.

Hereinafter, the shape of the second protruding portion 100Bc will be described in more detail. In the present example embodiment, as illustrated in FIG. 12G, the second protruding portion 100Bc includes a first surface ua, a second surface ub, a third surface ud, and a fourth surface uc. The first surface ua is an imaginary reference surface parallel or substantially parallel to the surface of the second outermost surface plated film 100Bb2 in its cross-sectional shape. The second surface ub is a surface rising from the surface of the second intermetallic compound 100Bb3 functioning as the second low wettability surface. The third surface ud is a surface extending continuously from the second surface ub in a direction parallel or substantially parallel to the second outermost surface plated film 100Bb2 and toward the second outermost surface plated film 100Bb2, and provides an upper portion of the second protruding portion 100Bc. The fourth surface uc is a surface connecting one end of the third surface ud and the second outermost surface plated film 100Bb2. The angle α formed between the first surface ua and the fourth surface uc may be an obtuse angle.

Therefore, in the example shown in FIG. 12G, when the vicinity of the second protruding portion 100Bc is viewed in the direction orthogonal or substantially orthogonal to the surface of the second outermost surface plated film 100Bb2, a portion of the second outermost surface plated film 100Bb2 located on the left side of the virtual line Vb in the drawings is blocked by the portion Ha of the second protruding portion 100Bc and cannot be seen.

In another point of view, in the example illustrated in FIG. 12G, when the vicinity of the second protruding portion 100Bc is viewed in the direction orthogonal or substantially orthogonal to the surface of the second outermost surface plated film 100Bb2, the space Hb between the imaginary line Va and the imaginary line Vb provided by the second outermost surface plated film 100Bb2 and the second protruding portion 100Bc may be hidden by the portion Ha of the second protruding portion 100Bc and may not be seen.

With such a configuration, it is possible to reduce or prevent excessive flow-out of the bonding material more appropriately. Further, an anchor effect is generated between the second protruding portion 100Bc and the exterior material 3, such that the adhesion between the second metal terminal 100B and the exterior material 3 is increased. Specifically, the mold resin of the exterior material 3 enters the shaded space in the undercut shape, such that it is possible to obtain a high anchor effect.

Further, as shown in FIG. 12G, a distance from the surface of the second outermost surface plated film 100Bb2 to the upper surface of the second protruding portion 100Bc in the direction perpendicular or substantially perpendicular to the surface of the second outermost surface plated film 100Bb2 is defined as a protrusion height d1 of the second protruding portion 100Bc. In this case, the protrusion height d1 of the second protruding portion 100Bc may be greater than the thickness d2 of the second lower layer plated film 100Bb1. With such a configuration, it is possible to reduce or prevent excessive flow-out of the bonding material more appropriately.

The protrusion height d1 of the second protruding portion 100Bc may be greater than the thickness d3 of the second outermost surface plated film 100Bb2. With such a configuration, it is possible to reduce or prevent excessive flow-out of the bonding material more appropriately.

The protrusion height d1 of the second protruding portion 100Bc may be greater than the thickness d4 of the second intermetallic compound 100Bb3. With such a configuration, it is possible to reduce or prevent excessive flow-out of the bonding material more appropriately.

Next, a non-limiting example of a method of manufacturing the multilayer ceramic capacitor 1 of the present example embodiment will be described. The manufacturing method of the multilayer ceramic capacitor 1 of the present example embodiment is not limited as long as the requirements described above are satisfied. However, a preferred manufacturing method includes the following processes. First, a method of manufacturing the multilayer ceramic capacitor main body 2 will be described.

A dielectric sheet for manufacturing the dielectric layer 20 and an electrically conductive paste for manufacturing the internal electrode layer 30 are provided. The electrically conductive paste for manufacturing the internal electrode and the dielectric sheet includes a binder and a solvent. Known binders and solvents may be used.

The electrically conductive paste for manufacturing the internal electrode layer 30 is printed on the dielectric sheet in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed are provided.

A predetermined number of dielectric sheets in which the pattern of the internal electrode layer is not printed are laminated (stacked), such that a portion functioning as the first main surface-side outer layer portion 12 close to the first main surface TS1 is formed. The dielectric sheet in which the pattern of the first internal electrode layer 31 is printed and the dielectric sheet in which the pattern of the second internal electrode layer 32 is printed are sequentially laminated thereon, such that a portion functioning as the inner layer portion 11 is formed. A predetermined number of the dielectric sheets in which the pattern of the internal electrode layer is not printed are laminated on the portion functioning as the inner layer portion 11, such that a portion functioning as the second main surface-side outer layer portion 13 close to the second main surface TS2 is formed. Thus, a multilayer sheet is manufactured.

The multilayer sheets are pressed in the lamination direction by hydrostatic pressing, for example, such that a multilayer block is manufactured.

The multilayer block is cut to a predetermined size, such that a multilayer chip is cut out. At this time, corner portions and ridge portions of the multilayer chip may be rounded by barrel polishing or the like.

The multilayer chip is fired to manufacture the multilayer body 10. The firing temperature depends on the materials of the dielectric layer 20 and the internal electrode layer 30; however, the firing temperature is preferably about 900° C. or more and about 1400° C. or less, for example.

The electrically conductive paste functioning as the first base electrode layer 50A and the second base electrode layer 50B is applied to both end surfaces of the multilayer body 10. In the present example embodiment, the first base electrode layer 50A and the second base electrode layer 50B are fired layers. For example, an electrically conductive paste including a glass component and metal is applied to the multilayer body 10 by, for example, a method such as dipping. Thereafter, a firing process is performed to form the first base electrode layer 50A and the second base electrode layer 50B. The temperature of the firing process at this time is preferably about 700° C. or higher and about 900° C. or lower, for example.

In addition, in a case in which the multilayer chip before firing and the electrically conductive paste applied to the multilayer chip are fired simultaneously, it is preferable that the fired layer is formed by firing a ceramic material added instead of a glass component. At this time, as the ceramic material to be added, it is particularly preferable to use the same type of ceramic material as the dielectric layer 20. In this case, the electrically conductive paste is applied to t the multilayer chip before firing, and the multilayer chip and the electrically conductive paste applied to the multilayer chip are fired simultaneously to form the multilayer body 10 including the fired layer formed therein.

In addition, when a thin film layer is formed as the first base electrode layer 50A and the second base electrode layer 50B, a thin film layer may be formed on a portion of the first main surface TS1 and a portion of the second main surface TS2 of the multilayer body 10. The thin film layer may be, for example, a sputtered electrode fabricated by a sputtering method. In a case in which the sputtered electrode is formed on a portion of the first main surface TS1 and a portion of the second main surface TS2 of the multilayer body 10 as the first base electrode layer 50A and the second base electrode layer 50B, a fired layer is formed on the first end surface LS1 and on the second end surface LS2. Alternatively, a plated layer, which will be described later, may be formed directly on the multilayer body 10 without forming the base electrode layer on the first end surface LS1 and the second end surface LS2.

Thereafter, the first plated layer 60A is formed on the first base electrode layer 50A. Furthermore, the second plated layer 60B is formed on the second base electrode layer 50B. In the present example embodiment, the Ni plated layer and the Sn plated layer are formed as the plated layers. The Ni plated layer and the Sn plated layer are sequentially formed, for example, by a barrel plating method.

Through such a manufacturing process, the multilayer ceramic capacitor main body 2 is manufactured.

Figure 14A:
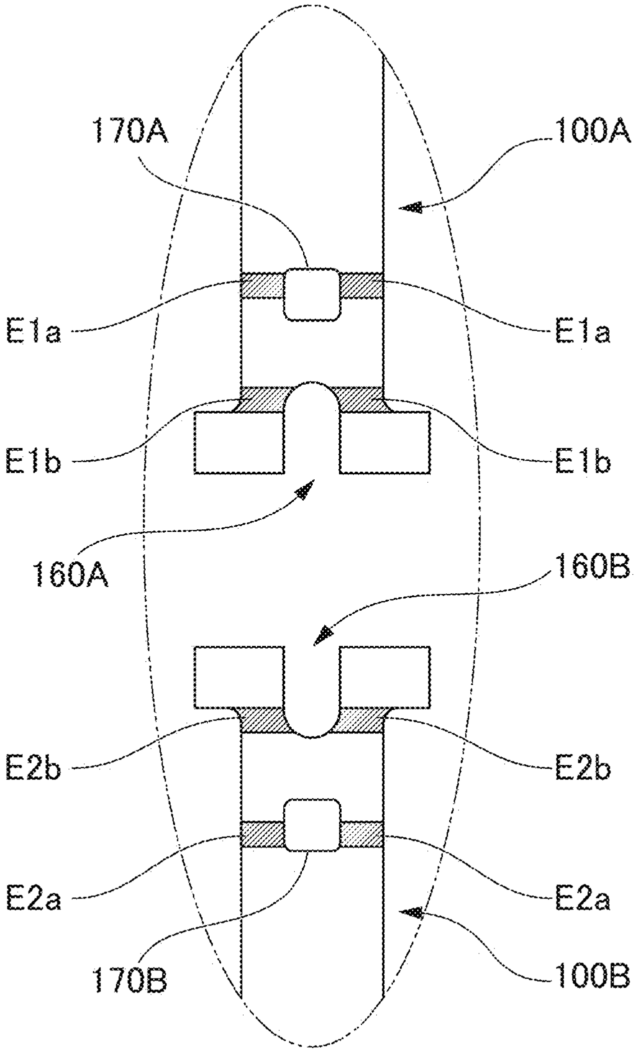
FIG. 14A is a front view of the metal terminal before being folded.
Figure 14B:
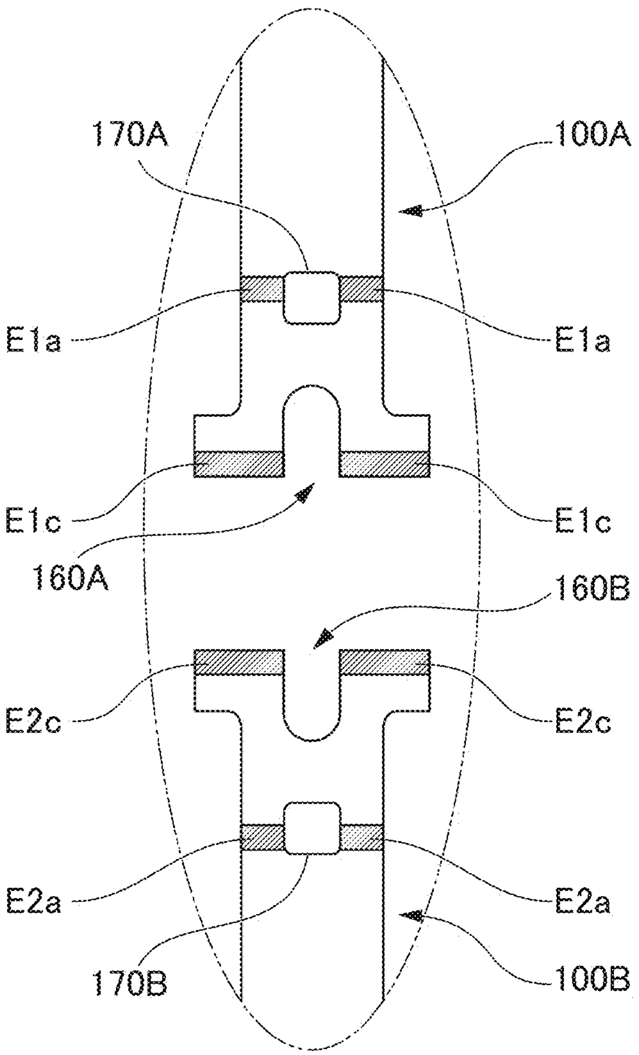
FIG. 14B is a view of an opposite surface of the metal terminal before being folded.

Next, a non-limiting example of a method of manufacturing the first metal terminal 100A and the second metal terminal 100B will be described with reference to FIGS. 14A and 14B. FIG. 14A is a front view of the metal terminal before being folded. FIG. 14B is a view of an opposite surface of the metal terminal before being folded.

A plated film is applied to the terminal main bodies of the first metal terminal 100A and the second metal terminal 100B. In the present example embodiment, a Ni plated film and a Sn plated film are provided which function as the plated film. After the plated film is provided on the surface of the base material of the metal terminal main body, the base material is cut along the shape of the metal terminal by shearing using a punching die or the like. Thus, an exposed surface from which the surface of the base material of the terminal main body is exposed is provided on the lateral surface of the metal terminal main body.

Thereafter, as shown in FIG. 14A, the surfaces E1*a*, E1*b*, E2*a*, and E2*b* of the first intermetallic compound are provided which function as surfaces having low solder wettability and functioning as a low wettability surface in a desired region of the surfaces (the first front surface FS1 and the second front surface FS2) of the metal terminal. Further, as shown in FIG. 14B, the surfaces E1*a*, E1*c*, E2*a*, and E2*c* of the second intermetallic compound are provided and function as surfaces having low solder wettability and functioning as a low wettability surface in a desired region of the back surface (the first opposite surface BS1 and the second opposite surface BS2) of the metal terminal.

The process of forming the surface of the intermetallic compound is performed by heat treatment of the plated film. At this time, the protruding portions 100Ac and 100Bc of the present example embodiment may also be formed at the same time while the surface of the intermetallic compound functioning as the low wettability surface is formed, for example, by performing laser treatment. In the present example embodiment, the protruding portions 100Ac and 100Bc of the present example embodiment are also formed at the same time while an intermetallic compound of Ni and Sn is formed by performing laser irradiation on the multilayer structure of the Ni plated film and the Sn plated film. The laser irradiation conditions are adjusted at a low output so that the Sn plated film functioning as the outermost surface plated film is not removed by evaporation. As the laser, a pulse laser whose output can be easily adjusted is preferably used. Then, by adjusting the conditions such as the output of the laser and further adjusting the scanning direction of the laser, it is possible to form the protruding portions 100Ac and 100Bc at the boundary portion between the surface of the outermost surface metal film and the low wettability surface, while forming the surface of the intermetallic compound functioning as the low wettability surface. The protruding portions 100Ac and 100Bc may be made of the same material as the Sn plated film of the outermost surface plated film. However, the protruding portions 100Ac and 100Bc may partially include, for example, an intermetallic compound of Ni and Sn, or may partially include the same material as the Ni plated film.

Next, a process of bonding the multilayer ceramic capacitor main body 2 to the first metal terminal 100A and the second metal terminal 100B will be described.

The first external electrode 40A and the first metal terminal 100A are bonded to each other by the first bonding material 5A. The second external electrode 40B and the second metal terminal 100B are bonded by the second bonding material 5B. In the present example embodiment, the first bonding material 5A and the second bonding material 5B are solder. For example, when the bonding is performed by reflow soldering, the first bonding material 5A and the second bonding material 5B are heated, for example, at a temperature of about 270° C. or more and about 290° C. or less for 30 seconds or more, for example.

The heating during the reflow process melts the first bonding material 5A and the second bonding material 5B. At this time, since the surface E1*b* of the intermetallic compound is provided on the surface of the first rising portion 120A of the first metal terminal 100A, and this surface faces the first surface S1 of the multilayer ceramic electronic component main body 2, the first bonding material 5A hardly spreads along the rising portion 120A of the first metal terminal 100A. In addition, since the surface E2*b* of the intermetallic compound is provided on the surface of the second rising portion 120B of the second metal terminal 100B, and this surface faces the second surface S2 of the multilayer ceramic electronic component main body 2, the second bonding material 5B hardly spreads along the rising portion 120B of the second metal terminal 100B. Similarly, the surface E1*a* of the intermetallic compound and the surface E2*a* of the intermetallic compound have a function of preventing solder from spreading during reflow. Similarly, the surface E1*c* of the intermetallic compound and the surface E2*c* of the intermetallic compound have a function of preventing solder from spreading during reflow. Similarly, the surface of the first base material 100Aa located on the first terminal lateral surface TSS1 and the surface of the second base material 100Ba located on the second terminal lateral surface TSS2 have a function of preventing solder from spreading during reflow. In the present example embodiment, the protruding portions 100Ac and 100Bc are provided at the boundary portion between the surface of the outermost surface metal film and the low wettability surface. With such a configuration, it is possible to reduce or prevent excessive flow-out of the bonding material more appropriately. Further, when the protrusion height of each of the protruding portions 100Ac and 100Bc is greater than the thickness of the lower layer plated film, for example, such an effect becomes higher. Each of the protruding portions 100Ac and 100Bc may further include an undercut shape. Further, each of the protruding portions 100Ac and 100Bc may include a shape in which the upper surface thereof is provided biased toward the multilayer ceramic capacitor main body 2. With such a configuration including the protruding portions 100Ac and 100Bc, it is possible to reduce or prevent excessive flow-out of the bonding material more appropriately.

After the heating, the first bonding material 5A is solidified in a state where the gap portion G remains between the first rising portion 120A of the first metal terminal 100A and the first surface S1 of the multilayer ceramic capacitor main body 2 on the first end surface LS1 such that the multilayer ceramic capacitor main body 2 and the first metal terminal 100A are bonded to each other. In addition, the second bonding material 5B is solidified in a state where the gap portion G remains between the second rising portion 120B of the second metal terminal 100B and the second surface S2 on the second end surface LS2 of the multilayer ceramic capacitor main body 2 such that the multilayer ceramic capacitor main body 2 and the second metal terminal 100B are bonded to each other. With such a configuration, it is possible to fill the gap portion G more reliably with the exterior material 3 in the subsequent step.

Next, a process of covering the multilayer ceramic capacitor main body 2, the first bonding material 5A and the second bonding material 5B, a portion of the first metal terminal 100A, and a portion of the second metal terminal 100B with the exterior material 3 will be described.

The exterior material 3 is formed by, for example, a transfer molding method. Specifically, the multilayer ceramic capacitor before being covered with the exterior material 3, that is, the multilayer ceramic capacitor main body 2 to which the metal terminal 100 is bonded via the bonding material 5, is arranged in a mold, and then the resin of the exterior material 3 is filled in the mold, and the resin is cured. Thus, the exterior material 3 is provided so as to cover the multilayer ceramic capacitor main body 2, the first bonding material 5A and the second bonding material 5B, a portion of the first metal terminal 100A, and a portion of the second metal terminal 100B. At this time, the gap portion G can also be filled with the exterior material 3. Since the plated film is formed on the metal terminal, the bonding property by the bonding material can be enhanced, but since the surface of the plated film formed on the metal terminal is smooth, there is a possibility that peeling will likely occur at the interface between the metal terminal and the exterior material. In this case, external vapor may enter the inside of the exterior material, and the reliability of the electronic component may decrease. In the present example embodiment, the protruding portions 100Ac and 100Bc are provided at the boundary portion between the surface of the outermost surface metal film and the low wettability surface. With such a configuration, the bonding property between the metal terminal and the exterior material is enhanced, such that it is possible to reduce or prevent the peeling at the interface between the metal terminal and the exterior material and reduce or prevent a decrease in reliability of the electronic components. When each of the protruding portions includes an undercut shape, such an effect becomes higher. Further, when the protrusion height of each of the protruding portions 100Ac and 100Bc is greater than the thickness of the lower layer plated film, for example, such an effect becomes higher.

Finally, if there is an unnecessary portion in the metal terminal 100, the unnecessary portion is cut using a stamping die or the like. Then, the metal terminal 100 is bent into a desired shape using a bending die or the like. Thus, the metal terminal 100 may be formed by bending. That is, each connection portion of the metal terminal 100 formed by bending may be formed by bending. The bending process is partially performed before molding the exterior material 3.

According to the above-described manufacturing method, the multilayer ceramic capacitor 1 of the present example embodiment is manufactured.

Figure 16A:
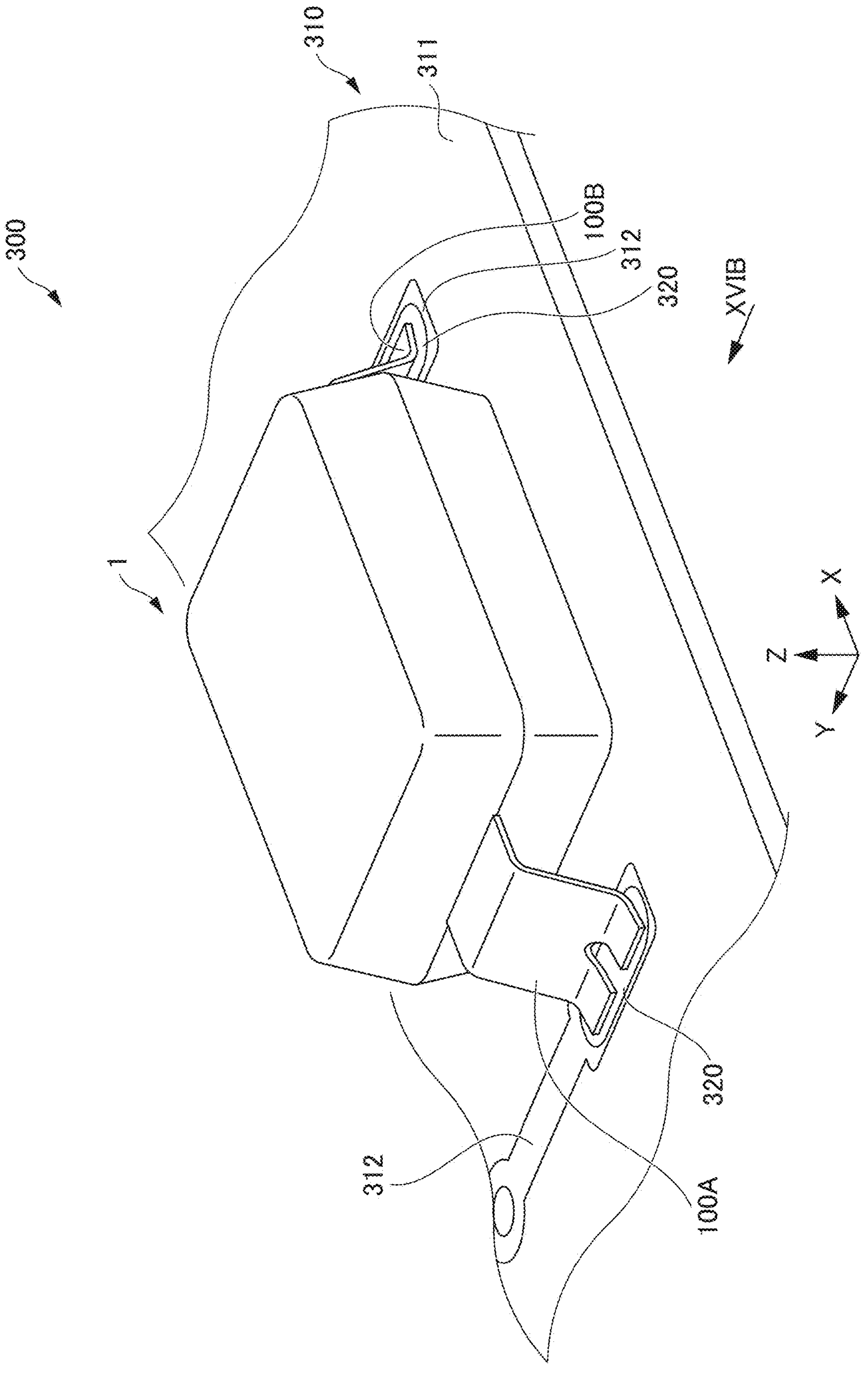
FIG. 16A is an external perspective view of a mounting structure in which a multilayer ceramic capacitor of an example embodiment of the present invention is mounted on a mounting substrate.
Figure 16B:
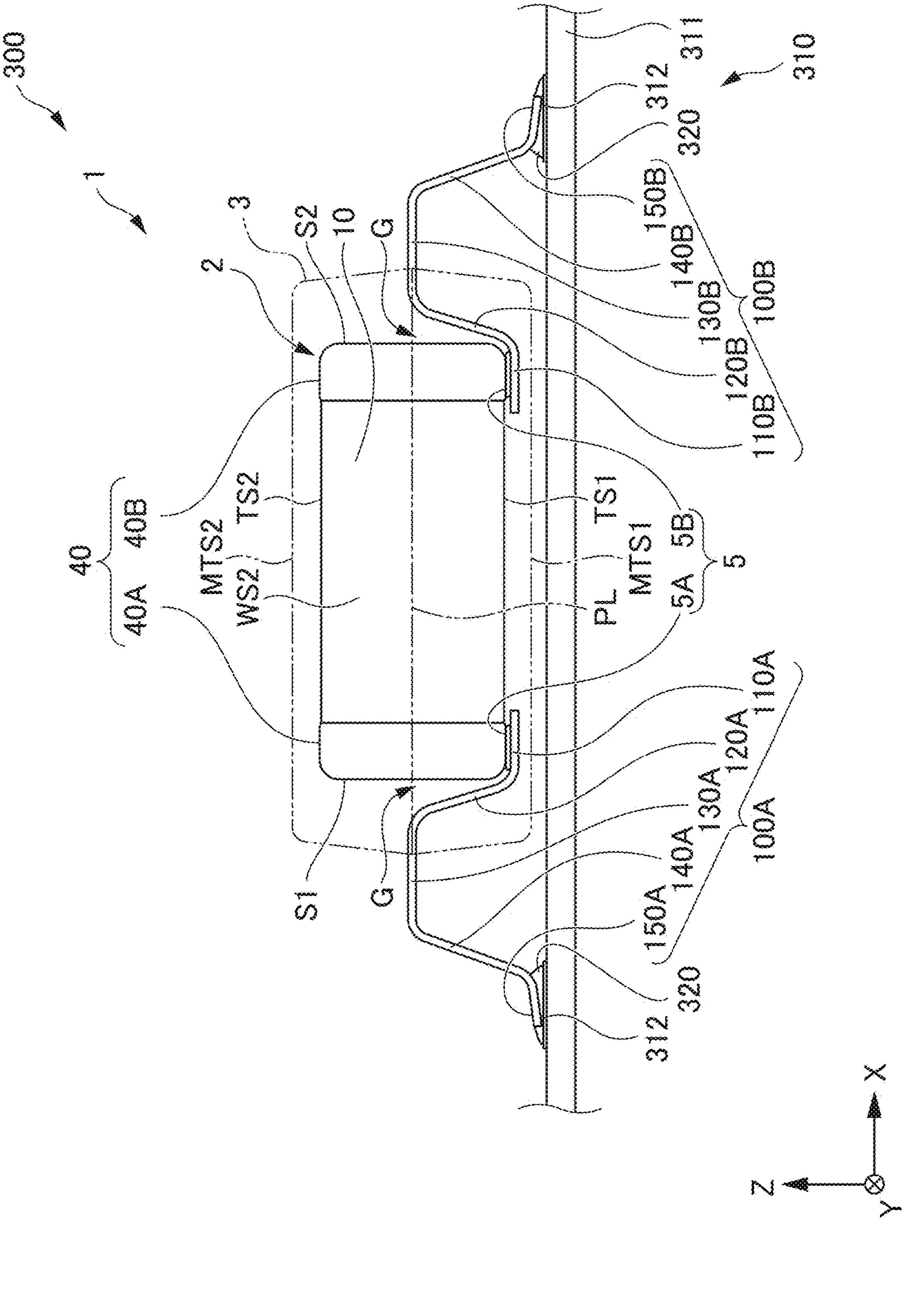
FIG. 16B is a view corresponding to FIG. 6, and is an imaginary arrow view when the mounting structure of the multilayer ceramic capacitor of FIG. 16A is viewed in the direction of the arrow XVIB.

FIGS. 16A and 16B each show a mounting structure 300 of the multilayer ceramic capacitor 1. FIG. 16A is an external perspective view of a mounting structure 300 in which the multilayer ceramic capacitor 1 of the present example embodiment is mounted on a mounting substrate 310. FIG. 16B is a view corresponding to FIG. 6, and is an imaginary arrow view when the mounting structure 300 of the multilayer ceramic capacitor 1 of FIG. 16A is viewed in the direction of the arrow XVIB.

Thereafter, the multilayer ceramic capacitor 1 which is covered with the exterior material 3 and completed is reflow-mounted as a component on the mounting substrate 310 via a substrate mounting bonding material 320.

More specifically, the first metal terminal 100A and the second metal terminal 100B are bonded to a wiring 312 provided on the mounting surface 311 of the mounting substrate 310 via the substrate mounting bonding material 320. The second metal terminal 100B is bonded to the wiring 312 provided on the mounting surface 311 of the mounting substrate 310 via the substrate mounting bonding material 320.

At this time, the bonding material 5 may melt and the volume of the bonding material 5 may expand; however, with the configuration including the surfaces E1*a*, E1*b*, E1*c*, E2*a*, E2*b*, and E2*c* of the plurality of intermetallic compounds shown in the present example embodiment, it is possible to reduce or prevent the occurrence of problems such as solder splash. In the present example embodiment, the protruding portions 100Ac and 100Bc are provided at the boundary portion between the surface of the outermost surface metal film and the low wettability surface. With such a configuration, it is possible to reduce or prevent the generation of solder splash more appropriately.

Figure 15:
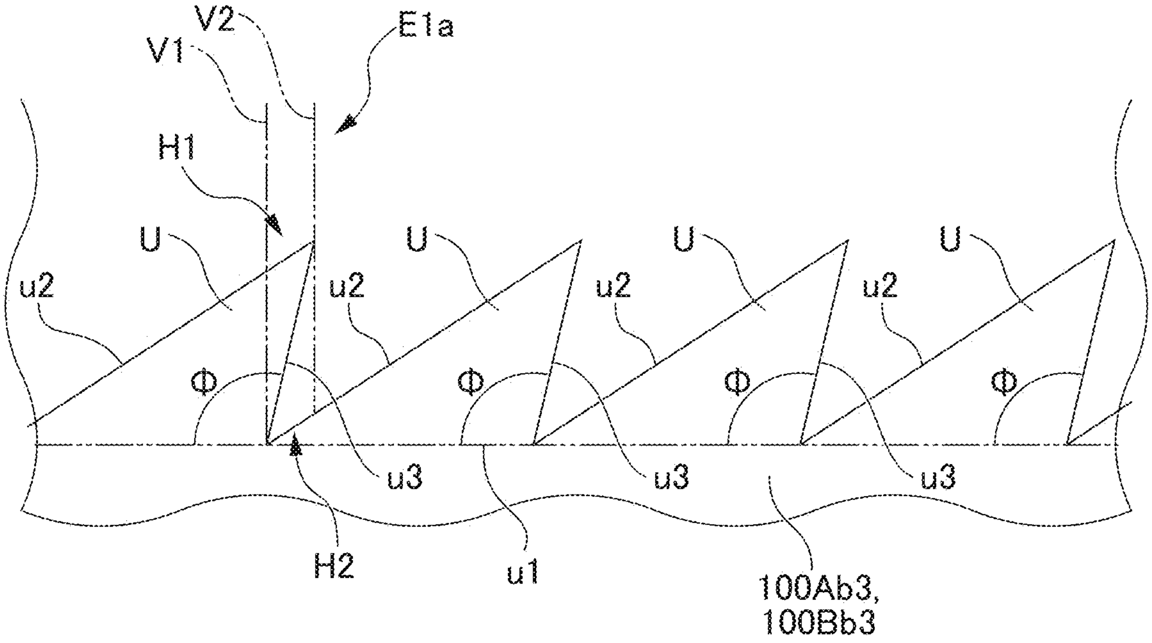
FIG. 15 is a cross-sectional view showing an example of a plurality of protrusions provided on a surface of the intermetallic compound in a first metal terminal.

As shown in FIG. 15, a plurality of protrusions U may be provided on the surfaces (the surfaces E1*a* to E1*c* of the first intermetallic compound 100Ab3 and the surfaces E2*a* to E2*c* of second intermetallic compound 100Bb3) of the intermetallic compound functioning as a low wettability surface. Each of the plurality of protrusions U may have an undercut shape.

In other words, in the undercut shape, when the surface of the intermetallic compound is viewed in a direction orthogonal to the surface of the intermetallic compound, a portion of the rising shape portion of the protrusion U is not seen by the protrusion U itself. For example, each of the protrusions U may be provided such that, when viewed in a direction orthogonal to each of the surfaces E1*a*, E1*b*, and E1*c* of the first intermetallic compound and each of the surfaces E2*a*, E2*b*, and E2*c* of the second intermetallic compound, a portion of the protrusion U conceals the other portion of the protrusion U and makes it unseen. An example of the undercut shape of each of the protrusions U according to the present example embodiment will be described below with reference to FIG. 15. FIG. 15 is a cross-sectional view of an example of a plurality of protrusions provided on the surface of the intermetallic compound in the first metal terminal. Since the plurality of protrusions provided on the surface of the intermetallic compound in the second metal terminal are the same as those in the first metal terminal, a description thereof will be omitted.

In FIG. 15, the vertical direction in the drawing corresponds to a direction orthogonal to the surface of the intermetallic compound. The imaginary line V1 in FIG. 15 is parallel to the vertical direction of the drawing and passes through a boundary point between adjacent protrusions U. An imaginary line V2 in FIG. 15 is parallel to the vertical direction of the drawing and passes through the apex of each of the protrusions U.

In the present example embodiment, as shown in FIG. 15, the undercut shape of each of the protrusions U includes, in its cross-sectional shape, a first side u1 substantially parallel to the surface (for example, the surface of the first intermetallic compound and the surface of the second intermetallic compound of the metal terminal) and serving as a reference line, a second side u2 extending from the first side u1 at a rising angle exceeding a right angle, and a third side u3 extending from the second side u2 to be connected to the first side u1. That is, the cross-sectional shape of each of the protrusions U is a substantially obtuse triangle in which the angle φ between the first side u1 serving as the reference line of the surface and the second side u2 forming one of the rising portions of the protrusions U is an obtuse angle. The term "substantially obtuse triangle" as used herein does not need to be an exact obtuse triangle, and includes, for example, a shape in which the second side u2 has a skirt shape that gradually becomes an angle closer to parallel to the first side u1 as approaching the first side u1 as a reference line.

Therefore, in the example illustrated in FIG. 15, when the surface of the intermetallic compound is viewed in the direction orthogonal to the surface of the intermetallic compound, in each of the protrusions U located on the right side of the drawing among the adjacent protrusions U, a portion of each of the protrusions U located on the left side of the drawing with respect to the imaginary line V2 is interrupted in view by a portion of each of the protrusions U on the left side of the drawing and cannot be seen.

From another point of view, in the example of FIG. 15, when the surface of the intermetallic compound is viewed in the direction orthogonal to the surface of the intermetallic compound, a portion H2 surrounded by the imaginary lines V1 and V2 in each of the protrusions U on the right side of the drawing among the adjacent protrusions U may be hidden by a portion H1 surrounded by the imaginary lines V1 and V2 in each of the protrusions U on the left side of the drawing among the adjacent protrusions U, and may not be seen.

With such a configuration, an anchor effect is generated between the exterior material and the plurality of protrusions provided on the surface of the intermetallic compound of the metal terminal, and the adhesion between the metal terminal and the exterior material is enhanced. Specifically, the mold resin of the exterior material enters the space behind each of the protrusions in the undercut shape, such that a high anchor effect is obtained.

Further, the plurality of protrusions are continuously provided on the surface of the intermetallic compound of the metal terminal. Preferably, at least a portion of the plurality of protrusions is defined by a large number of regularly provided protrusions. For example, the plurality of protrusions are regularly provided for each processed line.

The arithmetic mean height Sa of the surfaces (the surfaces E1*a*, E1*b*, and E1*c* of the first intermetallic compound and the surfaces E2*a*, E2*b*, and E2*c* of the second intermetallic compound) of the intermetallic compound having the plurality of protrusions U is preferably about 0.5 μm or more, for example. With such a configuration, the adhesion between the metal terminal and the exterior material is further increased.

Further, the skewness Ssk of each of the surfaces of the intermetallic compound having the plurality of protrusions U is preferably a positive value. With such a configuration, the adhesion between the metal terminal and the exterior material is further increased.

The RSm in the roughness curve in the second direction orthogonal to the first direction may be two times or more the RSm in the roughness curve in the first direction (scanning direction of the laser). The RSm in the roughness curve in the first direction (scanning direction of the laser) may be, for example, about 3 μm or more and about 10 μm or less, for example.

Method of Measuring Roughness Parameter

The method of measuring the surface roughness parameter of the surface of the metal terminal is as follows. First, the exterior material is dissolved in a solvent to expose the surface of the metal terminal. In a case where the exterior material is an epoxy resin, for example, a hydrocarbon-based release agent is used as the solvent. The surface roughness parameter of the surface of the intermetallic compound of the exposed surface of the metal terminal is measured using a laser microscope.

A roughness parameter relating to the line roughness such as RSm is measured by a measurement method according to JIS B0601-2001 (2013). Roughness parameters relating to surface roughness such as Sa and Ssk are measured by a measurement method based on ISO25178. The arithmetic mean height Sa or the like at the time of surface roughness measurement is obtained by expanding the arithmetic mean height Ra (arithmetic mean height of a line) or the like on the surface. The average value of the roughness parameters measured at five points is used as the measured value of the roughness parameter in the present example embodiment.

Laser microscopy: shape analysis laser microscope VK-X100 (available from Keyence Corporation)

Pitch: 0.08 μm

Viewing range: 150 μm×150 μm

Reference length at the time of line roughness measurement: standard Reference Length in VK-X Cut-off: no When it is desired to form the protruding shape as shown in FIG. 15 in the intermetallic compound, it is possible to form the surfaces (the surfaces E1*a*, E1*b*, and E1*c* of the first intermetallic compound 100Ab3, and the surfaces E2*a*, E2*b*, and E2*c* of the second intermetallic compound Bb3) of the intermetallic compound on which a plurality of protrusions each having an undercut shape are provided by further adjusting the irradiation angle of the laser and adjusting the conditions such as the laser output.

In addition, in order to configure at least a portion of the plurality of protrusions U by a plurality of protrusions U regularly arranged, the laser irradiation conditions may be appropriately determined. For example, laser irradiation may be performed so that the spot interval of the laser beam is about 3 μm or more and about 10 μm or less. In such a case, the plurality of continuously provided protrusions U are regularly provided at intervals of about 3 μm or more and about 10 μm or less, for example.

Hereinafter, a modification of the multilayer ceramic capacitor 1 of the present example embodiment will be described. In the following description, the same components as those in the above example embodiments are denoted by the same reference numerals, and a detailed description thereof is omitted.

Figure 12H:
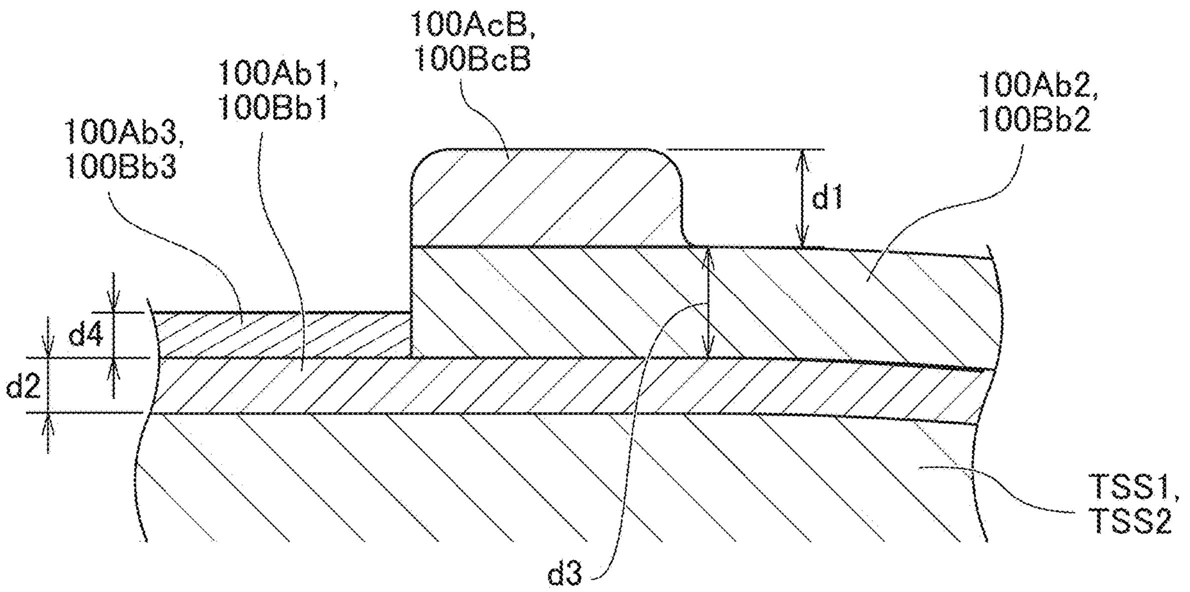
FIG. 12H corresponds to FIG. 12G, and is an enlarged cross sectional view of a first protruding portion according to a first modification of an example embodiment of the present invention.
Figure 12I:
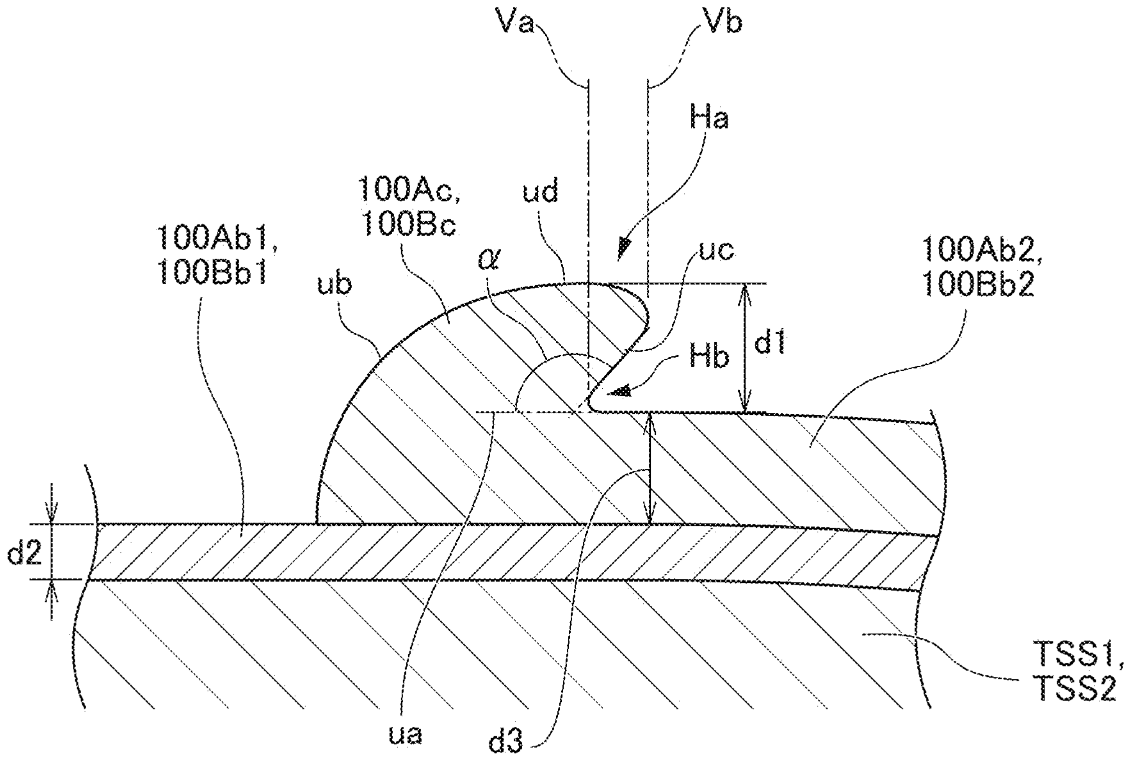
FIG. 12I corresponds to FIG. 12G, and is an enlarged cross sectional view showing a low wettability surface according to a second modification of an example embodiment of the present invention.
Figure 12J:
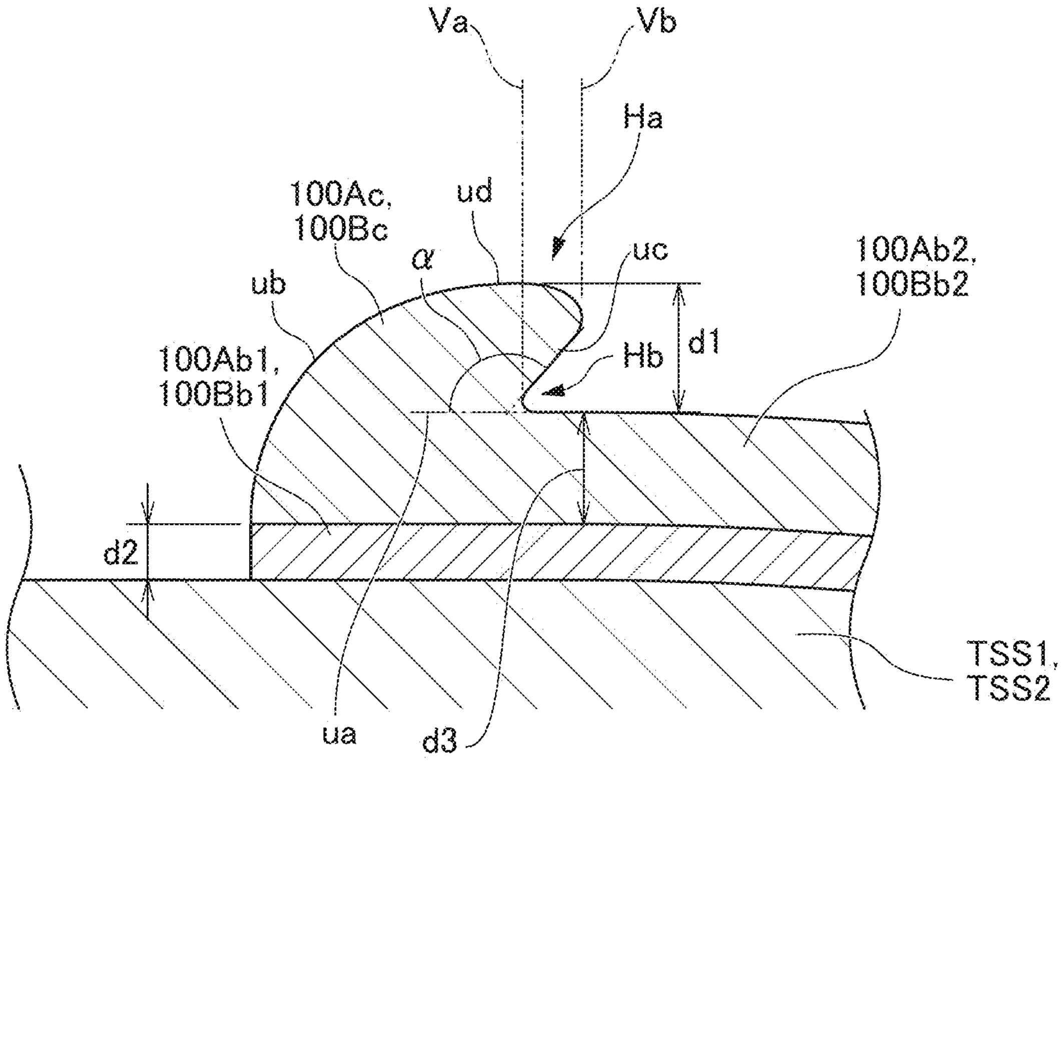
FIG. 12J corresponds to FIG. 12G, and is an enlarged cross sectional view of a low wettability surface according to a third modification of an example embodiment of the present invention.

First, first to third modifications of the multilayer ceramic capacitor 1 of the present example embodiment will be described with reference to FIGS. 12H to 12J. FIG. 12H is a view corresponding to FIG. 12G, and is an enlarged view of the first protruding portion according to the first modification. FIG. 12I is a view corresponding to FIG. 12G and is an enlarged view of a low wettability surface according to the second modification. FIG. 12J is a view corresponding to FIG. 12G and is an enlarged view of a low wettability surface according to the third modification.

As described above, the first metal terminal 100A and the second metal 100B terminal are plane-symmetric or substantially plane-symmetric with respect to the WT cross section in the middle in the length direction L of the multilayer ceramic capacitor 1. Therefore, the enlarged view of the second metal terminal 100B includes the same or substantially same shape as the enlarged view of the first metal terminal 100A, which is symmetrical or substantially symmetrical with respect to the plane of the drawings. Therefore, in FIGS. 12H to 12J, in addition to the reference numerals given to the respective configurations of the first metal terminal 100A, the reference numerals in the second metal terminal 100B are also given, and FIGS. 12H to 12J are used as enlarged views for explaining the first metal terminal 100A and the second metal terminal 100B.

In the above-described example embodiments, the first protruding portion 100Ac and the second protruding portion 100Bc each include the undercut shape. However, the present invention is not limited thereto, and the first protruding portion 100Ac and the second protruding portion 100Bc each may not include an undercut shape. For example, as shown in FIG. 12H, a first protruding portion 100AcB according to the first modification does not include an undercut shape. As shown in FIG. 12H, the second protruding portion 100BcB according to the first modification does not include an undercut shape.

Even in such a shape, it is possible to reduce or prevent excessive flow-out of the bonding material appropriately, and it is possible to reduce or prevent generation of solder splash.

In the above-described example embodiment, the protruding portion is formed at the boundary portion between the surface of the outermost surface metal film and the low wettability surface, while forming the surface of the intermetallic compound of Ni and Sn functioning as the low wettability surface by applying laser irradiation to the multilayer structure of the Ni plated film and the Sn plated film. However, the protruding portion may be formed by other methods, for example, by stripe plating. In the stripe plating, a surface excluding a portion where a plated film is to be formed is masked with a resist or the like, and then plating treatment is performed. Thus, a plated film is partially formed. The material of the plated film forming the protruding portion may be the same as the material of the other plated films, and may be, for example, Sn.

In the multilayer ceramic capacitor 1 of the above-described example embodiment, the surfaces E1*a*, E1*b*, and E1*c* of the first intermetallic compound 100Ab3 and the surfaces E2*a*, E2*b*, and E2*c* of the second intermetallic compound 100Bb3 are formed as low wettability surfaces, but the present invention is not limited thereto. For example, as shown in FIG. 12I, in the multilayer ceramic capacitor 1 according to the second modification, a surface of Ni plating of the first lower layer plated film 100Ab1 or a surface of Ni plating of the second lower layer plated film 100Bb1 may be provided as the low wettability surface. Alternatively, as shown in FIG. 12J, in the multilayer ceramic capacitor 1 according to the third modification, a surface of the first base material 100Aa or a surface the second base material 100Ba may be provided as a low wettability surface.

Even in such a configuration, it is possible to reduce or prevent excessive flow-out of the bonding material appropriately, and it is possible to reduce or prevent generation of solder splash.

In this case, the low wettability surface may be formed, for example, by laser trimming in which a portion or the entirety of the plated film is removed, or may be formed by stripe plating. In the stripe plating, a plating process is performed on the terminal main body in a state in which a portion of the surface is masked with a resist or the like. As a result, a low wettability surface with low wettability of solder is formed.

Figure 17A:
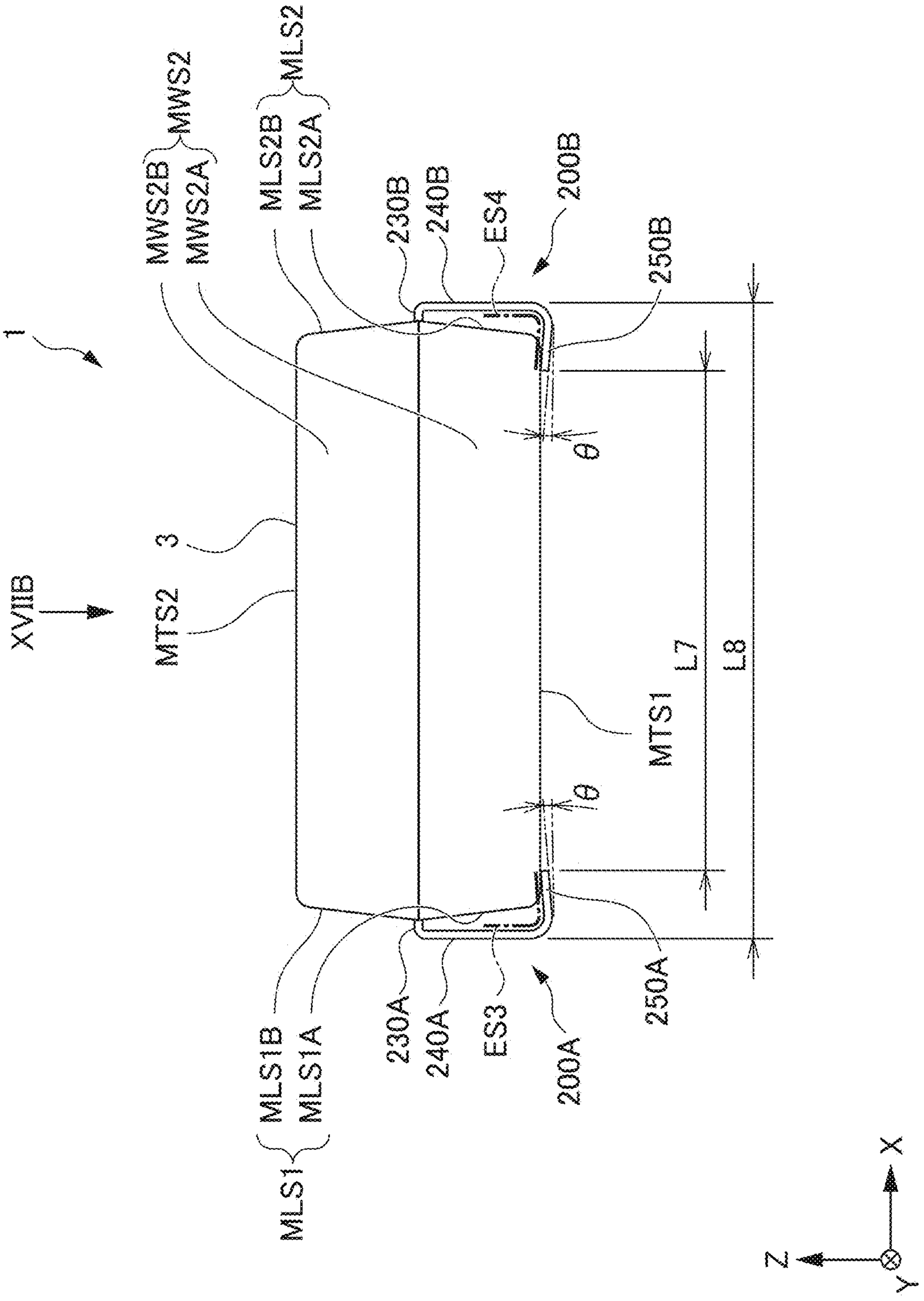
FIG. 17A is a view showing a fourth modification of the multilayer ceramic capacitor of the present example embodiment of the present invention, and corresponds to FIG. 2.
Figure 17B:
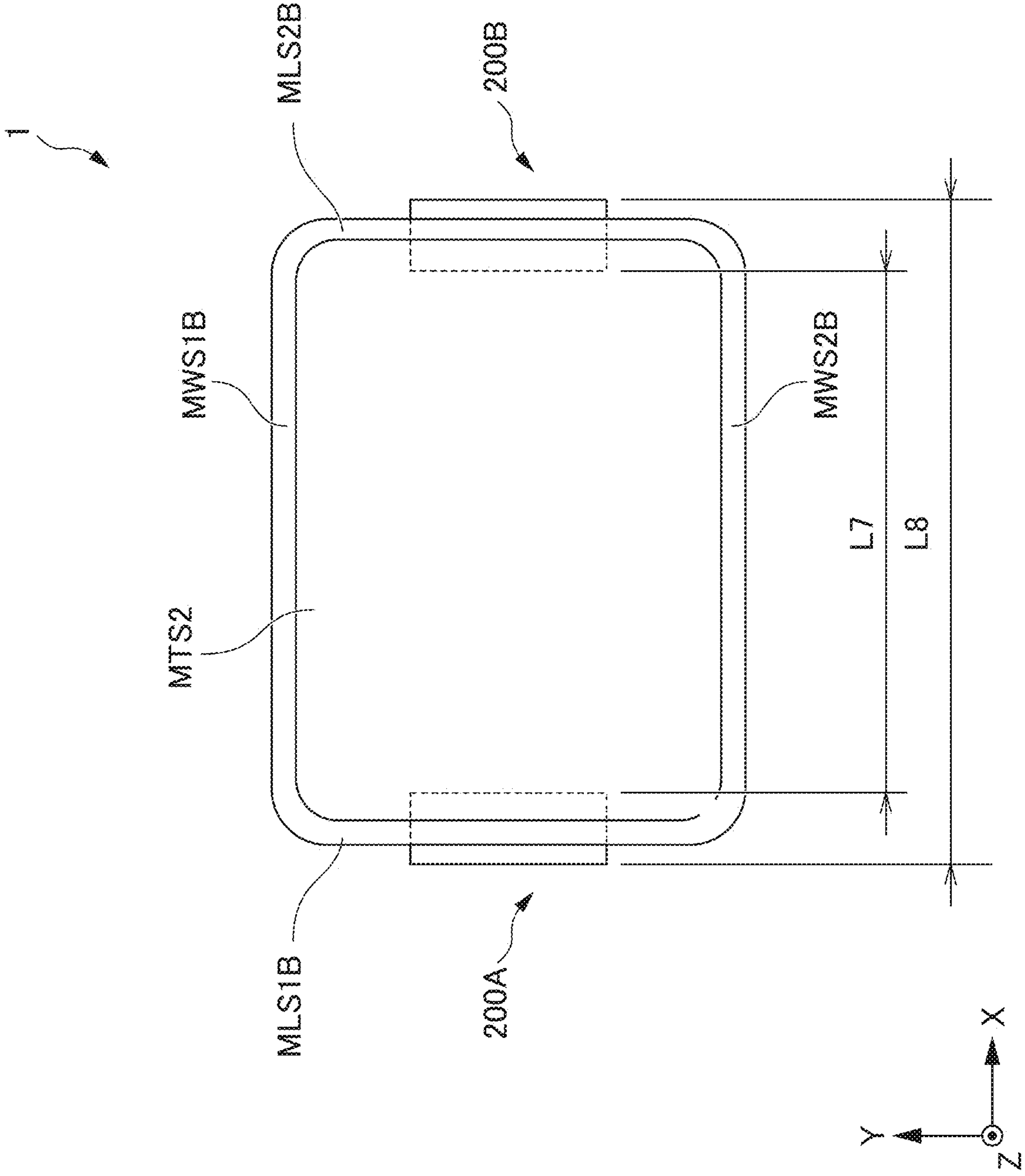
FIG. 17B is an arrow view when the multilayer ceramic capacitor of FIG. 17A is viewed in the direction of the arrow XVIIB.

Next, a fourth modification of the multilayer ceramic capacitor 1 of the present example embodiment will be described with reference to FIGS. 17A and 17B. FIG. 17A is a view showing a modification of the multilayer ceramic capacitor 1 of the present example embodiment, and corresponds to FIG. 2. FIG. 17B is a view of the multilayer ceramic capacitor 1 of FIG. 17A as viewed in the direction of the arrow XVIIB, and corresponds to FIG. 4.

In this modification, the configuration of the metal terminal is different from that of the above example embodiments. The metal terminal of the modification includes a first metal terminal 200A and a second metal terminal 200B.

The configuration of a portion of the first metal terminal 200A provided inside the exterior material 3 is the same as the configuration of the first metal terminal 100A of the above example embodiment. The configuration of the portion of the second metal terminal 200B provided inside the exterior material 3 is the same as the configuration of the second metal terminal 100B of the above example embodiment.

The first metal terminal 200A includes a first extension portion 230A, a first falling portion 240A, and a first mounting portion 250A. The first extension portion 230A is connected to the first falling portion 240A immediately after protruding from the surface MLS1 of the exterior material 3 on the first end surface LS1. The connection portion between the first extension portion 230A and the first falling portion 240A is formed by bending at substantially a right angle. The first falling portion 240A extends in a direction orthogonal or substantially orthogonal to the mounting surface toward the mounting surface. The first mounting portion 250A extends along the mounting surface toward the middle side in the length direction L of the multilayer ceramic capacitor 1.

The second metal terminal 200B includes a second extension portion 230B, a second falling portion 240B, and a second mounting portion 250B. The second extension portion 230B is connected to the second falling portion 240B immediately after protruding from the surface MLS2 of the exterior material 3 on the side of the second end surface LS2. The connection portion between the second extension portion 230B and the second falling portion 240B is formed by bending at a substantially right angle. The second falling portion 240B extends in a direction orthogonal or substantially orthogonal to the mounting surface toward the mounting surface. The second mounting portion 250B extends along the mounting surface toward the middle side in the length direction L of the multilayer ceramic capacitor 1.

This makes it possible to shorten the dimension L8 in the length direction of the multilayer ceramic capacitor 1 including the first metal terminal 200A and the second metal terminal 200B. Therefore, it is possible to reduce the mounting area required to mount the multilayer ceramic capacitor 1 on the mounting substrate.

Also in this case, the separation distance L7 between the end of the first mounting portion 250A of the first metal terminal 200A and the end of the second mounting portion 250B of the second metal terminal 200B is preferably longer than the separation distance L3 between the first external electrode 40A and the second external electrode 40B of the multilayer ceramic capacitor main body 2 shown in FIG. 7.

The first mounting portion 250A may extend in parallel to the mounting surface along the mounting surface, or may extend to be sloped away from the mounting surface toward the middle in the length direction L of the multilayer ceramic capacitor 1. The second mounting portion 250B may extend in parallel to the mounting surface along the mounting surface, or may extend to be sloped away from the mounting surface toward the middle in the length direction L of the multilayer ceramic capacitor 1. With such a configuration, when the multilayer ceramic capacitor 1 is mounted on the mounting substrate, it is possible to extend the bonding material to this portion, and it is possible to increase the strength in mounting. In addition, it is possible to stably provide the multilayer ceramic capacitor 1 on the mounting surface of the mounting substrate. The slope angle θ is preferably about 1° or more and about 40° or less, for example.

The metal terminal may further include a surface of an intermetallic compound at a position different from that of the first example embodiment. FIG. 17A shows an example of the position of the surface ES3 of the additional intermetallic compound of the first metal terminal 200A and the position of the surface ES4 of the additional intermetallic compound of the second metal terminal 200B.

The surface ES3 of the additional intermetallic compound is provided on a surface of the first falling portion 240A of the first metal terminal 200A, and this surface faces the first sloped surface MLS1A of the exterior material 3 of the multilayer ceramic electronic capacitor 1. The surface ES3 of the additional intermetallic compound may also be provided on a surface of the first mounting portion 250A opposite to the mounting surface, that is, a surface facing the first main surface MTS1 of the exterior material 3.

The surface ES4 of the additional intermetallic compound is provided on a surface of the second falling portion 240B of the second metal terminal 200B, and this surface faces the second sloped surface MLS2A of the exterior material 3 of the multilayer ceramic capacitor 1. The surface ES4 of the additional intermetallic compound may also be provided on a surface of the second mounting portion 250B opposite to the mounting surface, that is, a surface facing the first main surface MTS1 of the exterior material 3.

Also in the present example embodiment, even if the first bonding material 5A and the second bonding material 5B melt by heating at the time of reflow, since the surface E1*b* of the intermetallic compound is provided on the surface of the first rising portion 120A of the first metal terminal 100A, and this surface faces the first surface S1 of the multilayer ceramic electronic capacitor main body 2, the first bonding material 5A hardly spreads along the rising portion 120A of the first metal terminal 100A. In addition, since the surface E2*b* of the intermetallic compound is provided on the surface of the second rising portion 120B of the second metal terminal 100B, and this surface faces the second surface S2 of the multilayer ceramic electronic component main body 2, the second bonding material 5B hardly spreads along the rising portion 120B of the second metal terminal 100B. Similarly, the surface E1*a* of the intermetallic compound and the surface E2*a* of the intermetallic compound have a function of preventing solder from spreading during reflow. Similarly, the surface E1*c* of the intermetallic compound and the surface E2*c* of the intermetallic compound have a function of preventing solder from spreading during reflow. Similarly, the surface of the first base material 100Aa located on the first terminal lateral surface TSS1 and the surface of the second base material 100Ba located on the second terminal lateral surface TSS2 have a function of preventing solder from spreading during reflow.

Furthermore, it is possible to prevent the solder from entering between the first metal terminal 200A and the exterior material 3 and between the second metal terminal 200B and the exterior material 3 when the multilayer ceramic capacitor 1 is mounted.

In the multilayer ceramic capacitor main body 2 of the present example embodiment, the plurality of the first internal electrode layers 31 and the plurality of the second internal electrode layers 32 are provided alternately in the height direction T of the multilayer body 10. However, the configuration of the multilayer ceramic capacitor main body 2 is not limited thereto. The plurality of the first internal electrode layers 31 and the plurality of the second internal electrode layers 32 may be alternately provided in the width direction W of the multilayer body 10.

In this case, the first extension portion of each of the first internal electrode layers 31 may extend out toward the first main surface TS1 adjacent to the first end surface LS1, and the first external electrode 40A may be provided only on the first main surface TS1 adjacent to the first end surface LS1. That is, the first end surface LS1 may not be provided with the first external electrode 40A. In such a case, the first surface S1 on the first end surface LS1 of the multilayer ceramic capacitor main body 2 is composed of the first end surface LS1 of the multilayer body 10. Further, the second extension portion of the second internal electrode layers 32 may extend out toward the first main surface TS1 adjacent to the second end surface LS2, and the second external electrode 40B may be provided only on the first main surface TS1 adjacent to the second end surface LS2. That is, the second end surface LS2 may not be provided with the second external electrode 40B. In such a case, the first surface S1 on the second end surface LS2 of the multilayer ceramic capacitor main body 2 is composed of the second end surface LS2 of the multilayer body 10. In this case, the bonding material 5 hardly spread in the gap portion G.

In the present example embodiment, one multilayer ceramic capacitor main body 2 is covered with the exterior material 3 to provide the multilayer ceramic capacitor 1. However, the present invention is not limited thereto. The multilayer ceramic capacitor main body 2 serving as the plurality of the multilayer ceramic electronic component main bodies may be covered with the exterior material 3 to provide the multilayer ceramic capacitor 1 serving as a multilayer ceramic electronic component. For example, a plurality of the multilayer ceramic capacitor main body 2 provided in parallel may be covered with the exterior material 3 to provide the multilayer ceramic capacitor 1. For example, multilayer ceramic capacitor main body 2 stacked in two or more stages may be covered with the exterior material 3 to provide the multilayer ceramic capacitor 1.

The configuration of the multilayer ceramic capacitor main body is not limited to the configuration shown in FIGS. 7 to 10. For example, the multilayer ceramic capacitor main body may be multilayer ceramic capacitors of a two-portion structure, a three-portion structure, or a four-portion structure as shown in FIGS. 18A, 18B, and 18C.

Figure 18A:
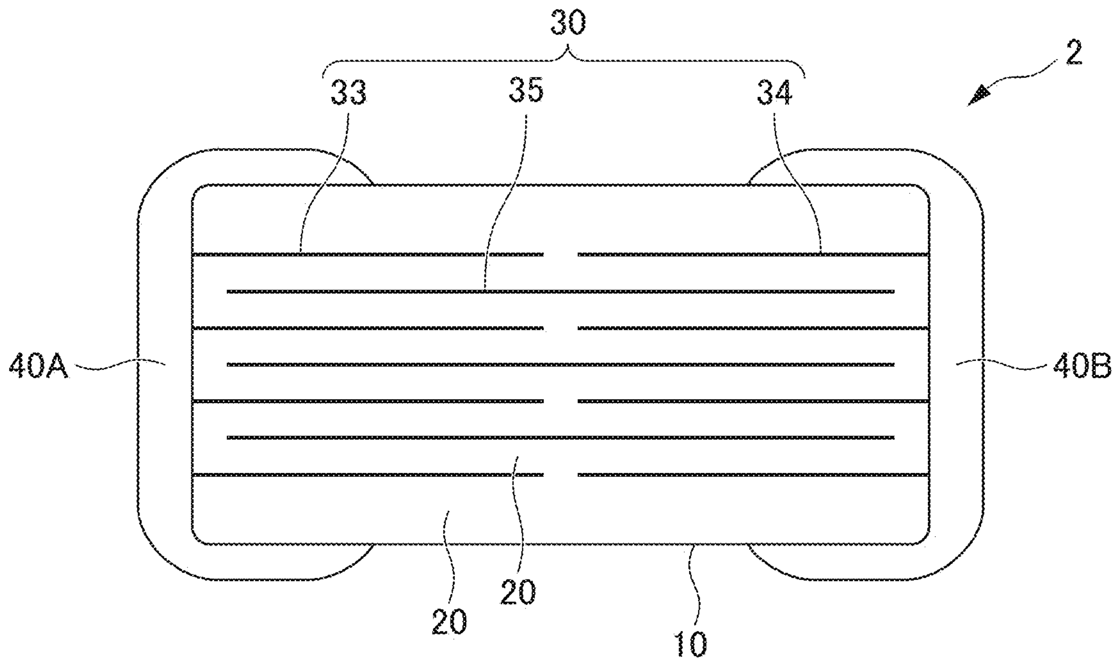
FIG. 18A is a diagram showing a multilayer ceramic capacitor having a two-part structure.
Figure 18B:
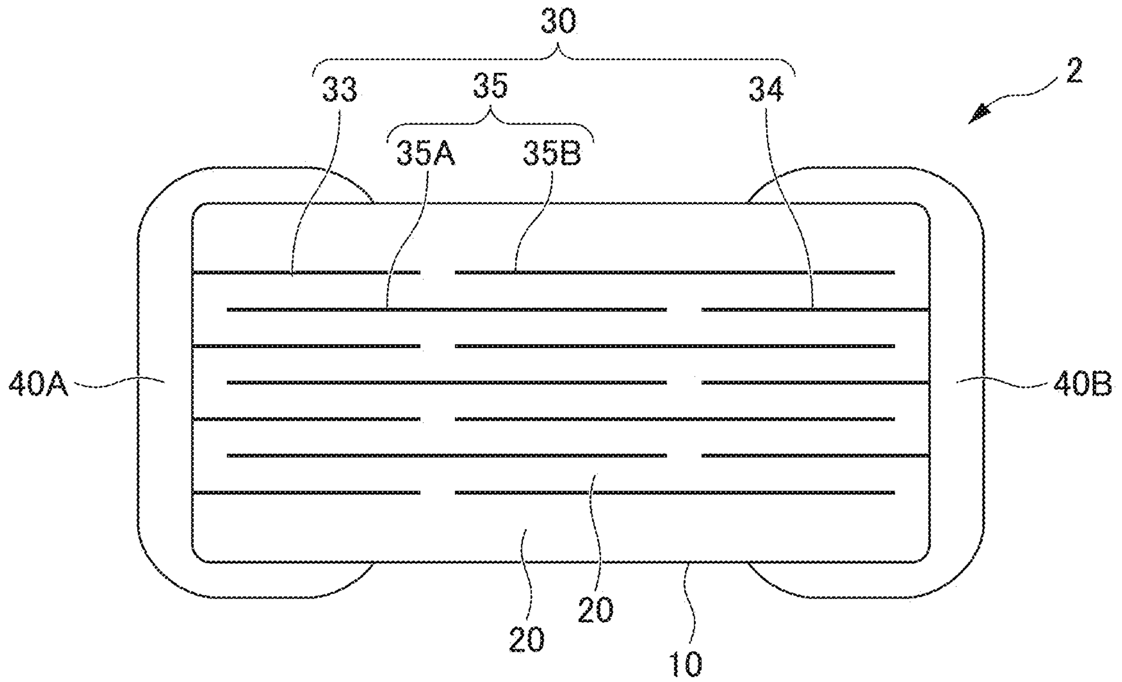
FIG. 18B is a diagram showing a multilayer layer ceramic capacitor having a three-part structure.
Figure 18C:
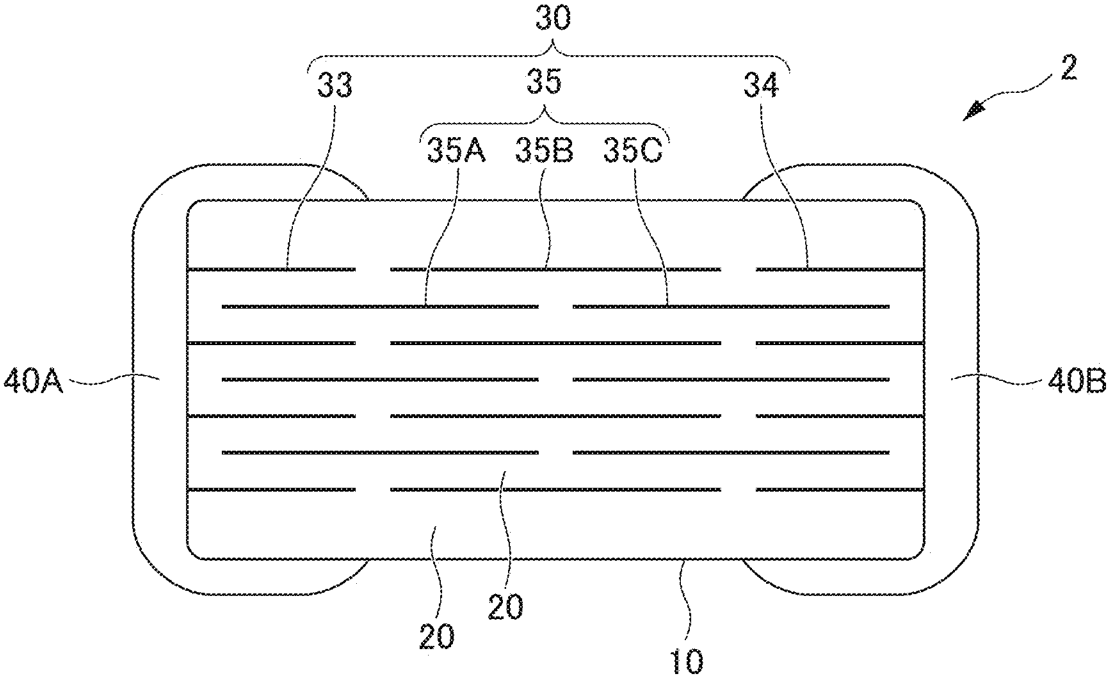
FIG. 18C is a diagram showing a multilayer layer ceramic capacitor having a four-part structure.

The multilayer ceramic capacitor main body 2 shown in FIG. 18A is a multilayer ceramic capacitor main body 2 having a tow-portion structure, and includes, as the internal electrode layer 30, in addition to the first internal electrode layer 33 and the second internal electrode layer 34, a floating internal electrode layer 35 that is not exposed at either of the first end surface LS1 and the second end surface LS2. The multilayer ceramic capacitor main body 2 shown in FIG. 18B is a multilayer ceramic capacitor main body 2 having a three-portion structure including a first floating internal electrode layer 35A and a second floating internal electrode layer 35B as the floating internal electrode layers 35. The multilayer ceramic capacitor main body 2 shown in FIG. 18C is a multilayer ceramic capacitor main body 2 having a four-portion structure including a first floating internal electrode layer 35A, a second floating internal electrode layer 35B, and a third floating internal electrode layer 35C as the floating internal electrode layers 35. As described above, by providing the floating internal electrode layer 35 functioning as the internal electrode layer 30, the multilayer ceramic capacitor main body 2 has a structure in which the counter electrode portion is divided into a plurality of portions. With such a configuration, a plurality of capacitor components are provided between the opposing internal layers 30, and these capacitor components are connected in series. Therefore, the voltage applied to each capacitor component becomes low, and the breakdown voltage of the multilayer ceramic capacitor main body 2 can be increased. It is needless to say that the multilayer ceramic capacitor main body 2 of the present example embodiment may have a multiple-portion structure of four or more portions.

It should be noted that the multilayer ceramic capacitor main body 2 may be of a two-terminal type including two external electrodes, or may be of a multi-terminal type including a large number of external electrodes.

Here, in order to reduce or prevent solder splash, it is conceivable to completely remove the plated film by laser trimming to partially expose the base material of the metal terminal. However, in order to completely remove the plated film by, for example, laser trimming, a long-time laser trimming is required, and therefore, when the laser trimming process is incorporated into a mass-production process, the productivity of the entire facility is lowered due to such a process. In addition, it is conceivable to completely remove the plated film by performing laser trimming with a high-power laser; however, in this case, it is necessary to introduce an expensive laser processing machine having a higher capability. As a result, the equipment cost increases and the processing cost increases accordingly. In addition, a similar situation occurs when the Sn plated film, for example, functioning as the outermost surface plated film is completely removed. However, according to the present example embodiment, it is possible to appropriately reduce or prevent excessive flow of solder while improving productivity, and to reduce or prevent solder splash.

According to the multilayer ceramic capacitor 1 of the present example embodiment, the following advantageous effects are obtained.

(1) The multilayer ceramic capacitor 1 (the multilayer ceramic electronic component) according to an example embodiment of the present invention includes the multilayer ceramic capacitor main body 2 (the multilayer ceramic electronic component main body 2) including the multilayer body 10 including the plurality of dielectric layers 20 (ceramic layers 20) and the plurality of internal electrode layers 30 (internal conductive layers 30) that are laminated, the first main surface TS1 and the second main surface TS2 opposed to each other in the height direction T, the first lateral surface WS1 and the second lateral surface WS2 opposed to each other in the width direction W orthogonal or substantially orthogonal to the height direction T, and the first end surface LS1 and the second end surface LS2 opposed to each other in the length direction L orthogonal or substantially orthogonal to the height direction T and the width direction W, the first external electrode 40A on the first end surface LS1, and the second external electrode 40B on the second end surface LS2, the first metal terminal 100A connected to the first external electrode 40A via the bonding material 5 (the first bonding material 5A), the second metal terminal 100B connected to the second external electrode 40B via the bonding material 5 (the second bonding material 5B), the exterior material 3 that covers the multilayer ceramic electronic component main body 2, a portion of the first metal terminal 100A, and a portion of the second metal terminal 100B. The first metal terminal 100A includes the first bonding surface 110A1 bonded to the bonding material 5 (the first bonding material 5A) and the first contact surface CS1 in contact with the exterior material 3. The second metal terminal 100B includes the second bonding surface 110B1 bonded to the bonding material 5 (the second bonding material 5B) and the second contact surface CS2 in contact with the exterior material 3. The first contact surface CS1 in contact with the exterior material 3 includes a surface of the first outermost surface plated film 100Ab2 (the first outermost surface metal film 100Ab2) and surfaces E1*a*, E1*b*, and E1*c* of the first intermetallic compound functioning as the first low wettability surface and having a wettability lower than the surface of the first outermost surface plated film 100Ab2. The second contact surface CS2 in contact with the exterior material 3 includes a surface of the second outermost surface plated film 100Bb2 (the second outermost surface metal film 100Bb2) and surfaces E2*a*, E2*b*, and E2*c* of the second intermetallic compound functioning as the first low wettability surface and having a wettability lower than the surface of the second outermost surface plated film 100Bb2. The first protruding portion 100Ac is provided at a boundary portion between the surface of the first outermost surface plated film 100Ab2 and the surfaces E1*a*, E1*b*, E1*c* of the first intermetallic compound 100Ab3, and the second protruding portion 100Bc is provided at a boundary portion between the surface of the second outermost surface plated film 100Bb2 and the surfaces E2*a*, E2*b*, E2*c* of the second intermetallic compound 100Bb3.

Since the protruding portion is provided at the boundary portion between the surface of the outermost surface metal film and the low wettability surface, it is possible to reduce or prevent excessive flow-out of 41 the bonding material more appropriately. Therefore, according to the present disclosure, it is possible to provide multilayer ceramic electronic components that are each able to reduce or prevent excessive flow of a bonding material appropriately to reduce or prevent solder splash.

Since the plated film is provided on the metal terminal, the bonding property by the bonding material can be enhanced, but since the surface of the plated film provided on the metal terminal is smooth, there is a possibility that peeling will likely occur at the interface between the metal terminal and the exterior material. In this case, external vapor may enter the inside of the exterior material, and the reliability of the electronic component may decrease.

According to an example embodiment of the present disclosure, since the protruding portion is provided at the boundary portion between the surface of the outermost surface metal film and the low wettability surface, the bonding property between the metal terminal and the exterior material is enhanced, and it is possible to reduce or prevent peeling at the interface between the metal terminal and the exterior material, and thus, it is possible to reduce or prevent a decrease in reliability of the electronic components.

(2) In the multilayer ceramic capacitor 1 according to an example embodiment of the present invention, the first protruding portion 100Ac has an undercut shape, and the second protruding portion 100Bc has an undercut shape. Accordingly, it is possible to more appropriately reduce or prevent excessive flow-out of the solder, while maintaining wettability of the solder in a necessary portion. In addition, it is possible to further improve the bonding property between the metal terminal and the exterior material.

(3) In the multilayer ceramic capacitor 1 according to an example embodiment of the present invention, the first metal terminal 100A includes the first base material 100Aa and the first plated film 100Ab on the surface of the first base material 100Aa, the second metal terminal 100B includes the second base material 100Ba and the second plated film 100Bb on the surface of the second base material 100Ba, the first outermost surface metal film 100Ab2 includes at least the outermost surface portion of the first plated film, and the second outermost surface metal film 100Bb2 includes at least the outermost surface portion of the second plated film. With such a configuration, it is possible to provide multilayer ceramic electronic components that are each able to reduce or prevent excessive flow of the solder while maintaining wettability of the solder in a necessary portion, thereby reducing or preventing solder splash.

(4) In the multilayer ceramic capacitor 1 according to an example embodiment of the present invention, the first plated film 100Ab includes the first outermost surface plated film 100Ab2 of the first outermost surface metal film and the first lower layer plated film 100Ab1 below the first outermost surface plated film 100Ab2, and the second plated film 100Bb includes the second outermost surface plated film 100Bb2 of the second outermost surface metal film and the second lower layer plated film 100Bb1 below the second outermost surface plated film 100Bb2. With such a configuration, it is possible to provide multilayer ceramic electronic components that are each able to reduce or prevent excessive flow of the solder while maintaining wettability of the solder in a necessary portion, thereby reducing or preventing solder splash.

(5) In the multilayer ceramic capacitor 1 according to an example embodiment of the present invention, the first protruding portion 100Ac has the protrusion height d1 greater than the thickness d2 of the first lower layer plated film 100Ab1, and the second protruding portion 100Bc has the protrusion height d1 greater than the thickness d2 of the second lower layer plated film 100Bb1. Accordingly, it is possible to more appropriately reduce or prevent excessive flow-out of the solder while maintaining wettability of the solder in a necessary portion.

(6) In the multilayer ceramic capacitor 1 according to an example embodiment of the present invention, each of the first outermost surface plated film 100Ab2 and the second outermost surface plated film 100Bb2 is a Sn plated film, and each of the first lower layer plated film 100Ab1 and the second lower layer plated film 100Bb1 is a Ni plated film. With such a configuration, it is possible to provide multilayer ceramic electronic components that are each able to reduce or prevent excessive flow of the solder while maintaining wettability of the solder in a necessary portion, thereby reducing or preventing solder splash.

(7) In the multilayer ceramic capacitor 1 according to an example embodiment of the present invention, the first low wettability surface is surfaces E1*a*, E1*b*, E1*c* of the first intermetallic compound 100Ab3 including the metal of the first outermost surface plated film 100Ab2 and the metal of the first lower layer plated film 100Ab1, and the second low wettability surface is surfaces E2*a*, E2*b*, E2*c* of the second intermetallic compound 100Bb3 including the metal of the second outermost surface plated film 100Bb2 and the metal of the second lower layer plated film 100Bb1. With such a configuration, it is possible to provide multilayer ceramic electronic components that are each able to reduce or prevent excessive flow of the solder while maintaining wettability of the solder in a necessary portion, thereby reducing or preventing solder splash. In addition, since it is possible to form an intermetallic compound having low wettability in a shorter time than when the plated film is completely removed by laser trimming, it is possible to improve productivity of the entire facility. In addition, since the output of the laser necessary for the laser irradiation process can be reduced or prevented, it is also possible to reduce the production cost.

(8) In the multilayer ceramic capacitor 1 according to an example embodiment of the present invention, each of the first intermetallic compound 100Ab3 and the second intermetallic compound 100Bb3 includes an intermetallic compound of Ni and Sn. With such a configuration, it is possible to provide multilayer ceramic electronic components that are each able to reduce or prevent excessive flow of the solder while maintaining wettability of the solder in a necessary portion, thereby reducing or preventing solder splash.

(9) In the multilayer ceramic capacitor 1 according to an example embodiment of the present invention, the first low wettability surface is the surface of the first lower layer plated film 100Ab1 of the first metal terminal 100A, and the second low wettability surface is a surface of the second lower layer plated film 100Bb1 of the second metal terminal 100B. With such a configuration, it is possible to provide multilayer ceramic electronic components that are each able to reduce or prevent excessive flow of the solder while maintaining wettability of the solder in a necessary portion, thereby reducing or preventing solder splash.

(10) In the multilayer ceramic capacitor 1 according to an example embodiment of the present invention, the first low wettability surface is the surface of the first base material 100Aa of the first metal terminal 100A, and the second low wettability surface is the surface of the second base material 100Ba of the second metal terminal 100B. With such a configuration, it is possible to provide multilayer ceramic electronic components that are each able to reduce or prevent excessive flow of the solder while maintaining wettability of the solder in a necessary portion, thereby reducing or preventing solder splash.

(11) In the multilayer ceramic capacitor 1 according to an example embodiment of the present invention, each of the first metal terminal 100A and the second metal terminal 100B is a metal terminal mounted on the mounting surface 311 of the mounting substrate 310 on which the multilayer ceramic capacitor 1 is mounted, the first main surface TS1 of the multilayer body 10 is a surface facing the mounting surface 311, the first external electrode 40A is provided at least on a portion of the first main surface TS1 adjacent to the first end surface LS1, the second external electrode 40B is provided at least on a portion of the first main surface TS1 adjacent to the second end surface LS2, the first metal terminal 100A includes the first bonding portion 110A that is opposed to the first main surface TS1 and connected to the first external electrode 40A, the first rising portion 120A that is connected to the first bonding portion 110A and extends away from the mounting surface 311, and the first extension portion 130A that is connected to the first rising portion 120A and extends away from the multilayer ceramic capacitor main body 2, and the second metal terminal 100B includes the second bonding portion 110B that is opposed to the first main surface TS1 and connected to the second external electrode 40B, the second rising portion 120B that is connected to the second bonding portion 110B and extends away from the mounting surface 311, and the second extension portion 130B that is connected to the second rising portion 120B and extends away from the multilayer ceramic capacitor main body 2. With such a configuration, it is possible to lengthen the path of the solder spreading, and it is possible to appropriately prevent unnecessary flow of the solder.

(12) In the multilayer ceramic capacitor 1 according to an example embodiment of the present invention, the first metal terminal 100A includes a plate-shaped structure including the first front surface FS1 on the first bonding surface 110A1 to which the first external electrode 40A is bonded, the first opposite surface BS1 which is a surface opposite to the first front surface FS1, and the first terminal lateral surface TSS1 connecting the first front surface FS1 and the first opposite surface BS1, and the second metal terminal 100B includes a plate-shaped structure including the second front surface FS2 on the second bonding surface 110B1 to which the second external electrode 40B is bonded, the second opposite surface BS2 which is a surface opposite to the second front surface FS2, and the second terminal lateral surface TSS2 connecting the second front surface FS2 and the second opposite surface BS2. With such a configuration, it is possible to easily form the surface of the low wettability surface. For example, it is possible to form the surface of the intermetallic compound easily by processing by laser irradiation treatment or the like.

(13) In the multilayer ceramic capacitor 1 according to an example embodiment of the present invention, the surfaces E1*a* and E1*b* of the first intermetallic compound which are provided on the first contact surface CS1 and function as the first low wettability surfaces are spaced apart from each other on the first front surface FS1, and provided on at least a portion of a surface between the first bonding portion 110A and a middle of the first rising portion 120A, and on the first extension portion 130A, and the surfaces E2*a* and E2*b* of the second intermetallic compound which are provided on the second contact surface CS2 and function as the second low wettability surfaces are spaced apart from each other on the second front surface FS2, and provided on at least a portion of a surface between the second bonding portion 110B and a middle of the second rising portion 120B, and on the second extension portion 130B. With such a configuration, in a case where the surface of the intermetallic compound functioning as the low wettability surfaces: formed by processing such as laser irradiation processing, it is possible to appropriately reduce or prevent excessive flow of the bonding material and reduce or prevent solder splash, while reducing the amount of processing for forming the surface of the intermetallic compound.

(14) In the multilayer ceramic capacitor 1 according to an example embodiment of the present invention, the surface E1*a* of the first intermetallic compound which is provided on the first contact surface CS1 and functions as the first low wettability surface is provided on the first front surface FS1 and the first opposite surface BS1 of the first extension portion 130A, and the surface E2*a* of the second intermetallic compound which is provided on the second contact surface CS2 and functions as the second low wettability surface is provided on the second front surface FS2 and the second opposite surface BS2 of the second extension portion 130B. With such a configuration, it is possible to appropriately reduce or prevent excessive flow of the bonding material, whereby it is possible to reduce or prevent solder splash.

(15) In the multilayer ceramic capacitor 1 according to an example embodiment of the present invention, the surface E1*c* of the first intermetallic compound which is provided on the first contact surface CS1 and functions as the first low wettability surface is provided on the first opposite surface BS1 of the first bonding portion 110A, and the surface E2*c* of the second intermetallic compound which is provided on the second contact surface CS2 and functions as the second low wettability surface is provided on the second opposite surface BS2 of the second bonding portion 110B. With such a configuration, it is possible to reduce or prevent excessive flow of the bonding material appropriately, whereby it is possible to reduce or prevent solder splash.

(16) In the multilayer ceramic capacitor 1 according to an example embodiment of the present invention, the first contact surface CS1 includes, as a surface in contact with the exterior material 3, a surface of the first outermost surface plated film 100Ab2, the surfaces E1*a*, E1*b*, and E1*c* of the first intermetallic compound functioning as the first low wettability surfaces, and a surface of the first base material 100Aa, and the second contact surface CS2 includes, as a surface in contact with the exterior material 3, a surface of the second outermost surface plated film 100Bb2, the surfaces E2*a*, E2*b*, and E2*c* of the second intermetallic compound functioning as the second low wettability surfaces, and a surface of the second base material 100Ba. With such a configuration, it is possible to appropriately reduce or prevent excessive flow of the bonding material and reduce or prevent solder splash, while ensuring solder wettability or the like.

(17) In the multilayer ceramic capacitor 1 according to an example embodiment of the present invention, the first contact surface CS1 includes, at the first bonding portion 110A, a surface of the first outermost surface plated film 100Ab2 located on the first front surface FS1, the surface E1*c* of the first intermetallic compound which is located on the first opposite surface BS1 and functions as the first low wettability surface, and a surface of the first base material 100Aa located on a lateral surface, and the second contact surface CS2 includes, at the second bonding portion 110B, a surface of the second outermost surface plated film 100Bb2 located on the second front surface FS2, the surface E2*c* of the second intermetallic compound which is located on the second opposite surface BS2 and functions as the first low wettability surface, and a surface of the second base material 100Ba located on a lateral surface. With such a configuration, it is possible to appropriately reduce or prevent excessive flow of the bonding material and reduce or prevent solder splash, while ensuring solder wettability or the like.

(18) In the multilayer ceramic capacitor 1 according to an example embodiment of the present invention, the first contact surface CS1 includes, on at least a portion of a surface between a middle of the first rising portion 120A and the first bonding portion 110A, the surface E1*b* of the first intermetallic compound which is located on the first front surface FS1 and functions as the first low wettability surface, a surface of the first outermost surface plated film 100Ab2 located on the first opposite surface BS1, and a surface of the first base material 100Aa located on a lateral surface, and the second contact surface CS2 includes, on at least a portion of a surface between a middle of the second rising portion 120B and the second bonding portion 110B, the surface E2*b* of the second intermetallic compound which is located on the second front surface FS2 and functions as the second low wettability surface, a surface of the second outermost surface plated film 100Bb2 located on the second opposite surface BS2, and a surface of the second base material 100Ba located on a lateral surface. With such a configuration, it is possible to appropriately reduce or prevent excessive flow of the bonding material and reduce or prevent solder splash, while ensuring solder wettability and the like.

(19) In the multilayer ceramic capacitor 1 according to an example embodiment of the present invention, the surfaces E1*a*, E1*b*, and E1*c* of the first intermetallic compound which are provided on the first contact surface CS1 and function as the first low wettability surfaces are separated in the width direction by a hole or a notch provided in the first metal terminal 100A, and the surfaces E2*a*, E2*b*, and E2*c* of the second intermetallic compound which are provided on the second contact surface CS2 and function as the first low wettability surfaces are separated in the width direction by a hole or a notch provided in the second metal terminal 100B. With such a configuration, when the surface of the intermetallic compound functioning as the low wettability surface is formed by processing such as laser irradiation processing, for example, it is possible to reduce or prevent flow-out of solder effectively, while reducing the amount of processing for forming the surface of the intermetallic compound functioning as the low wettability surface.

In addition, in the example embodiments described above, multilayer ceramic capacitors each including a dielectric ceramic have been exemplified as the multilayer ceramic electronic components. However, the multilayer ceramic electronic components according to example embodiments of the present invention are not limited thereto, and are applicable to various multilayer ceramic electronic components such as a piezoelectric component using a piezoelectric ceramic, a thermistor using a semiconductor ceramic, and an inductor using a magnetic ceramic. Examples of the piezoelectric ceramics include PZT (lead zirconate titanate) ceramics, examples of semiconductor ceramics include spinel ceramics, and examples of magnetic ceramics include ferrite.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:

a multilayer ceramic electronic component main body including a multilayer body including a plurality of ceramic layers and a plurality of internal conductive layers that are laminated, a first main surface and a second main surface opposed to each other in a height direction, a first lateral surface and a second lateral surface opposed to each other in a width direction orthogonal or substantially orthogonal to the height direction, and a first end surface and a second end surface opposed to each other in a length direction orthogonal or substantially orthogonal to the height direction and the width direction, a first external electrode on the first end surface, and a second external electrode on the second end surface;

a first metal terminal connected to the first external electrode via a bonding material;

a second metal terminal connected to the second external electrode via a bonding material; and an exterior material that covers the multilayer ceramic electronic component main body, a portion of the first metal terminal, and a portion of the second metal terminal; wherein the first metal terminal includes a first bonding surface bonded to the bonding material and a first contact surface in contact with the exterior material;

the second metal terminal includes a second bonding surface bonded to the bonding material and a second contact surface in contact with the exterior material;

the first contact surface in contact with the exterior material includes a surface of a first outermost surface metal film and a first low wettability surface having a wettability lower than the first outermost surface metal film;

the second contact surface in contact with the exterior material includes a surface of a second outermost surface metal film and a second low wettability surface having a wettability lower than the second outermost surface metal film;

a first protruding portion is provided at a boundary portion between the surface of the first outermost surface metal film and the first low wettability surface; and a second protruding portion is provided at a boundary portion between the surface of the second outermost surface metal film and the second low wettability surface.

2. The multilayer ceramic electronic component according to claim 1, wherein the first protruding portion has an undercut shape; and the second protruding portion has an undercut shape.

3. The multilayer ceramic electronic component according to claim 1, wherein the first metal terminal includes a first base material and a first plated film on a surface of the first base material;

the second metal terminal includes a second base material and a second plated film on a surface of the second base material;

the first outermost surface metal film includes at least an outermost surface portion of the first plated film; and the second outermost surface metal film includes at least an outermost surface portion of the second plated film.

4. The multilayer ceramic electronic component according to claim 3, wherein the first plated film includes a first outermost surface plated film of the first outermost surface metal film and a first lower layer plated film below the first outermost surface plated film; and the second plated film includes a second outermost surface plated film of the second outermost surface metal film and a second lower layer plated film below the second outermost surface plated film.

5. The multilayer ceramic electronic component according to claim 4, wherein the first protruding portion has a protrusion height greater than a thickness of the first lower layer plated film; and the second protruding portion has a protrusion height greater than a thickness of the second lower layer plated film.

6. The multilayer ceramic electronic component according to claim 4, wherein each of the first outermost surface plated film and the second outermost surface plated film is a Sn plated film; and each of the first lower layer plated film and the second lower layer plated film is a Ni plated film.

7. The multilayer ceramic electronic component according to claim 4, wherein the first low wettability surface is a surface of a first intermetallic compound including a metal of the first outermost surface plated film and a metal of the first lower layer plated film; and the second low wettability surface is a surface of a second intermetallic compound including a metal of the second outermost surface plated film and a metal of the second lower layer plated film.

8. The multilayer ceramic electronic component according to claim 7, wherein each of the first intermetallic compound and the second intermetallic compound includes an intermetallic compound of Ni and Sn.

9. The multilayer ceramic electronic component according to claim 4, wherein the first low wettability surface is a surface of the first lower layer plated film of the first metal terminal; and the second low wettability surface is a surface of the second lower layer plated film of the second metal terminal.

10. The multilayer ceramic electronic component according to claim 4, wherein each of the first metal terminal and the second metal terminal is a metal terminal mounted on a mounting surface of a mounting substrate on which the multilayer ceramic electronic component is mounted;

the first main surface of the multilayer body is a surface facing the mounting surface;

the first external electrode is provided at least on a portion of the first main surface adjacent to the first end surface;

the second external electrode is provided at least on a portion of the first main surface adjacent to the second end surface;

the first metal terminal includes a first bonding portion that is opposed to the first main surface and connected to the first external electrode, a first rising portion that is connected to the first bonding portion and extends away from the mounting surface, and a first extension portion that is connected to the first rising portion and extends away from the multilayer ceramic electronic component; and the second metal terminal includes a second bonding portion that is opposed to the first main surface and connected to the second external electrode, a second rising portion that is connected to the second bonding portion and extends away from the mounting surface, and a second extension portion that is connected to the second rising portion and extends away from the multilayer ceramic electronic component.

11. The multilayer ceramic electronic component according to claim 10, wherein the first metal terminal includes a plate-shaped structure including a first front surface on the first bonding surface to which the first external electrode is bonded, a first opposite surface which is a surface opposite to the first front surface, and a first terminal lateral surface connecting the first front surface and the first opposite surface; and the second metal terminal includes a plate-shaped structure including a second front surface on the second bonding surface to which the second external electrode is bonded, a second opposite surface which is a surface opposite to the second front surface, and a second terminal lateral surface connecting the second front surface and the second opposite surface.

12. The multilayer ceramic electronic component according to claim 11, wherein surfaces of the first low wettability surface provided on the first contact surface are spaced apart from each other on the first front surface, and provided on at least a portion of a surface between the first bonding portion and a middle of the first rising portion, and on the first extension portion; and surfaces of the second low wettability surface provided on the second contact surface are spaced apart from each other on the second front surface, and provided on at least a portion of a surface between the second bonding portion and a middle of the second rising portion, and on the second extension portion.

13. The multilayer ceramic electronic component according to claim 11, wherein a surface of the first low wettability surface provided on the first contact surface is provided on the first front surface and the first opposite surface of the first extension portion; and a surface of the second low wettability surface provided on the second contact surface is provided on the second front surface and the second opposite surface of the second extension portion.

14. The multilayer ceramic electronic component according to claim 11, wherein a surface of the first low wettability surface provided on the first contact surface is provided on the first opposite surface of the first bonding portion; and a surface of the second low wettability surface provided on the second contact surface is provided on the second opposite surface of the second bonding portion.

15. The multilayer ceramic electronic component according to claim 11, wherein the first contact surface includes, as a surface in contact with the exterior material, a surface of the first outermost surface metal film, a surface of the first low wettability surface, and a surface of the first base material; and the second contact surface includes, as a surface in contact with the exterior material, a surface of the second outermost surface metal film, a surface of the second low wettability surface, and a surface of the second base material.

16. The multilayer ceramic electronic component according to claim 15, wherein the first contact surface includes, at the first bonding portion, a surface of the first outermost surface metal film located on the first front surface, a surface of the first low wettability surface located on the first opposite surface, and a surface of the first base material located on a lateral surface; and the second contact surface includes, at the second bonding portion, a surface of the second outermost surface metal film located on the second front surface, a surface of the second low wettability surface located on the second opposite surface, and a surface of the second base material located on a lateral surface.

17. The multilayer ceramic electronic component according to claim 15, wherein the first contact surface includes, on at least a portion of a surface between a middle of the first rising portion and the first bonding portion, a surface of the first low wettability surface located on the first front surface, a surface of the first outermost surface metal film located on the first opposite surface, and a surface of the first base material located on a lateral surface; and the second contact surface includes, on at least a portion of a surface between a middle of the second rising portion and the second bonding portion, a surface of the second low wettability surface located on the second front surface, a surface of the second outermost surface metal film located on the second opposite surface, and a surface of the second base material located on a lateral surface.

18. The multilayer ceramic electronic component according to claim 3, wherein the first low wettability surface is a surface of the first base material of the first metal terminal; and the second low wettability surface is a surface of the second base material of the second metal terminal.

19. The multilayer ceramic electronic component according to claim 1, wherein surfaces of the first low wettability surface provided on the first contact surface are separated in the width direction by a hole or a notch provided in the first metal terminal; and surfaces of the second low wettability surface provided on the second contact surface are separated in the width direction by a hole or a notch provided in the second metal terminal.

* * * * *